United States Patent
Tomblin et al.

(10) Patent No.: US 12,269,220 B2
(45) Date of Patent: Apr. 8, 2025

(54) JOINT AUTONOMOUS REPAIR VERIFICATION AND INSPECTION SYSTEM

(71) Applicant: Wichita State University, Wichita, KS (US)

(72) Inventors: John S. Tomblin, Wichita, KS (US); Waruna Seneviratne, Wichita, KS (US); Caleb Saathoff, Wichita, KS (US); John Matthew Tomblin, Wichita, KS (US); Christopher Pini, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 115 days.

(21) Appl. No.: 17/828,558

(22) Filed: May 31, 2022

(65) Prior Publication Data
US 2023/0052634 A1 Feb. 16, 2023

Related U.S. Application Data

(60) Provisional application No. 63/194,460, filed on May 28, 2021.

(51) Int. Cl.
*B29C 65/00* (2006.01)
*B29C 65/82* (2006.01)
(Continued)

(52) U.S. Cl.
CPC .......... *B29C 65/8253* (2013.01); *B29C 73/10* (2013.01); *B29C 73/26* (2013.01); *B29L 2031/082* (2013.01)

(58) Field of Classification Search
CPC ................................ G01N 25/72; B29C 73/10
See application file for complete search history.

(56) References Cited

U.S. PATENT DOCUMENTS

| 9,082,209 B1* | 7/2015 | Engelbart | G06F 30/00 |
| 2014/0022380 A1* | 1/2014 | Nissen | G01N 25/72 |
| | | | 348/125 |

(Continued)

FOREIGN PATENT DOCUMENTS

| CN | 106932437 A | * | 7/2017 | |
| CN | 110827256 A | * | 2/2020 | G01J 5/00 |

(Continued)

OTHER PUBLICATIONS

JPH-09113473 (Tadashi) May 1995 (online machine translation), [Retrieved on Jan. 25, 2024]. Retrieved from: Espacenet (Year: 1995).*

(Continued)

*Primary Examiner* — Alison L Hindenlang
*Assistant Examiner* — Andres E. Behrens, Jr.
(74) *Attorney, Agent, or Firm* — Stinson LLP

(57) ABSTRACT

An autonomous or semi-autonomous cell for inspecting composite parts, verifying repairs made to such parts, and facilitating repairs to composite parts. The cell employs automated inspection, damage assessment, and repair systems. An industrial robot automatically attaches to a set of interchangeable inspection and repair end effectors to carry out the inspection, verification, and repair processes. The cell can be equipped with fixtures for supporting a rotorcraft blade and rotating the blade within the cell so that the robot can access the entire blade. Processes are provided for performing inspections, tracking the inspection data for parts in a database, and carrying out repairs. Over time, a software applicant can use the inspection data to train a machine learning model for recognizing damage to the composite part based on inspection images.

28 Claims, 75 Drawing Sheets

(51) Int. Cl.
*B29C 73/00* (2006.01)
*B29C 73/10* (2006.01)
*B29C 73/26* (2006.01)
*B29L 31/08* (2006.01)

(56) References Cited

U.S. PATENT DOCUMENTS

| | | | | |
|---|---|---|---|---|
| 2014/0184786 A1* | 7/2014 | Georgeson | ............ | G01M 99/00 348/128 |
| 2014/0267694 A1* | 9/2014 | Henderkott | ............ | G01N 25/72 348/132 |
| 2015/0198547 A1* | 7/2015 | Isakov | .................. | G01J 5/0066 374/121 |
| 2015/0273760 A1* | 10/2015 | Engelbart | ................ | B29C 73/26 156/64 |
| 2017/0008184 A1* | 1/2017 | Tomblin | ................. | B26D 5/007 |
| 2017/0197324 A1* | 7/2017 | Bain | ........................ | G06T 11/20 |
| 2018/0128657 A1* | 5/2018 | Crothers | ............... | G01N 29/225 |
| 2018/0273207 A1* | 9/2018 | Hanna | ..................... | B29C 73/26 |
| 2018/0361595 A1* | 12/2018 | Troy | ....................... | B25J 9/162 |
| 2019/0265178 A1* | 8/2019 | Martin | ................. | G01N 29/069 |
| 2020/0003734 A1* | 1/2020 | Troy | .................... | G01N 29/265 |
| 2021/0003513 A1* | 1/2021 | Robbins | ........... | G01N 21/95607 |
| 2021/0255145 A1* | 8/2021 | Antonio Kapp | ..... | G01N 29/043 |
| 2023/0131624 A1* | 4/2023 | Tomblin | ................... | B25J 15/04 700/253 |
| 2023/0146116 A1* | 5/2023 | Tomblin | ............. | G01N 21/9515 356/520 |
| 2023/0146701 A1* | 5/2023 | Tomblin | ................ | B25J 9/1617 700/245 |

FOREIGN PATENT DOCUMENTS

| | | | | |
|---|---|---|---|---|
| CN | 111795977 A | * | 10/2020 | ............. B33Y 30/00 |
| JP | H-09113473 | * | 10/1995 | |

OTHER PUBLICATIONS

CN-111795977-A (Sheng) May 1991 (online machine translation), [Retrieved on Jan. 25, 2024]. Retrieved from: Espacenet (Year: 2020 ).*

CN-110827256-A (Guojun) Feb. 2020 (online machine translation), [Retrieved on Jan. 25, 2024]. Retrieved from: Espacenet (Year: 2020).*

CN-106932437-A (Chen) May 1991 (online machine translation), [Retrieved on Jan. 25, 2024]. Retrieved from: Espacenet (Year: 2017).*

* cited by examiner

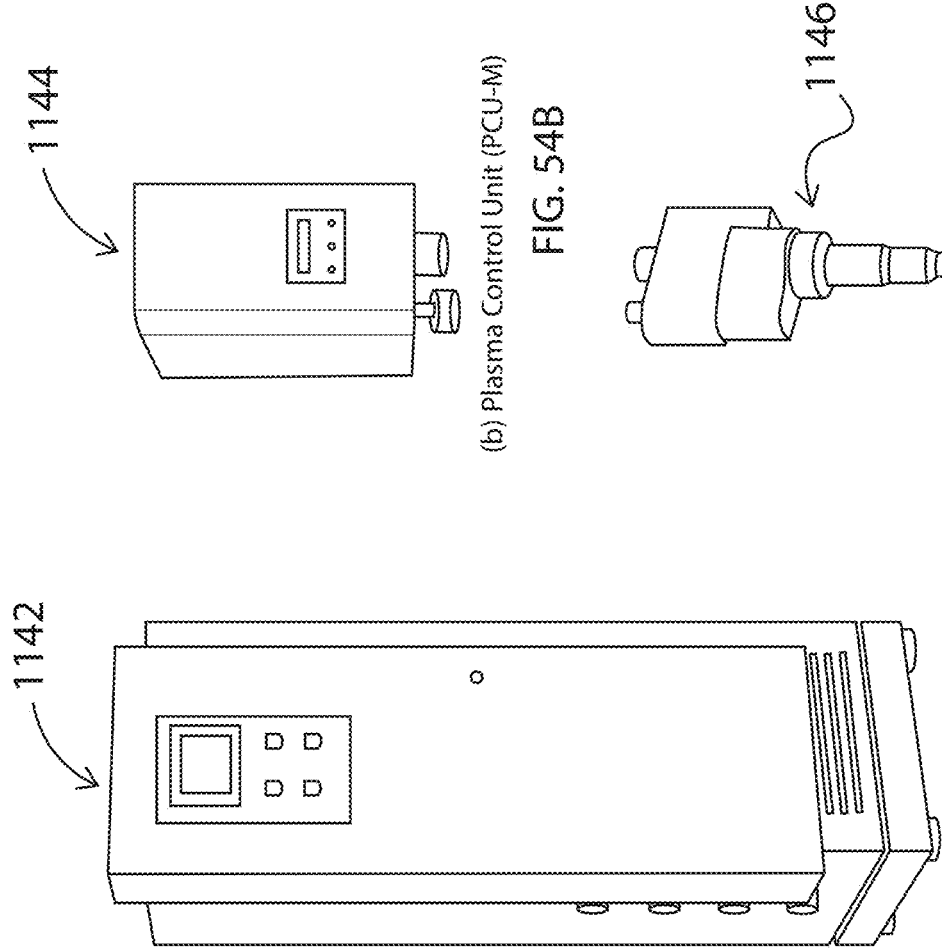

JOINT AUTONOMOUS REPAIR VERIFICATION AND INSPECTION SYSTEM

CROSS-REFERENCE TO RELATED APPLICATION

This application claims priority to U.S. Provisional Patent Application No. 63/194,460, of the same title, filed May 28, 2021, which is hereby incorporated by reference in its entirety.

STATEMENT REGARDING FEDERALLY SPONSORED RESEARCH OR DEVELOPMENT

This invention was made with government support under OTA-Prototype No. 140D0419-9-0003. The government of the United States has certain rights in the invention.

FIELD

This disclosure generally pertains to a joint autonomous repair verification and inspection system for composite parts.

BACKGROUND

There is a need for an improved inspection system for composite parts. In particular, there is a need for a system for inspecting repaired composite parts and/or a system that can automate non-destructive testing of composite parts to improve subsequent part repairs.

SUMMARY

In one aspect, a system for inspecting composite parts comprises a support for supporting a composite part. An inspection system comprises at least one nondestructive testing instrument configured to scan the composite part supported by the support to generate nondestructive testing data about the composite part. A damage assessment system is configured to present the nondestructive testing data for assessment of damage to the composite part based on the nondestructive testing data.

In another aspect, a system for inspecting and repairing composite parts comprises a cell configured to receive a composite part in the cell. A robot is in the cell. A plurality of modular tool cartridges are adjacent to the cell. Each modular tool cartridge contains a robotic end effector for the robot. The robot is configured to interchangeably attach to each of the end effectors of the plurality of modular tool cartridges to perform an autonomous or semi-autonomous routine whereby the robot inspects the composite part in the cell, identifies a damaged area of the composite part, and performs one or more repair operations to the damaged area of the composite part.

In another aspect, a fixture for holding a rotorcraft blade in an inspection cell comprises a rotatable base. A cuff mount is supported on the rotatable base. The cuff mount defines a channel configured to receive a portion of a cuff of the rotorcraft blade therein. A pin is movably connected to the cuff mount for movement between a release position and a lock position. The pin in the lock position is configured to lock the cuff to the cuff mount and the pin in the release position being configured to release the cuff from the cuff mount.

In another aspect, a processor-implemented method of identifying damage to a composite part comprises training a convolutional neural network to recognize damage based on non-destructive testing images of composite parts. Non-destructive testing image of said composite part are received. One or more locations of damage in the non-destructive testing image are determined based on the convolutional neural network.

In another aspect, a method of sustaining an inventory of a plurality of composite parts comprises periodically scanning each of the composite parts with a non-destructive testing instrument and storing data from each scan of each part in a database.

Other aspects will be in part apparent and in part pointed out hereinafter.

BRIEF DESCRIPTION OF THE DRAWINGS

FIG. 54A-C are perspectives of components of an atmospheric plasma system of the JARVIS cell;

Corresponding parts are given corresponding reference characters throughout the drawings.

DETAILED DESCRIPTION

Figure 1:
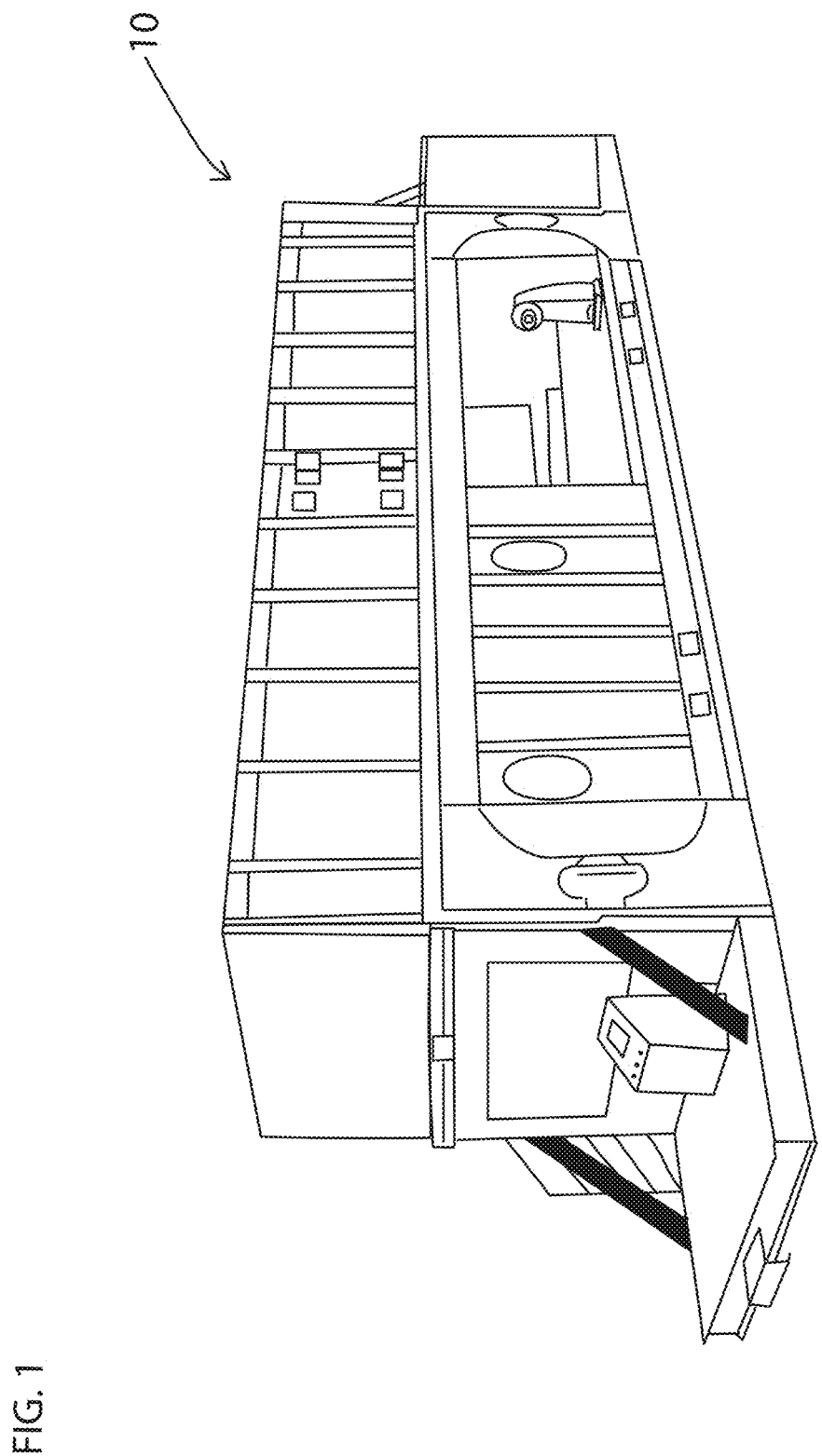
FIG. 1 is a perspective of a joint autonomous repair verification and inspection system (JARVIS) cell in a deployed configuration.

The present disclosure generally pertains to a system for automating certain aspects of inspection and/or repair of composite parts. As described below, an exemplary embodiment of the system is implemented to inspect and repair composite rotorcraft blades to aid in sustainment programs that ensure airworthiness. However, it will be understood that the principles of the system can be adapted for use with various other composite parts. Further, although the system described below is used in a sustainment program, it is contemplated that the inspection and repair system might also have other applications, e.g., quality control during initial manufacture.

As explained more fully below, an exemplary system in accordance with this disclosure comprises a cell that includes an automated inspection system and an autonomous or semi-autonomous repair system. In the detailed discussion below, the system has a modular construction, allowing the cell to be broken down and shipped via truck to any location where the cell might be needed. The entire cell can operate based on one 480-V power connection and one 120-psi compressed air connection. It is contemplated that the system might also be deployed as a permanent installation in one or more embodiments.

As explained more fully below, the cell is configured to execute a series of automated and/or user-controlled operations, whereby the cell inspects and then facilitates the repair of the composite part. The cell operates in combination with a database that stores unique records of the inspection data and repairs for every composite part that is addressed by the cell.

Table 1 provides a list of abbreviations that are used in this disclosure.

TABLE 1

| Abbreviations | |
| --- | --- |
| ACID | Atomicity, Consistency, Isolation, Durability |
| ADO | ActiveX Data Object |
| AKAZE | Accelerated KAZE |
| API | Application Program Interface |
| APT | Atmospheric Plasma Treatment |
| AR | Augmented Reality |
| ARBSS | Automatic Rotor Blade Stripping System |
| ARViS | Augmented Reality Visualization System |
| BIM | Blade Inspection Method |
| BIS | Blade Induction Station |
| BLOB | Binary Large Objects |
| BPS | Blade Processing Station |
| BRC | Bond Readiness Check |
| BRISK | Binary Robust Invariant Scalable Key-points |
| BRM | Blade Rotator Mounts |
| BSC | Blade Support Cart |
| CAD | Computer Aided Design |
| CCAD | Corpus Christi Army Depot |
| CCDC | Combat Capabilities Development Command |
| CFRP | Carbon Fiber Reinforced Polymers |
| CNC | Computer Numerical Control |
| CNN | Convolutional Neural-Network |
| COM | Component Object Model |
| CPU | Central Processing Unit |
| CUDA | Compute Unified Device Architecture |
| DA | Door Assembly |
| DBMS | Data Base Management System |
| DIS | Digital Imaging System |
| EF | Entity Framework |
| ESS | Equipment Supply Station |
| E-STOP | Emergency Stop |
| FIPS | Federal Information Processing Standards |
| FISMA | Federal Information Security Management Act |
| FOD | Foreign Object Debris |
| FOV | Field Of View |
| FTIR | Fourier Transform Infrared Spectroscopy |
| GFRP | Glass Fiber Reinforced Polymer |
| GLC | General Lasertronics Corporation |
| GMAW | Gas Metal Arc Welding |
| GPU | Graphics Processing Unit |
| GTAW | Gas Tungsten Arc Welding |
| GUI | Graphical User Interface |
| HAZ | Heat Affected Zones |
| HMI | Human Machine Interface |
| I/O | Input and Output |
| IEC | International Electromechanical Commission |
| JARVIS | Joint Autonomous Repair Verification and Inspection System |
| JCS | Jarvis Control Station |
| KNN | K-Nearest Neighbors |
| LED | Light Emitting Diode |
| LIDAR | Light Detection and Ranging |
| LVDT | Linear Variable Differential Transformers |
| LWA | Lower Wall Assembly |
| MEO | Maintenance Engineering Order |
| MQTT | Message Queueing Telemetry Transport |
| MRB | Main Rotor Blade |
| MRO | Maintenance, Repair and Overhaul |
| MTC | Modular Tool Cartridge |
| NDI | Non-Destructive Inspection |
| NIAR | National Institute for Aviation Research |
| NIST | National Institute of Standards and Technology |
| NTFS | New Technology File System |
| OCR | Optical Character Recognition |
| OPC | Open Platform Communications |
| OPCUA | OPC Foundation's Unified Architecture |
| ORB | Oriented FAST and Rotated BRIEF |
| ORM | Object-Relational Mapping |
| PLC | Programmable Logic Controller |

TABLE 1-continued

| Abbreviations | |
| --- | --- |
| PLM | Product Lifecycle Management |
| PMB | Plastic Media Blasting |
| PMC | Patch Machining Cartridge |
| QC | Quality Control |
| QR | Quick Response |
| RCNN | Regional Convolutional Neural-Network |
| ROI | Region of Interest |
| SAST | Static application security testing |
| SBC | Static Balancing Cart |
| SBF | Static Balance Fixture |
| SDK | Software Development Kit |
| SIFT | Scale-Invariant Feature Transform |
| SIL | Safety Integrity Level |
| SMAW | Shielded Metal Arc Welding |
| SQL | Structured Query Language |
| STIG | Security Technical Implementation Guides |
| SURF | Speeded Up Robust Features |
| TCP | Transmission Control Protocol |
| TDS | Tool Docking Station |
| TRL | Technology Readiness Levels |
| TWI | Thermal Wave Imaging |
| UWA | Upper Wall Assembly |
| WSU | Wichita State University |
| XDR | X-ray Digital Radiography |
| XPS | X-ray Photoemission Spectroscopy |

I. Cell Design

Figure 2:
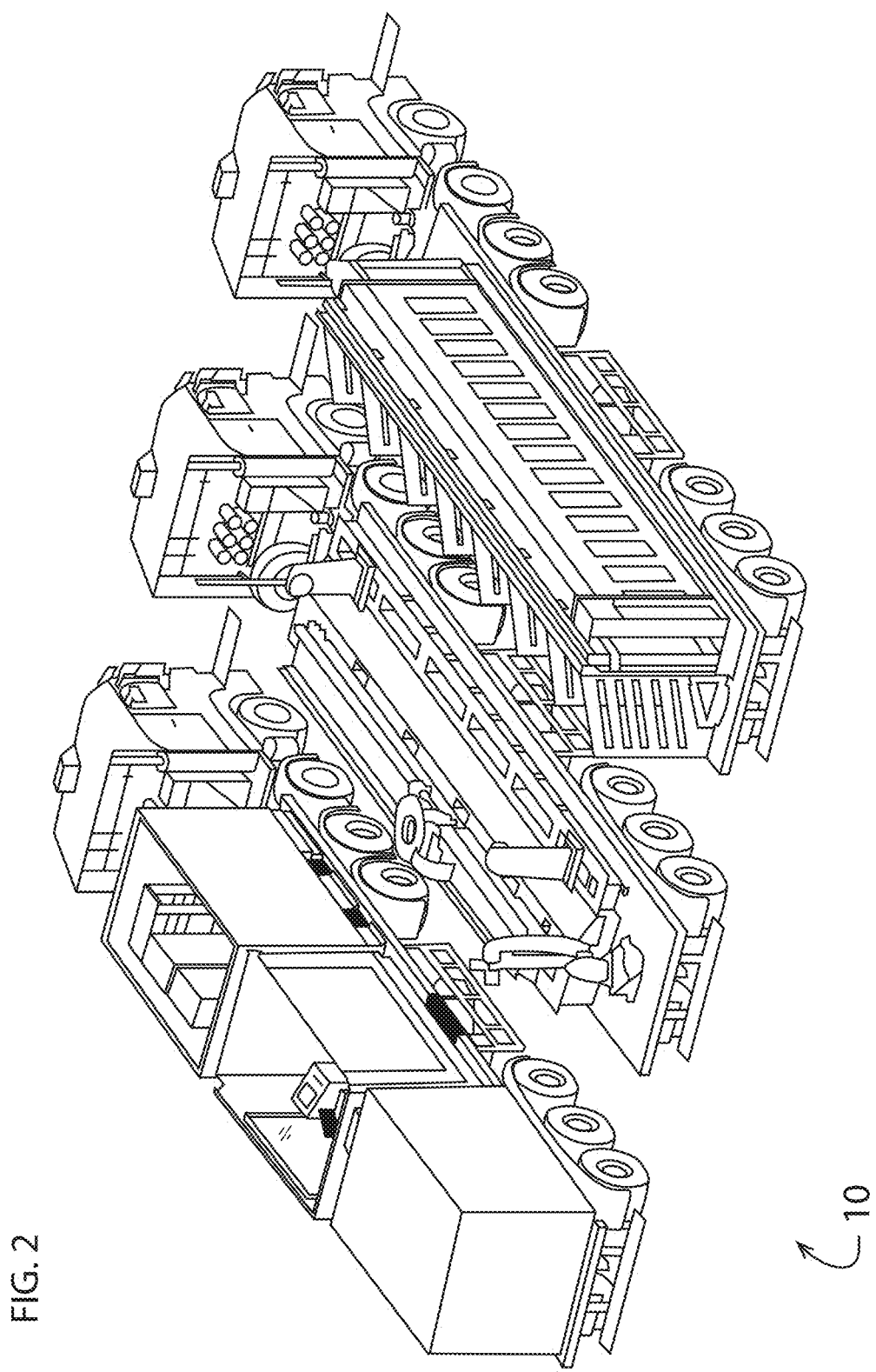
FIG. 2 is a perspective of the JARVIS cell loaded onto three flatbed trucks in a transport configuration.

Referring to FIGS. 1-4, an exemplary embodiment of a joint autonomous repair verification an inspection system (hereinafter, JARVIS) cell is generally indicated at reference number 10. FIG. 1 shows the JARVIS cell 10 deployed on site, and FIG. 2 shows the JARVIS cell broken down onto three flatbed trailers for transport. Design elements for the illustrated JARVIS cell are based on intended platform size and features (e.g., the size of the cell is driven by the application-specific needs of inspecting large main rotorcraft blades). It will be understood that other embodiments can be sized appropriately for other applications.

In general, the JARVIS cell 10 comprises a blade processing station 20 (hereinafter, BPS) (broadly, a 'part processing station'), a blade induction station 30 (hereinafter, BIS) (broadly, a 'part induction station'), a tool docking station 40 (hereinafter, TDS), an equipment supply station 50 (hereinafter, ESS), a control station 60 (hereinafter, JCS), a support cart 70 (hereinafter, BSC), a set of modular tool cartridges 110, and a patch machining cartridge 160 (hereinafter, PMC). All stations can be manufactured, stored, and shipped independently to adhere to shipping size constraints. As shown in FIG. 2, in one or more embodiments, the total truck requirement for shipment is three flatbed trucks. With this configuration, MTCs 110, PMC 160, JCS 60 and ESS 50 will be transported on truck one. Truck two will transport the BPS 20 and industrial robot that has been removed from the BPS track system (discussed below). Truck three transports the BIS 30 and TDS 40. All delicate instruments can be removed from the MTCs 110 and other cell locations to ensure no damage occurs during transit.

The BPS 30 broadly comprises a robot configured to reach the full length and width of the part. The support cart 70 is configured to support the part in the JARVIS cell 10 and facilitate transport of the part into and out of the cell. The part and the support cart 70 move into and out of the JARVIS cell through the BIS 30. And BIS 30 is configured to selectively close the JARVIS cell 10 to meet the required safety specifications of the inspection and repair operations taking place therein. The TDS 40 defines a plurality of tool docks 41 with which the modular tool cartridges 110 are configured to connect. Each modular tool cartridge 110 contains a tool (described below) that can attach to the end of the robot for performing an inspection or repair operation. The modular tool cartridges 110 include robotic end effectors for non-destructive testing, such as a camera, a laser three-dimensional scanner, a pulsed thermography end effector, and a shearography end effector, as well as a milling end effector, an atmospheric plasma generator (broadly, a surface preparation end effector), a composite surface preparation verification system, and a laser ablation end effector. The power and compressed air connections are made at the ESS 50, and the human operator is stationed within the control station 60 to operate/monitor the JARVIS cell 10. Through a series of automated and/or user-controlled operations, the JARVIS cell 10 is configured to inspect and then facilitate the repair of the composite part. The JARVIS cell 10 operates in combination with a database that stores unique records of the inspection data and repairs for every composite part that is addressed by the cell.

1. Blade Processing Station

Figure 3:
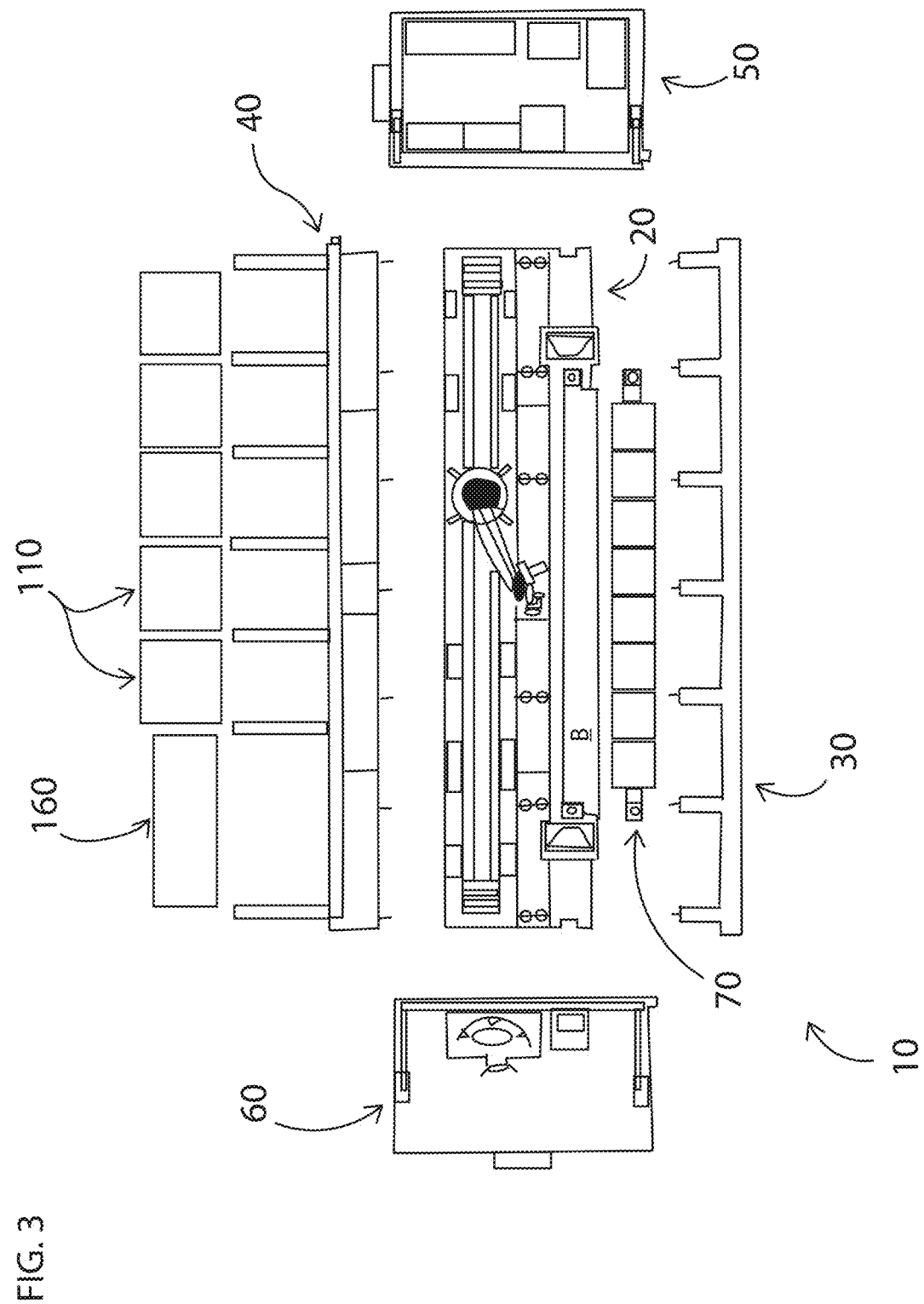
FIG. 3 is an exploded top plan view of the JARVIS cell.
Figure 4:
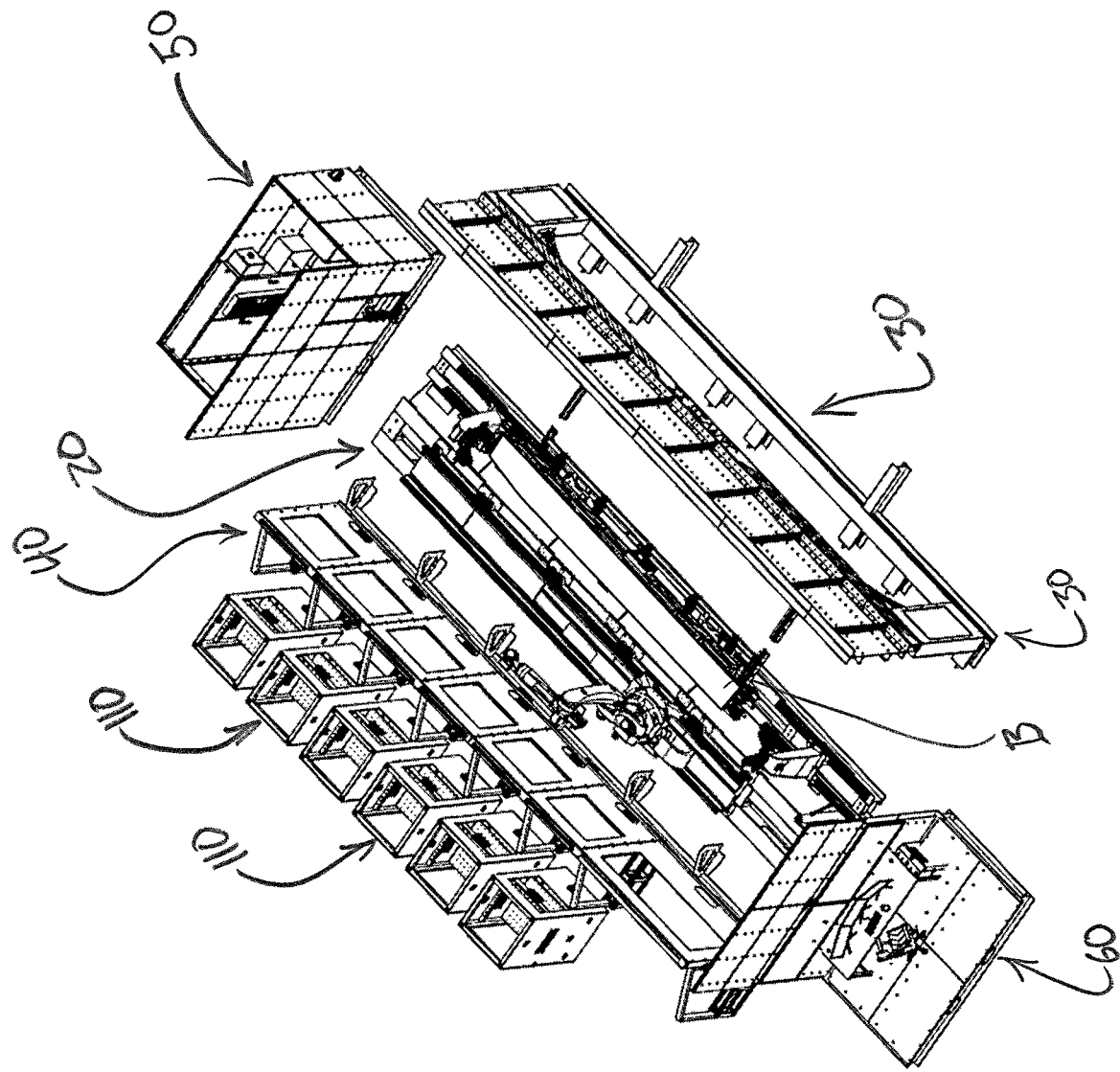
FIG. 4 is an exploded perspective of the JARVIS cell
Figure 5:
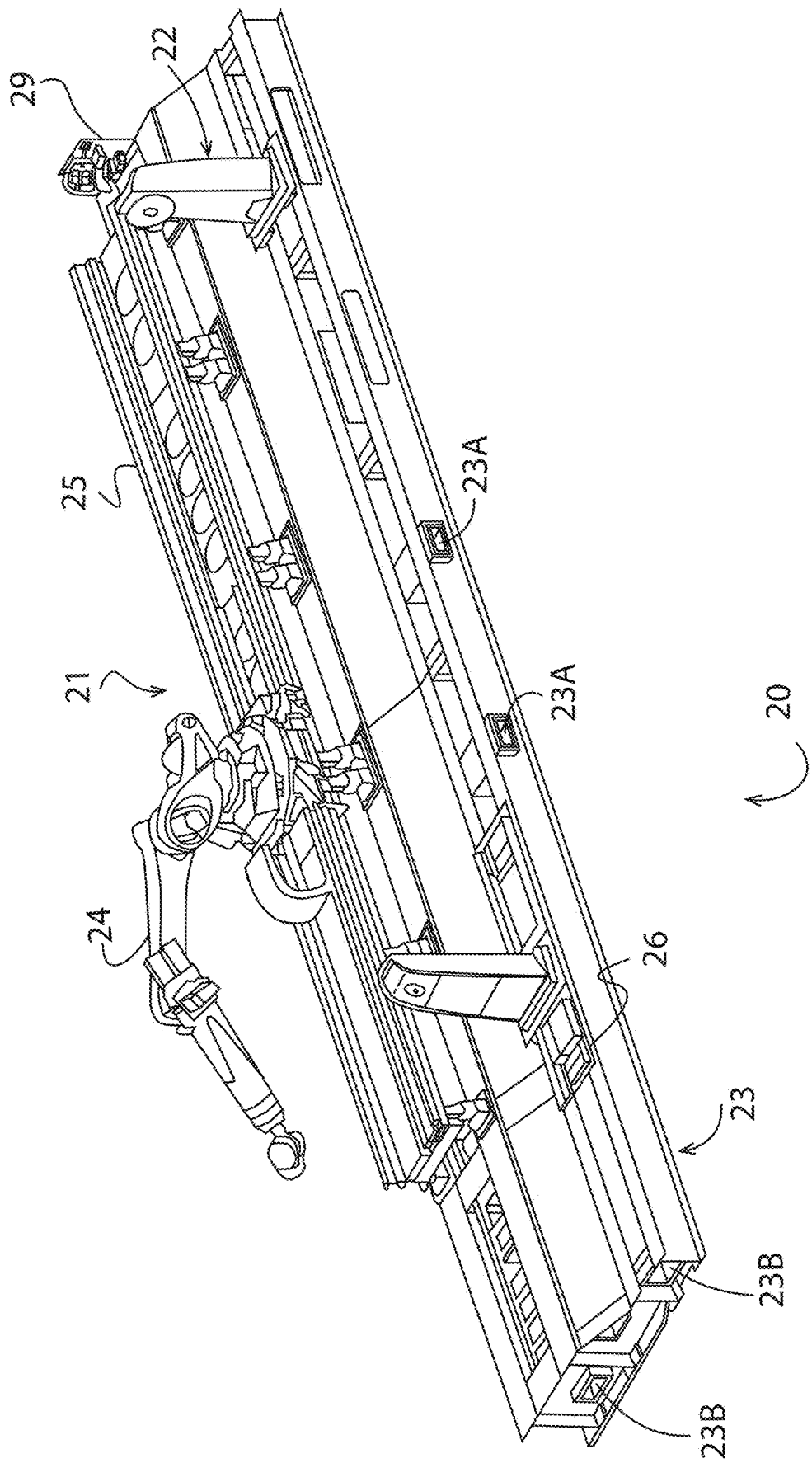
FIG. 5 is a perspective of a blade processing system (BPS) of the JARVIS cell.
Figure 6:
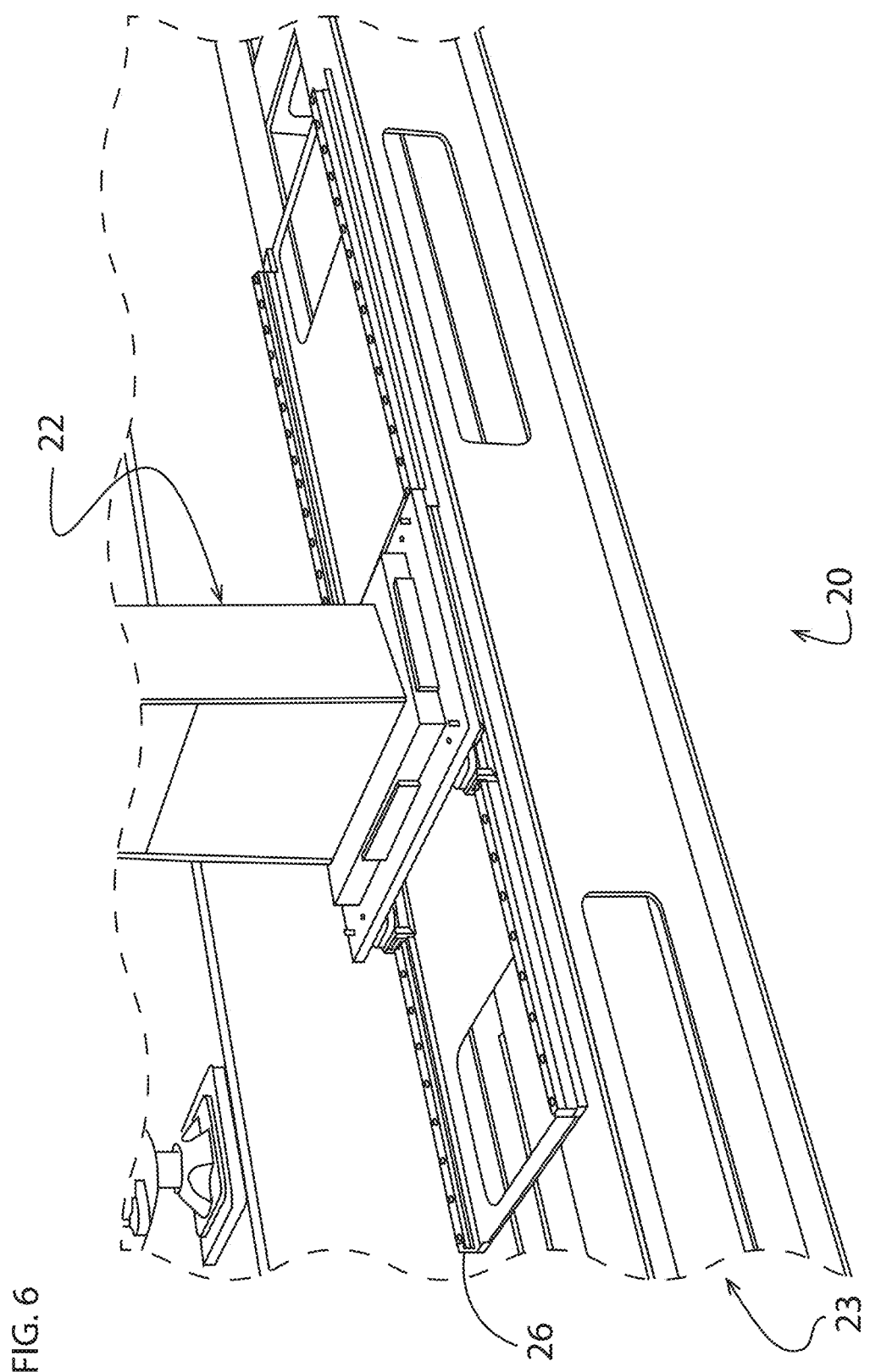
FIG. 6 is an enlarged fragmentary view of a portion of the BPS showing tailstock rails thereof.

The illustrated BPS 20 is located centrally in the JARVIS cell 10 as shown in FIGS. 3 and 4. The BPS 20 houses the robot and rotational positioners that the composite part will attach to upon cell ingress. Additionally, all other cell components fasten to the BPS 20 and attach strictly to support operations of this station. Referring to FIG. 5. the BPS 20 comprises three primary elements: a robot and track assembly 21; rotational positioners 22; and a fixed base 23.

In an exemplary embodiment, the robot and track assembly 21 comprises a multi-axis industrial robot 24 mounted on a track system 25. In the illustrated embodiment, the robot 24 comprises a KUKA KR210 R3100 robot and the track system 25 comprises a KUKA KL4000 track system, but it will be understood that other industrial robots and track systems could also be used without departing from the scope of the disclosure. The robot 24 is configured to perform all actions in the JARVIS cell 10. The robot 24 features at least a 100-kg (e.g., about a 210-kg) payload capacity with a maximum reach of at least 1500 mm (e.g, about 3100 mm). While the illustrated robot 24 could be rigidly mounted at the blade mid-span and still reach the full length of the composite parts for which the illustrated JARVIS cell 110 is intended (e.g., the robot arm 24 can reach the inboard cuff and outboard blade tip), a stretched system would hinder tolerance, rates, and most processes. Thus, in one or more embodiments, the robot 24 is mounted on the linear track system 25. The illustrated track system 25 has a length of at least 6 meters (e.g., about 9 meters), which allows for optimized tool path generation, and increased accessibility to required work zones. A tool changer, such as a QC210 tool changer, is mounted on the end of the robot 24 so that the robot can selectively connect to any of the tools stored in the modular tool cartridges 110, or elsewhere within the JARVIS cell 10, as will be described in further detail below.

The rotational positioners 22 are broadly configured to rotate the composite part about an axis of rotation in relation to the BPS 20. In the illustrated embodiment, the rotational positioners 22 comprise KUKA KP1-H rotational positioners, which have the ability to support payloads as high as 250-kg (551-lb), although other rotational positioners can also be used in other embodiments. In one or more embodiments, one or both rotational positioners 22 are adjustable lengthwise with respect to the base 23, e.g., via a series of tailstock rails 26. The tailstock rails 26 allow for flexible adjustment and fitment for rotorcraft blades spanning 250-inches to 340-inches.

Figure 7:
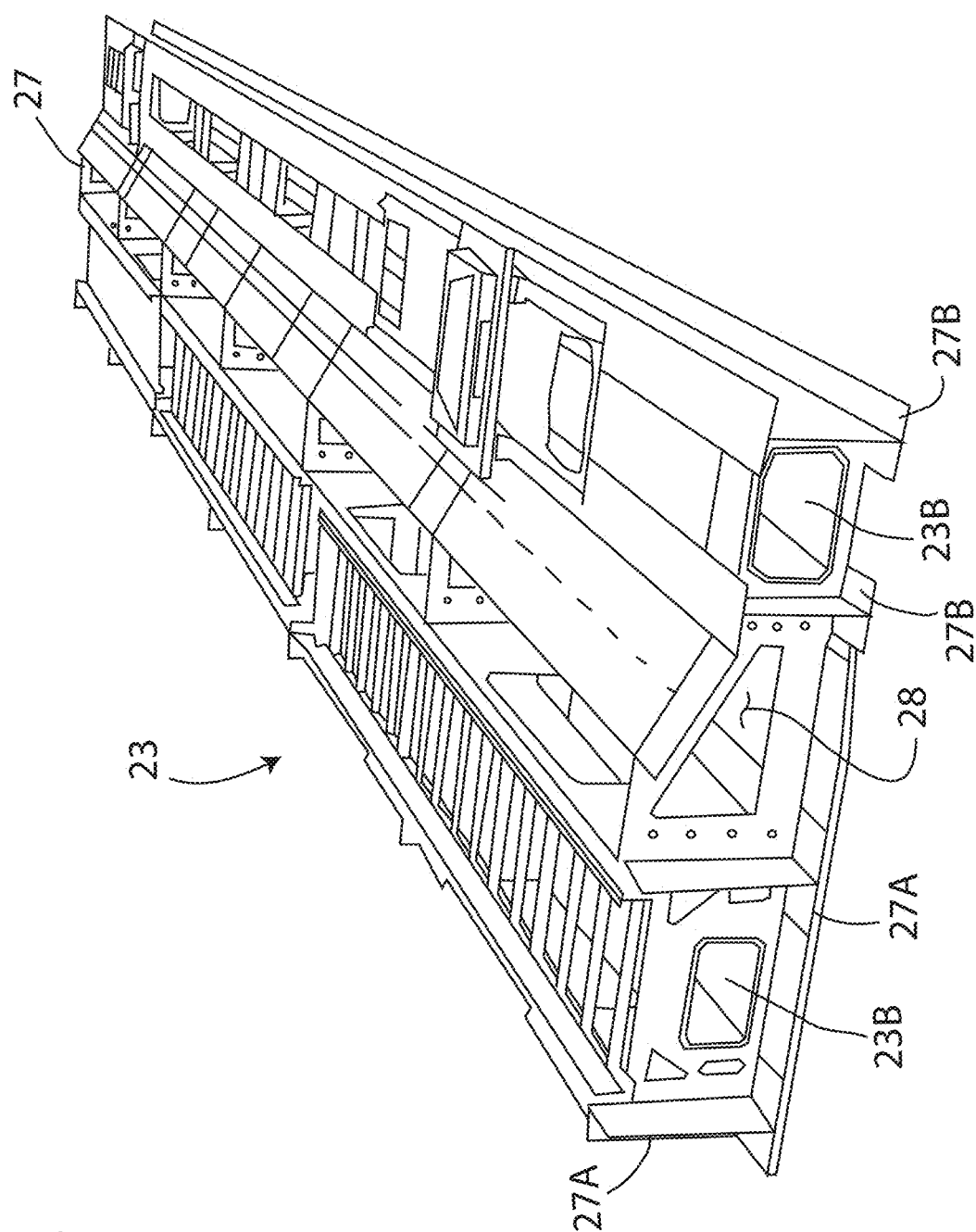
FIG. 7 is a perspective of a base assembly of the BPS.
Figure 8:
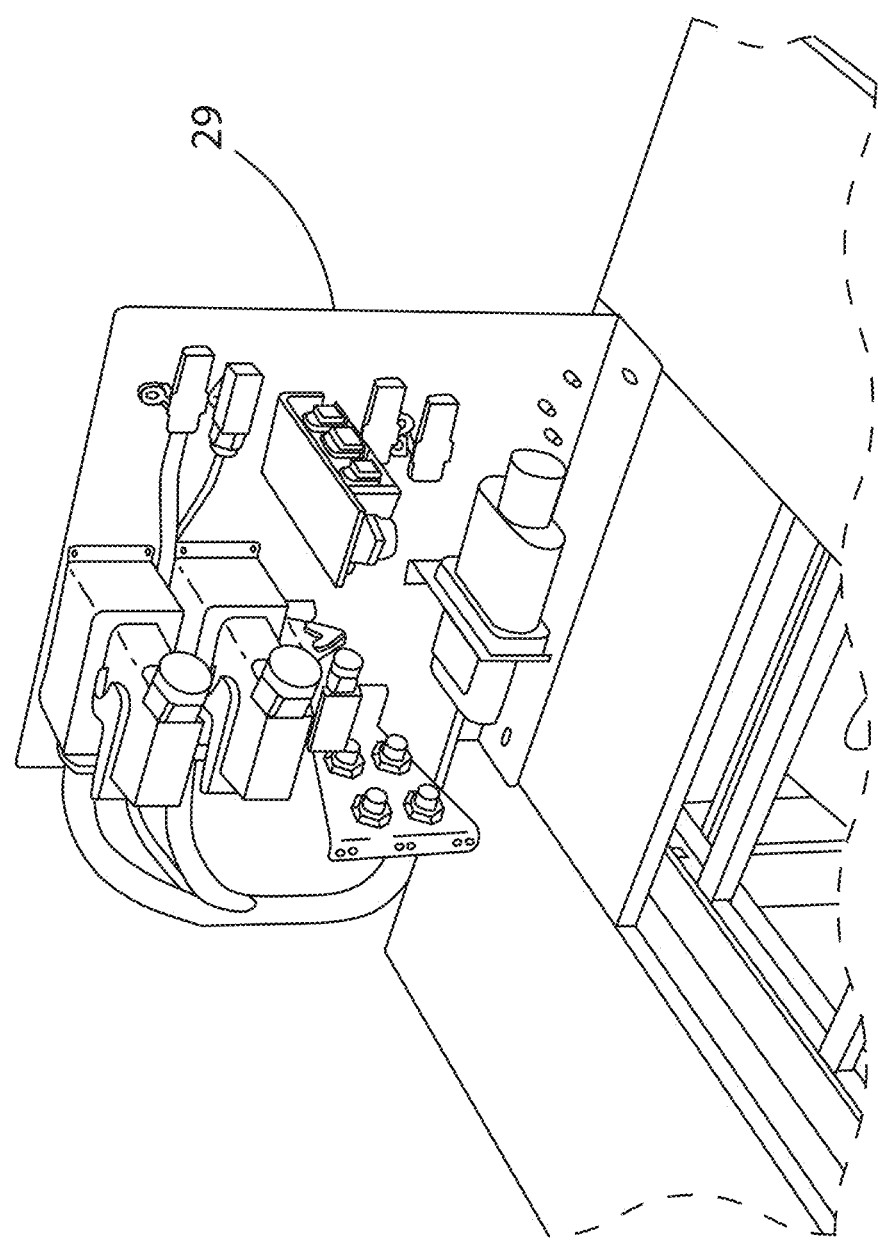
FIG. 8 is an enlarged fragmentary perspective of a cabling hub of the BPS.

Referring to FIGS. 7 and 8, the fixed base 23 comprises a robot and positioner support 27, wire channels 28, and a central wire connection hub 29. The robot and positioner support 27 is the primary structure for all station attachment. Thus, the robot and positioner support 27 suitably has a rigid construction for both safety and tolerance holding. To achieve required rigidity, e.g., ±0.005-inches of movement, all sub-elements can be joined using shielded metal arc welding (SMAW) or other suitable method for making very rigid connections. In the illustrated embodiment, the sub-elements of the support 27 feature two beams 27A (e.g., W24×104 wide flange steel beams) for track mounting and two beams 72B (e.g., W14×53 wide flange steel beams) for the rotational positioner and adjustable tailstock mounting. All other sub-elements can be machined from steel plates, tacked in place, and welded out upon completion. The wire channels 28 can support an extensive amount of control and power wires as required for all station operations. All of the wired connections for the JARVIS cell 10 can be managed through connection hub 29. All necessary power and accessories are supplied through this hub 29 and support both energy and pneumatics to individual stations and components. In the illustrated embodiment, the BPS 20 is transportable onsite via forklift. The base 23 is suitably equipped with single-point forklift openings 23A (FIG. 5) and/or multi-point forklift openings 23B (FIGS. 5, 7) to facilitate transport.

When the JARVIS cell 10 is being transported from one site to another, the robot 24 will be removed from the track system 25 and shipped separately. The track system 25 and the rotational positioners 22 can remain mounted on the base 23 during transport. The base 23 suitably fills one flatbed trailer without requiring oversized load permits.

To facilitate onsite deployment, the BPS 20 suitably comprises features that maintain parallelism and uniform height between the robot/track 24, 25 and the rotational positioners 22, in one or more embodiments. For example, in one or more embodiments, the BPS 20 comprises built-in adjustment points for all high tolerance attachment points. In certain embodiments, laser trackers can be used to determine final location of all elements.

2. Blade Induction Station

Figure 9:
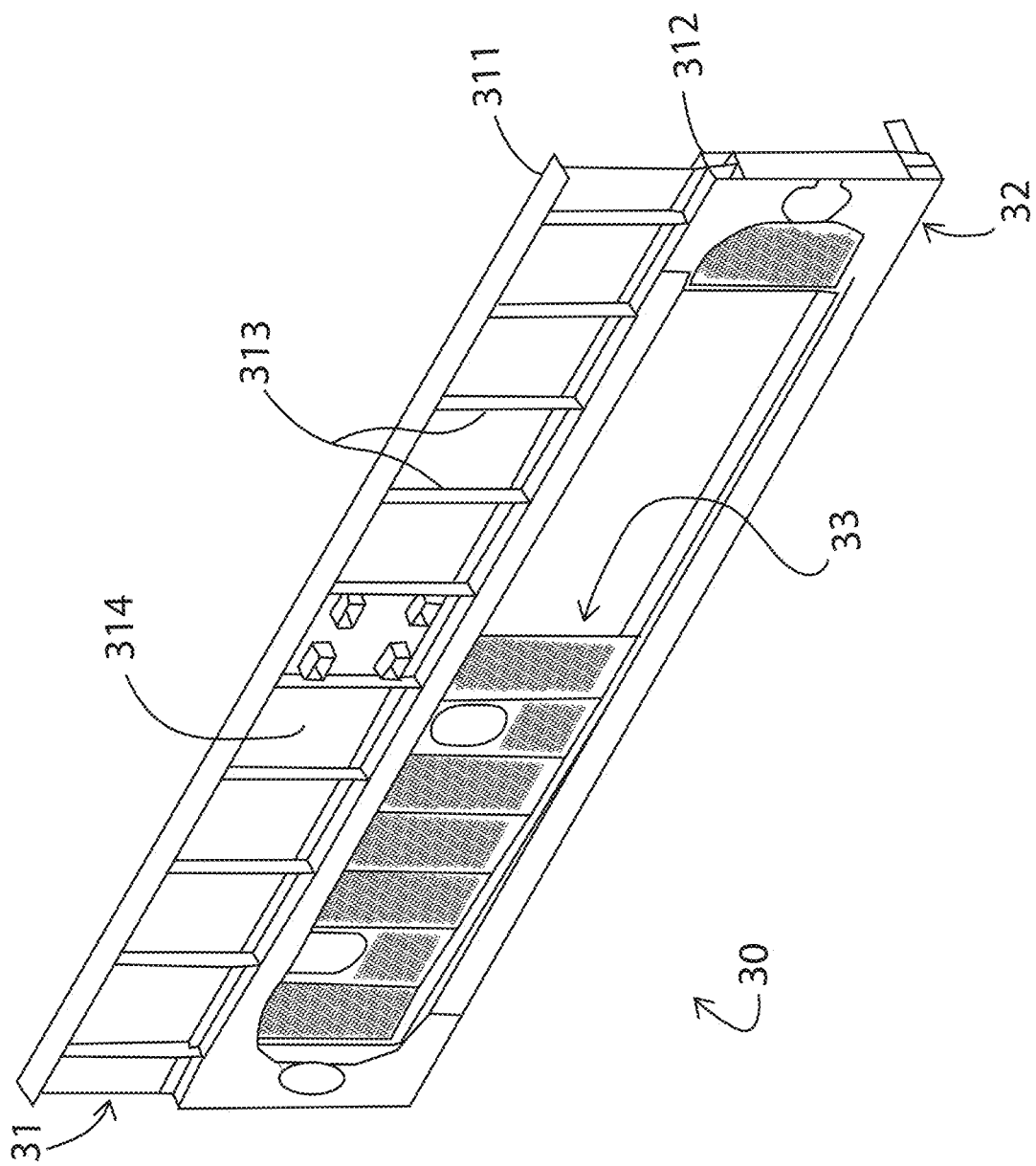
FIG. 9 is a perspective of a blade induction system (BIS) of the JARVIS cell.

Referring to FIG. 9, the primary function of the BIS 30 is to allow safe enclosure of the robotic operations while permitting ingress and egress of the composite part, in this case a main rotor blade of large rotorcraft such as a helicopter. The BIS 30 comprises three primary elements: an upper wall assembly 31 (hereinafter, UWA); a lower wall assembly 32 (hereinafter, LWA); and a door assembly 33 (DA).

The UWA generally comprises upper and lower flange portions 311, 312 connected by vertical stiffeners 313 and panels 314 between the stiffeners. The UWA 31 has two primary functions. First, the UWA 31 is configured to house light systems that provide visual indications of system status for safety of operators and other laboratory staff. In one or more embodiments, the lighting system comprises lighting elements integrated into the vertical stiffeners 313. For example, the lighting system can comprise LED strip lighting passed through an opaque acrylic diffuser and a clear acrylic sheet to provide a glowing effect at each stiffener 311. The second function of the UWA 31 is to serve as a large stiffener to the upper portion of the LWA 32, which spans the entirety of the cell length and is subject to large bending loads warranting additional support.

Figure 10:
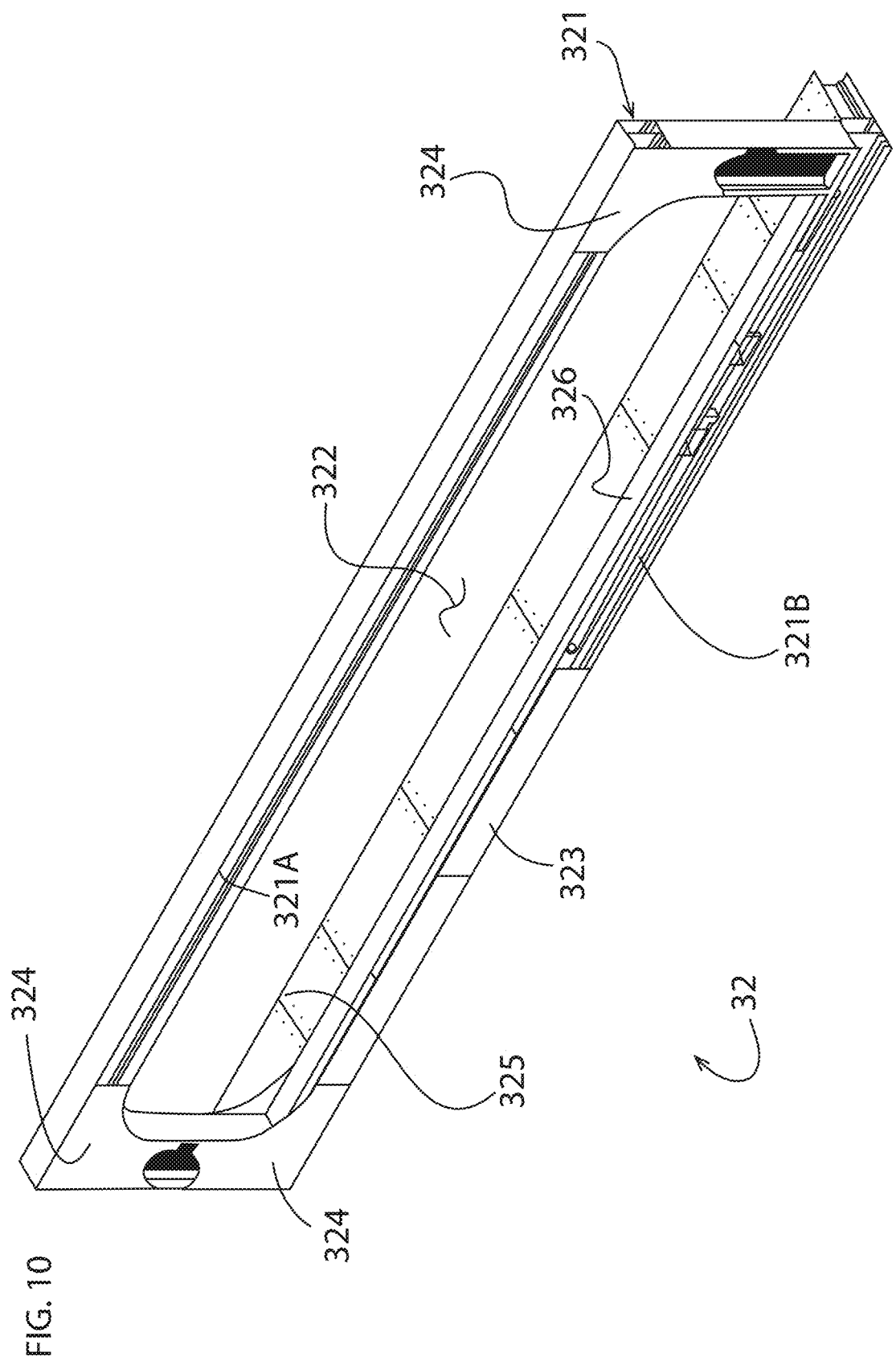
FIG. 10 is a perspective of a lower wall assembly of the BIS.

Referring to FIG. 10, the LWA 32 is broadly configured to house the DA 33 and thus serves to allow smooth operation of the sliding door system. In general, the LWA comprises a framework of I-beams 321 that define a doorway 322. The framework 321 includes an upper I-beam 321A and a lower I-beam 321B that span the entire length of the cell 10. Various covering panels 323 are attachable to the framework 321. In addition, gusset panels 324 can be rigidly attached to the framework for support. The LWA 32 also defines an entry floor portion 325 of the JARVS cell 10 behind the frame 321. The framework 321 supports a door track 326 for slidably supporting to the DA 33.

In one or more embodiments, the LWA 32 is assembled using both mechanical fastening and gas metal arc welding (GMAW). In certain embodiments, all I-beam web and angle elements are made from varying thicknesses of aluminum and can be joined using GMAW. The lower flange of the lower I-beam 321B and the upper flange of the upper I-beam 321A can also be joined through welding. Half of the upper flange of the lower I-beam 321A and half of the lower flange of the upper I-beam 321B can be welded and then a steel plate can be fastened to the aluminum flange. This will allow technicians to weld the sliding door track 326, made, for example, of stainless steel to the flange using gas tungsten arc welding (GTAW). To provide increased support for the long spanning upper I-beam 321A, aluminum gussets 324 can also be mechanically fastened to the vertical I-beams of the framework 321 and then to the upper or lower I-beam 321A, 321B. To support technician entrance into the cell 10, the entry floor portion 325 can comprise aluminum floor elements supported using welded aluminum I-beams as constructed for the lower and upper I-beams 321A, 321B.

Figure 11:
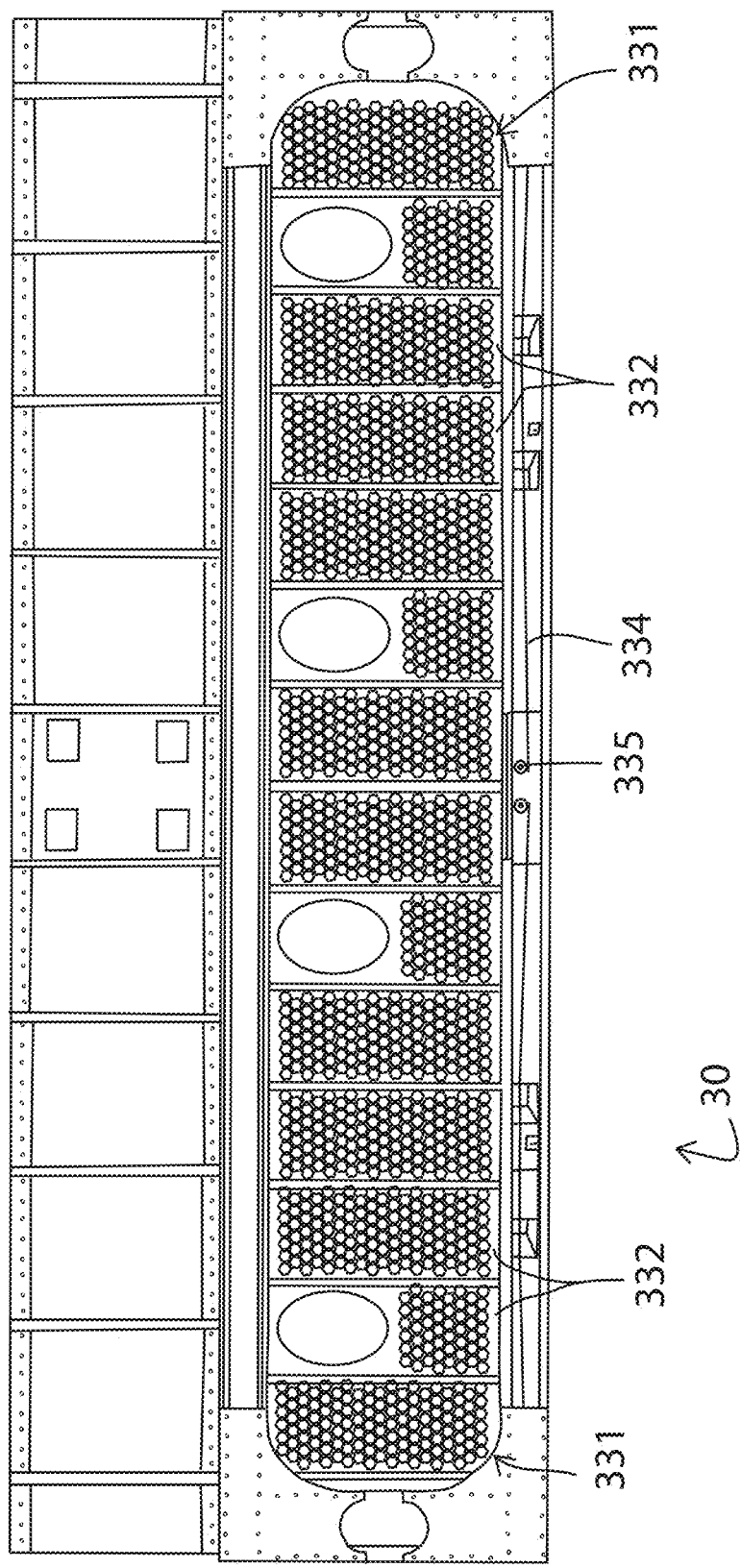
FIG. 11 is an elevation of the BIS in a closed configuration.
Figure 12:
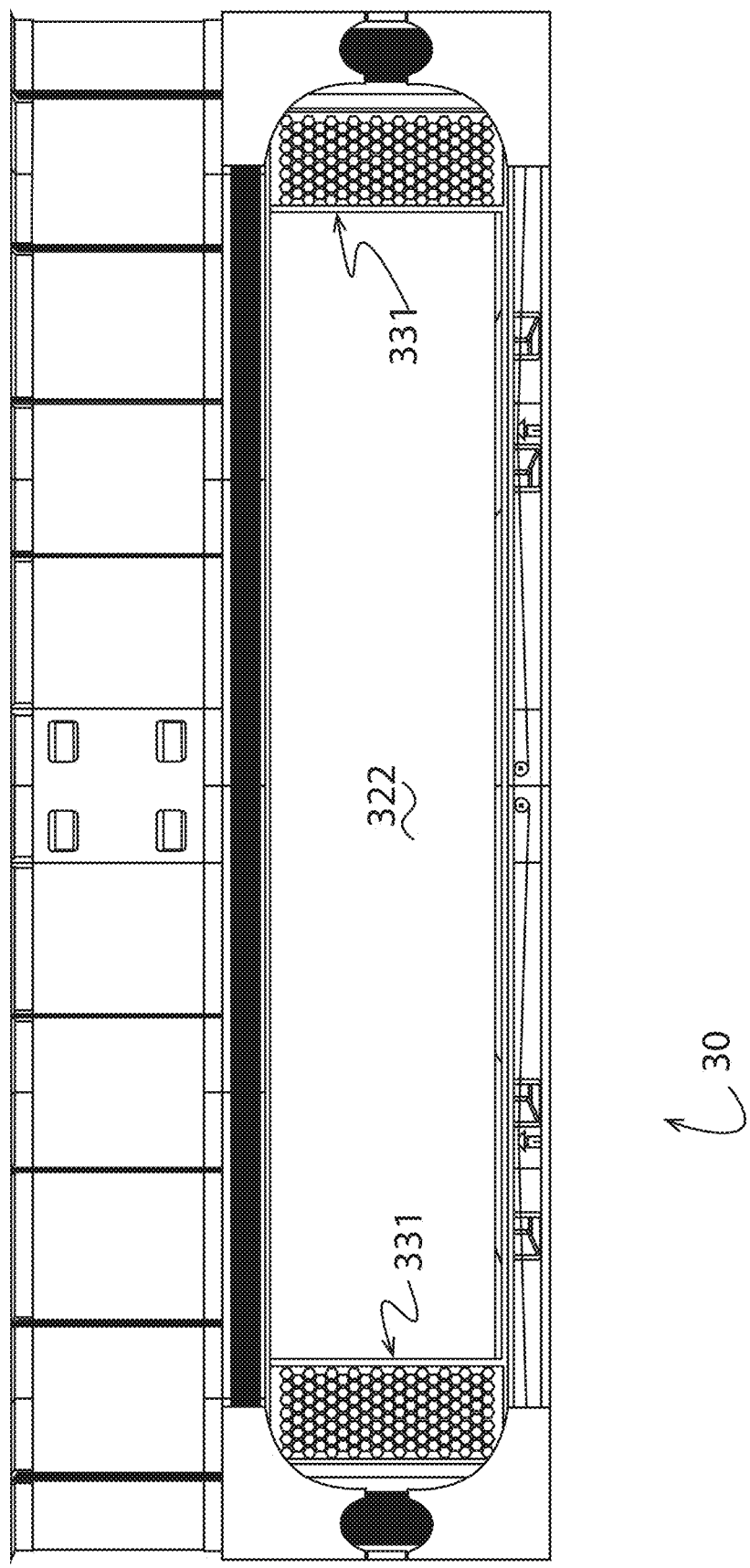
FIG. 12 is an elevation of the BIS in an open configuration.
Figure 13:
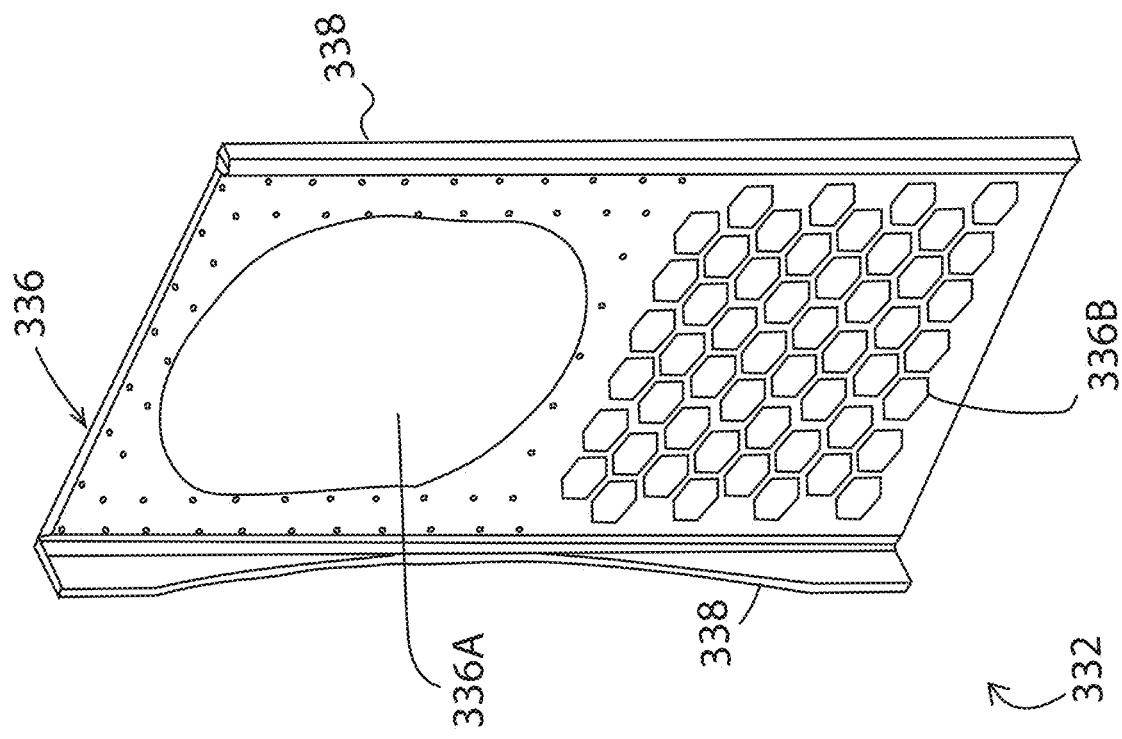
FIG. 13 is a perspective of a door member of the BIS.

Referring to FIGS. 11-12, the DA 33 comprises a motorized door that is selectively adjustable between a closed position (FIG. 11) and an open position (FIG. 12). The illustrated DA 33 comprises a sliding door unit, more particularly left and right siding door units 331. In the illustrated embodiment, each sliding door unit 331 comprises seven individual door member 332. Other door units will have other constructions to meet the particular dimensional constraints of the application. A drive motor (not shown) is connected to each of the door units 331 via a chain 334 and sprockets 335 for selectively sliding the panels to open and close the DA 33. Referring to FIG. 13, each individual door member 333 comprises a door panel 336 (e.g., 125-inch aluminum sheet that sandwiches an impact resistant polycarbonate core), upper and lower rollers (not shown) for sliding on the door frame 321, and stiffeners 338 (e.g., polymer core stiffeners) for rigidity. The stiffeners are positioned to allow each door to push the adjacent door toward opened or closed when the motor is actuated. Each door panel 336 is optionally fitted with impact glass 336A and/or laser glass 336B.

Figure 14:
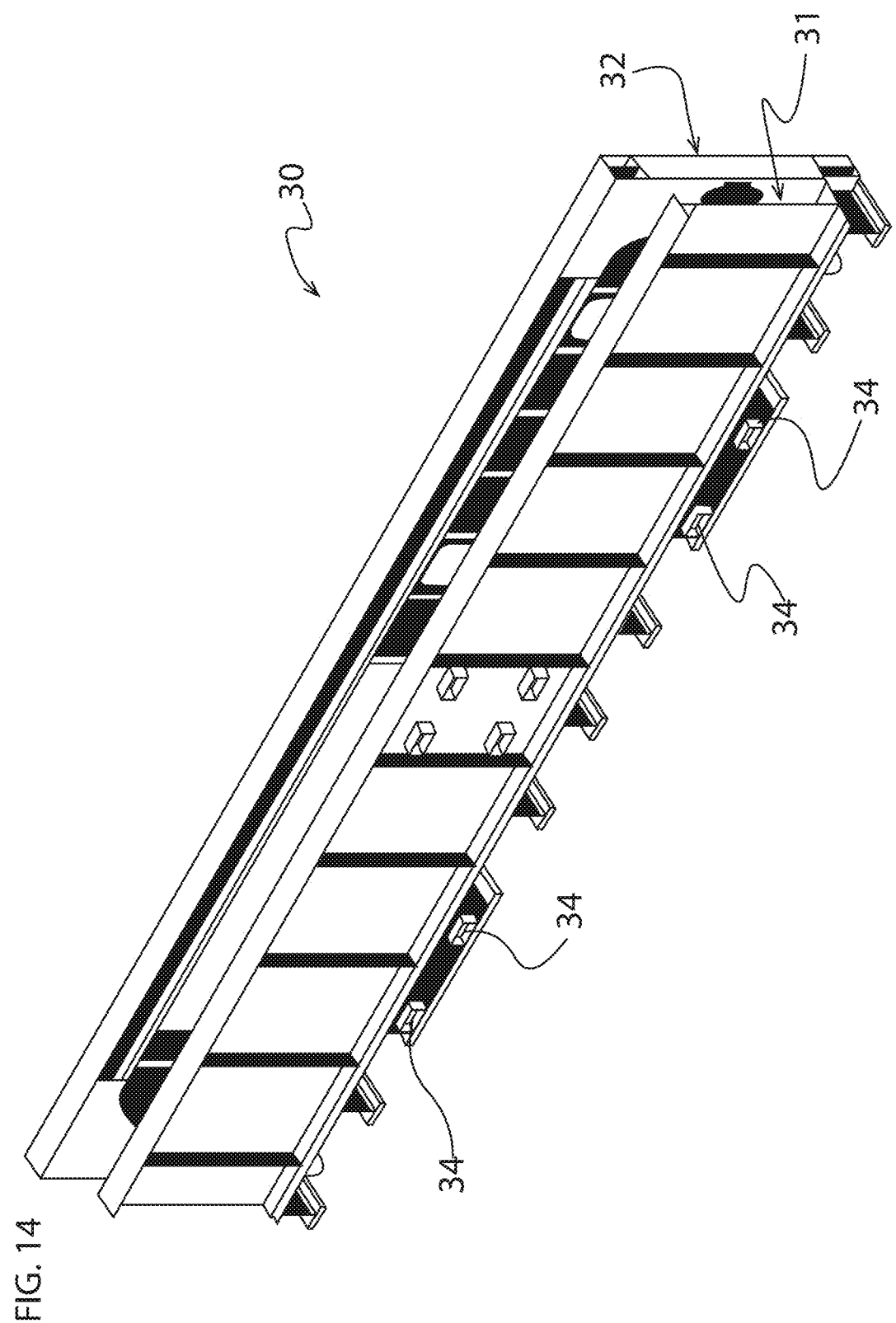
FIG. 14 is a perspective of the BIS in a transport configuration.

Referring to FIG. 14, the illustrated BIS 30 features lift locations 34 along the lower I beam and below the entry floor portion 325. Upon decision to transport, the fasteners connecting the UWA 31 to the LWA 32 are removed. The transport team will then forklift the UWA 31 onto the floor portion 325 of the LWA 32 and reinstall fasteners for holding the UWA in pace on the floor as shown in FIG. 14. The team then removes the fasteners attaching the BIS 30 to the BPS 20 and removes the cover plates 323 on the LWA 32 lower I-beam 321B. In some embodiments, two forklifts will lift the BIS 30 to the waiting transport vehicle. In one or more embodiments, to ensure a tight seal of the DA 30 for laser safety purposes, the BIS 30 incorporates 0.250-inch thick rubber pads at all contact points. This low durometer rubber is believed to allow for an airtight seal between individual door assemblies.

3. Tool Docking Station

Figure 15:
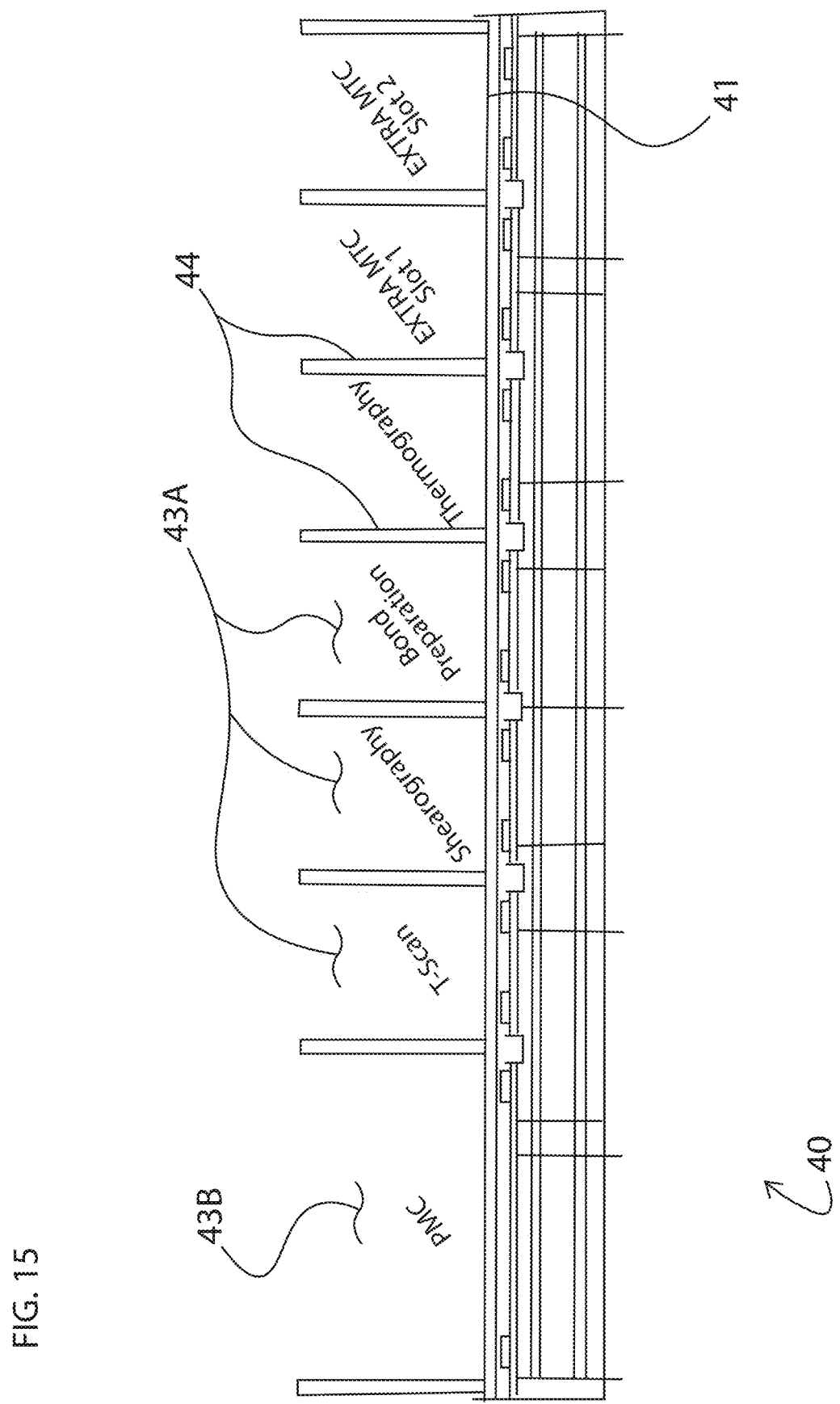
FIG. 15 is a top plan view of a tool docking station (TDS) of the JARVIS cell.
Figure 16:
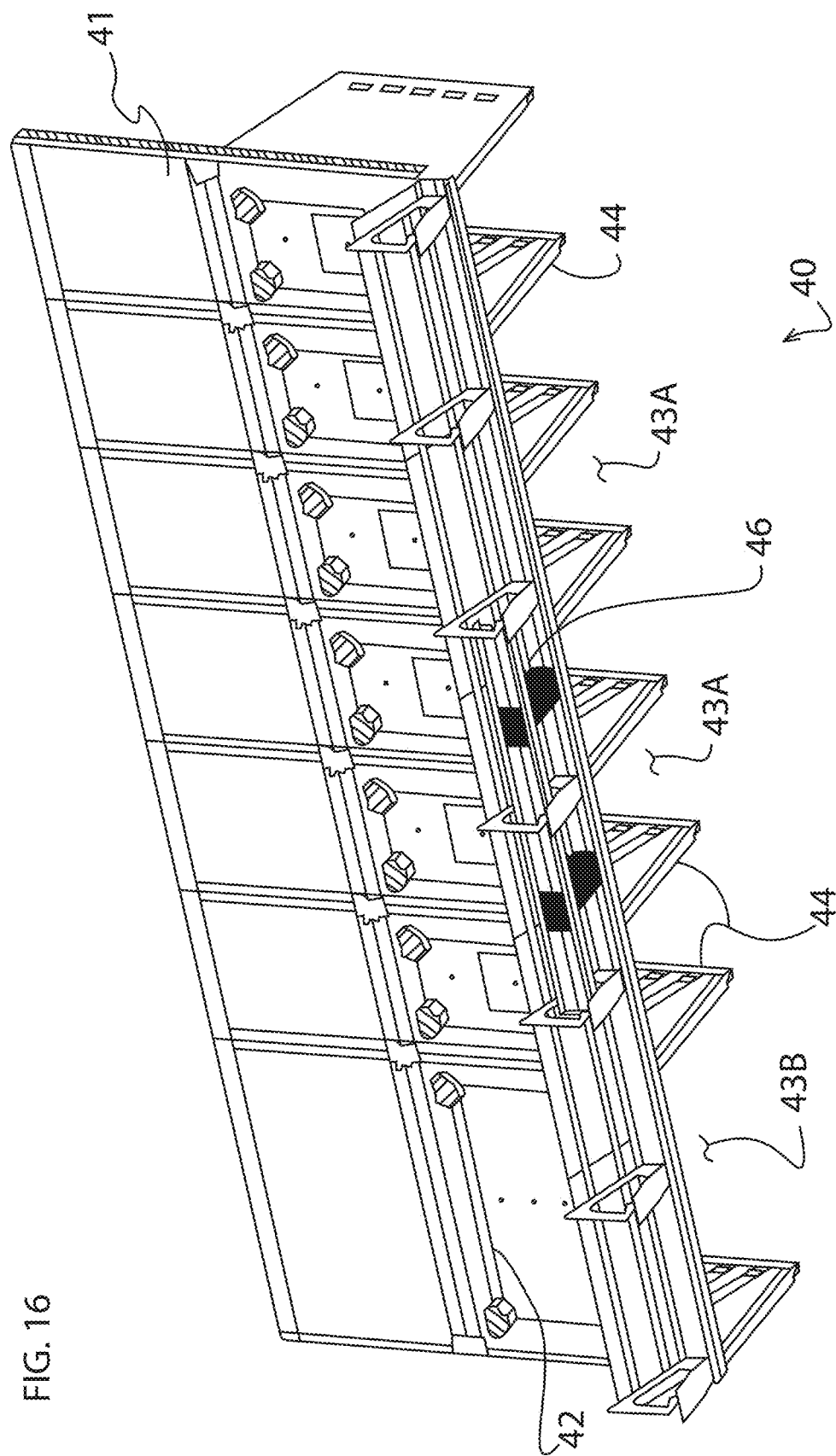
FIG. 16 is a perspective of the TDS.
Figure 17:
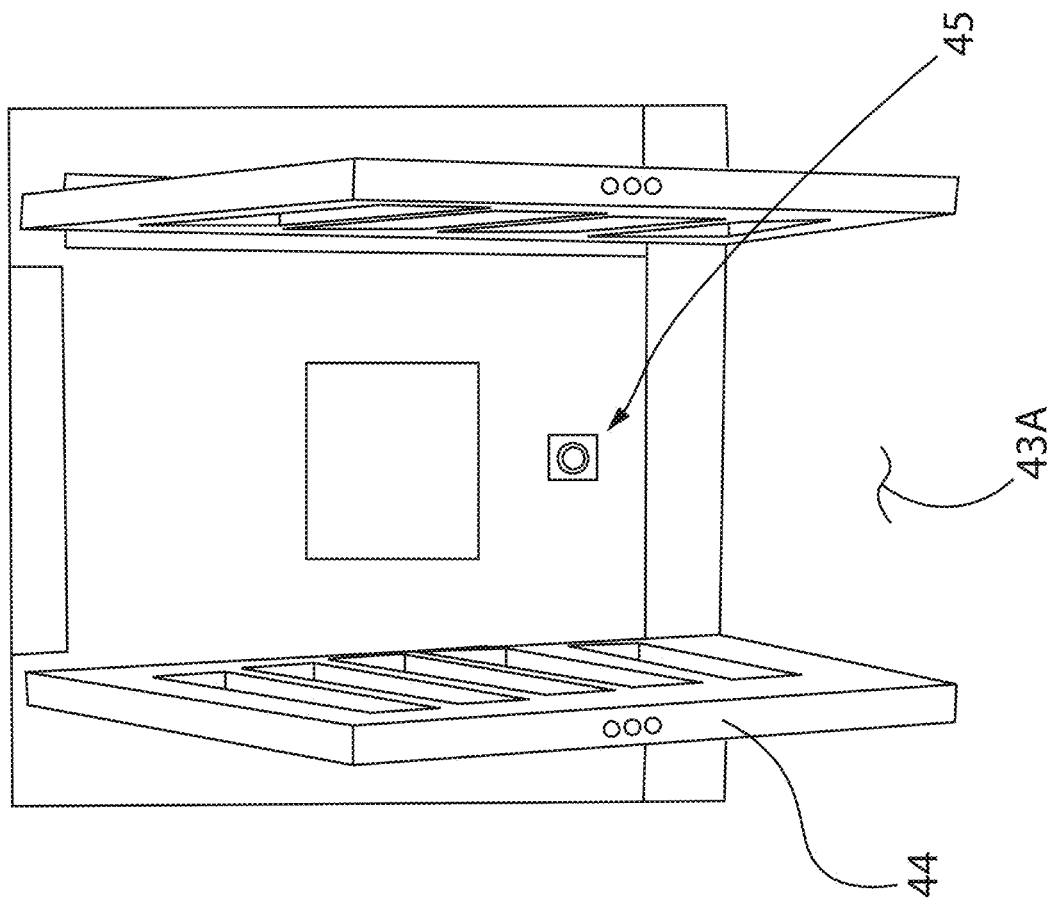
FIG. 17 is an enlarged fragmentary perspective of the TDS.

Referring to FIGS. 15-17, the TDS 40 is broadly configured to mount onto the BPS 20 opposite the BIS 10. The TDS 40 generally comprises a front wall 41 having a plurality of individual motorized doors 42 that are selectively opened to provide access to a corresponding number of tool slots 43A, 43B located behind the front wall. In FIGS. 15-16 the TDS 40 comprises seven total slots, including six MTC slots 43A and one PMC slot 43B. But other numbers of tool or cartridge slots are also possible without departing from the scope of the disclosure. The slots 43A, 43B are separated by stall walls 44 that provide guided entry of the MTCs 110 and PMC 160 for quick attachment and detachment. Each slot 43A, 43B comprises a master tool changer fitting 45 that is configured to operatively connect the JARVIS cell 10 to an MTC 110 or PMC 160 loaded into the slot. Upon connection of a tool changer fitting 45, the JARVIS cell 10 is configured to automatically recognize the type of tool that has been connected so that the cell can operate the robot 24 to deploy the tool.

Figure 18:
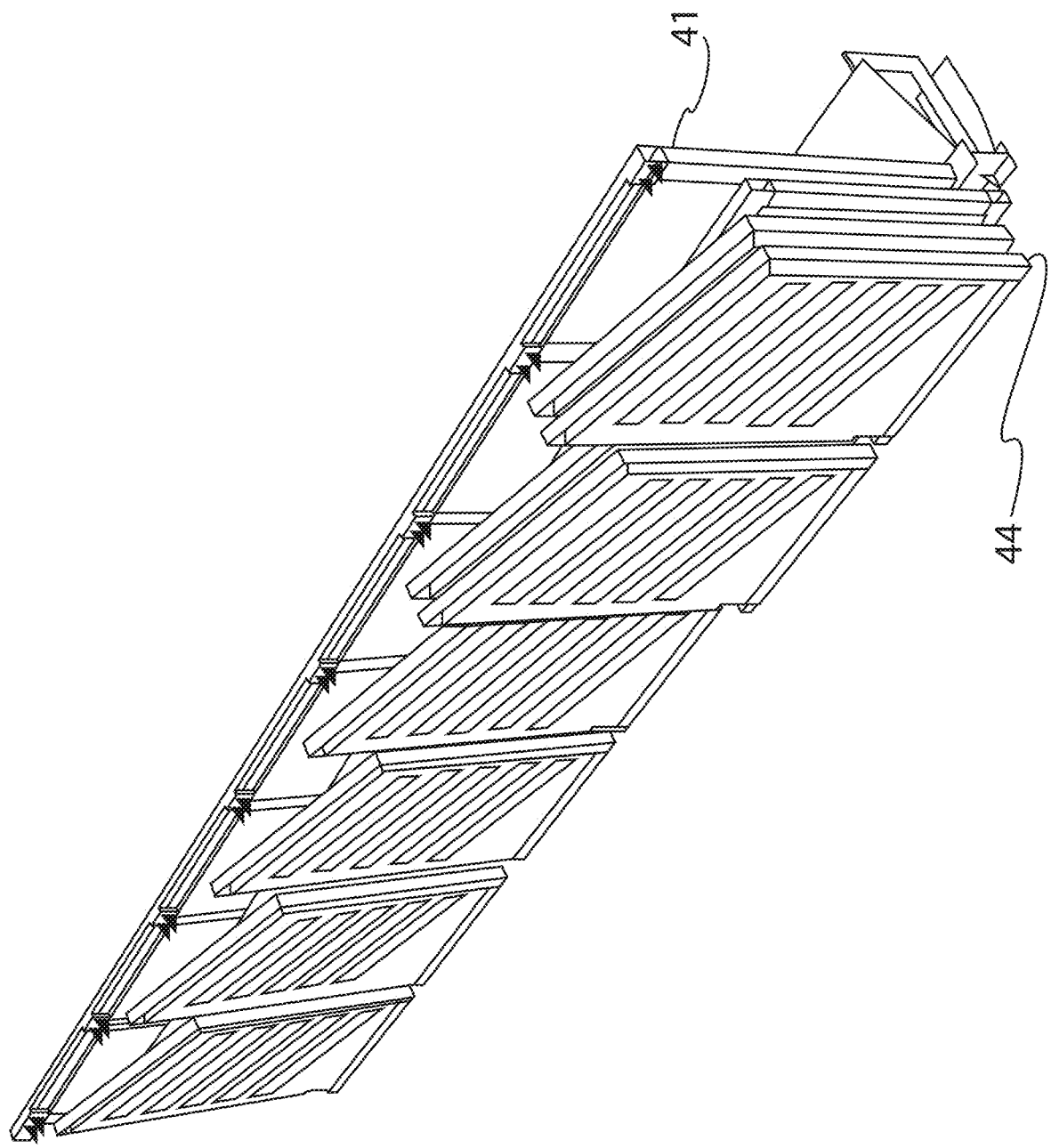
FIG. 18 is a perspective of the TDS in a transport configuration.

Upon decision to transport, all MTCs 110 and the PMC 160 are removed from the TDS. The transport team will then detach the mechanically fastened connection between the TDS 40 and the BPS 20. A single forklift can use fork lift openings 46 to lift the TDS 40 to the transport vehicle. As shown in FIG. 18, the stall walls 44 are collapsible against the front wall 41 for transport. Suitably, the transport-ready TDS shown in FIG. 18 can be shipped on a flatbed trailer without an oversized load permit.

4. Equipment Supply Station

Figure 19:
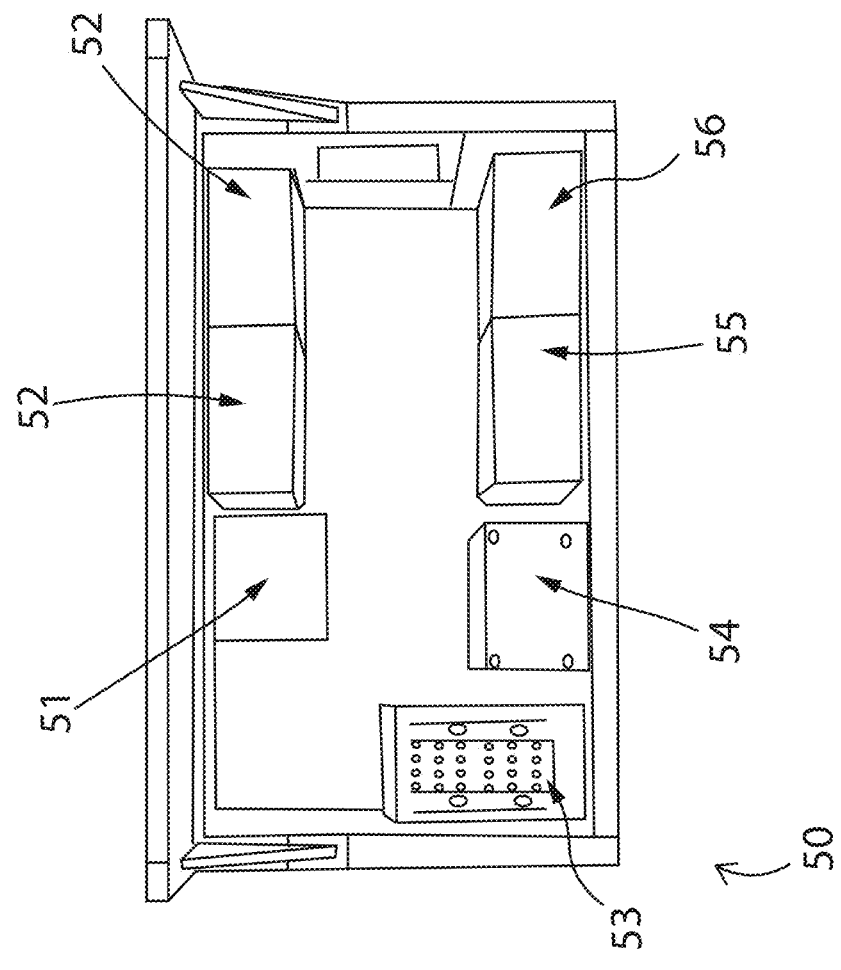
FIG. 19 is a top plan view of an equipment supply station (ESS) of the JARVIS cell.
Figure 20:
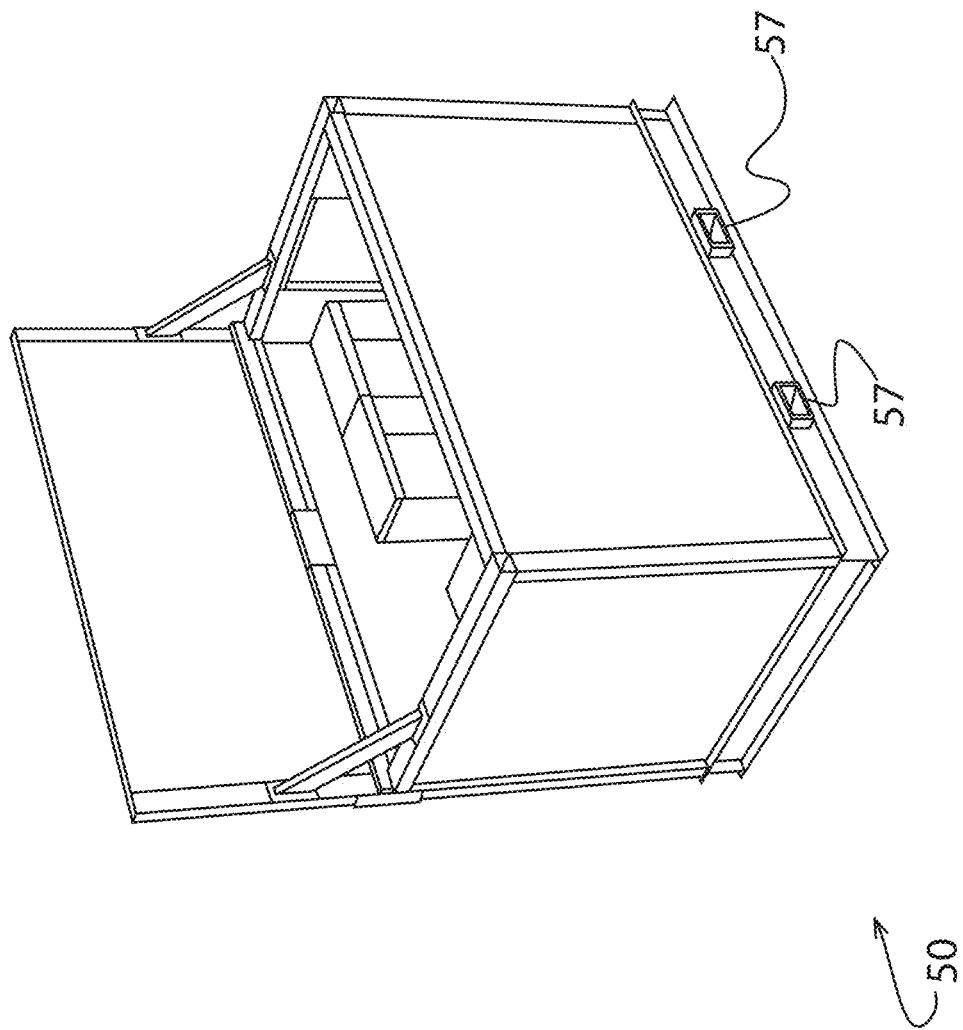
FIG. 20 is a perspective of the ESS.

Referring to FIGS. 19-20, the ESS 50 is the mechanical room for cell serving as the entry point for all external power connections, compressed air, and other sources for distribution to all other stations. Thus, the ESS 50 is the only station that requires external input from deployment location. In an exemplary, embodiments, the sole inputs to the JARVIS cell 10 onsite are: A) 480-VAC 16-A, 3-phase at 60-Hz energy supply; B) 120-psi compressed air at 80-CFM. The ESS 50 generally comprises a transformer 51; laser ablation controllers 52; a server rack 53; a robot controller 54; a control cabinet 55; and a power distribution unit 56. Power is fed into the cell 10 from the power distribution unit 56, with some power being distributed directly to other cell stations. Remaining power is passed through the transformer 51 to convert 480-VAC into 240-VAC, 120-VAC, and 24-VAC, which is fed back into the power distribution unit 56. Residual 480-VAC after conversion exits the power distribution cabinet and is sent to individual controllers and cabinets, namely the two laser ablation controllers 52, the robot controller 54, and accessory controllers for the rotational positioners 22 and track system 25. The control cabinet 55 holds almost all programmable logic controllers (PLC) and Input & Output (I/O) devices, while the server rack 53 will contain storage for all data generated from JARVIS cell 10. During operation, the servers will be the access point to the users operating the cell from the JCS 60.

The ESS 50 comprises a single pair of fork lift openings 57. Upon decision to transport, incoming and outgoing wires are disconnected, retracted, and spooled inside of the station 50. Any external interface components can be removed and stored within the ESS 50. The illustrated ESS can be shipped without an oversized load permit.

5. Control Station

Figure 21:
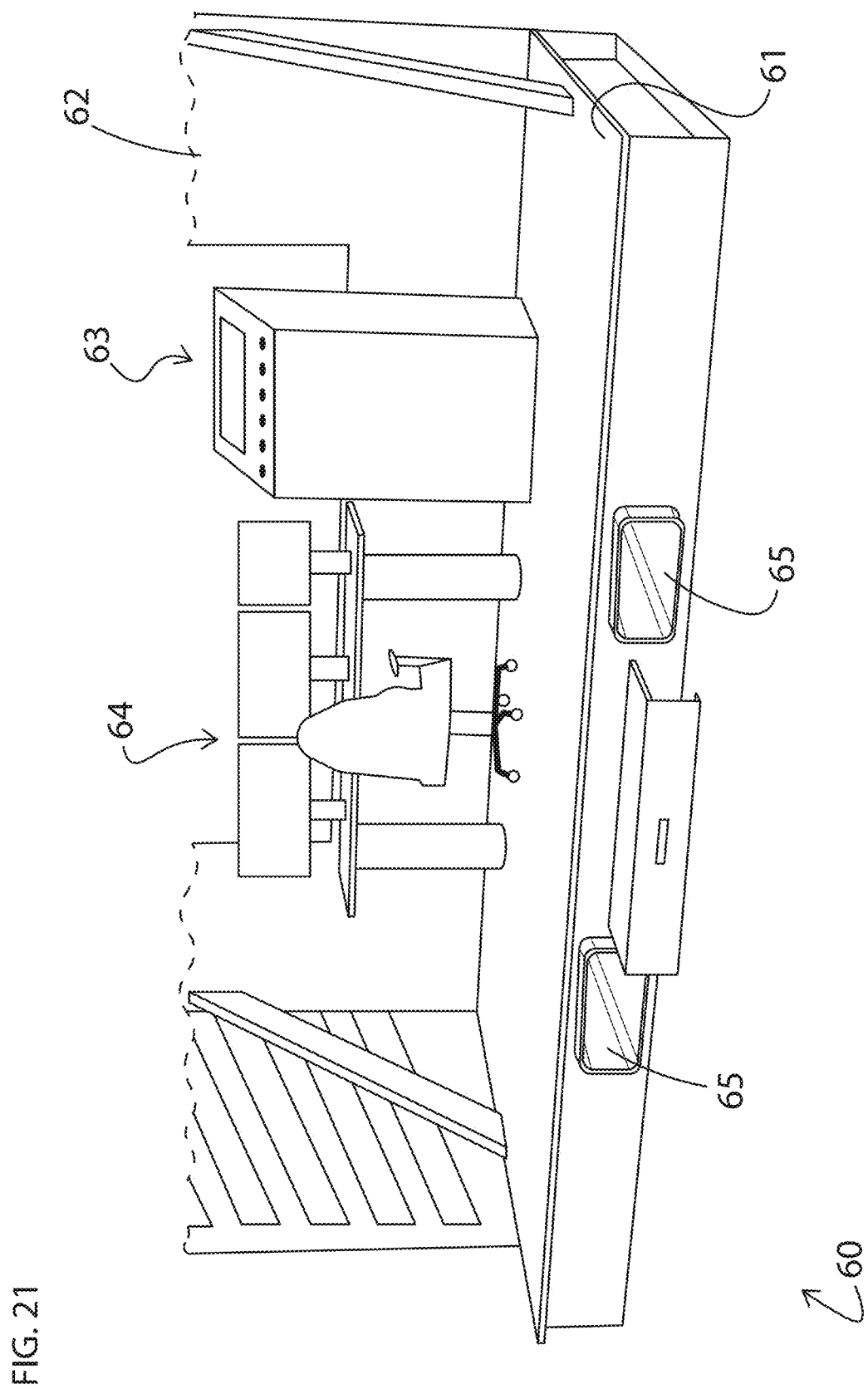
FIG. 21 is a perspective of a control station of the JARVIS cell.

Referring to FIG. 21, the JCS 60 comprises a platform 61 and a partition wall 62 configured to define one end of the JARVIS cell 10 opposite the ESS 50. The platform 61 supports an HMI 63 and a computer workstation 64. The computer workstation is supported on a desk. In the illustrated embodiment, the wall 62 comprises a window so that the operator can view the cell while operating the cell from the JCS 60. The computer work station 64 is configured to display live operations information, display a live data stream, and control the actions of the industrial robot 24. A multi-monitor setup can be used to monitor cameras, sensors, and approve/disapprove of recommended processes generated in the JARVIS cell 10. As a safety feature, the fail-safe HMI panel 63 is linked directly to the PLC. This allows for control in the event of a software or computer error at the workstation 64. This HMI panel is a redundant operating station with limited functionality for executing required safety movements of the robot, tools, and rotational positioners.

The JCS 60 comprise a pair of forklift openings 65. Upon decision to transport, the operator desk, computer workstation 64, and HMI 63 are removed and shipped independently. The wall assembly 62 will be detached, removed, and placed on the platform 61 for shipment. The JCS 60 can be loaded onto a trailer with a single forklift and ships by truck without an oversized load permit.

6. Blade Support Cart

Figure 22:
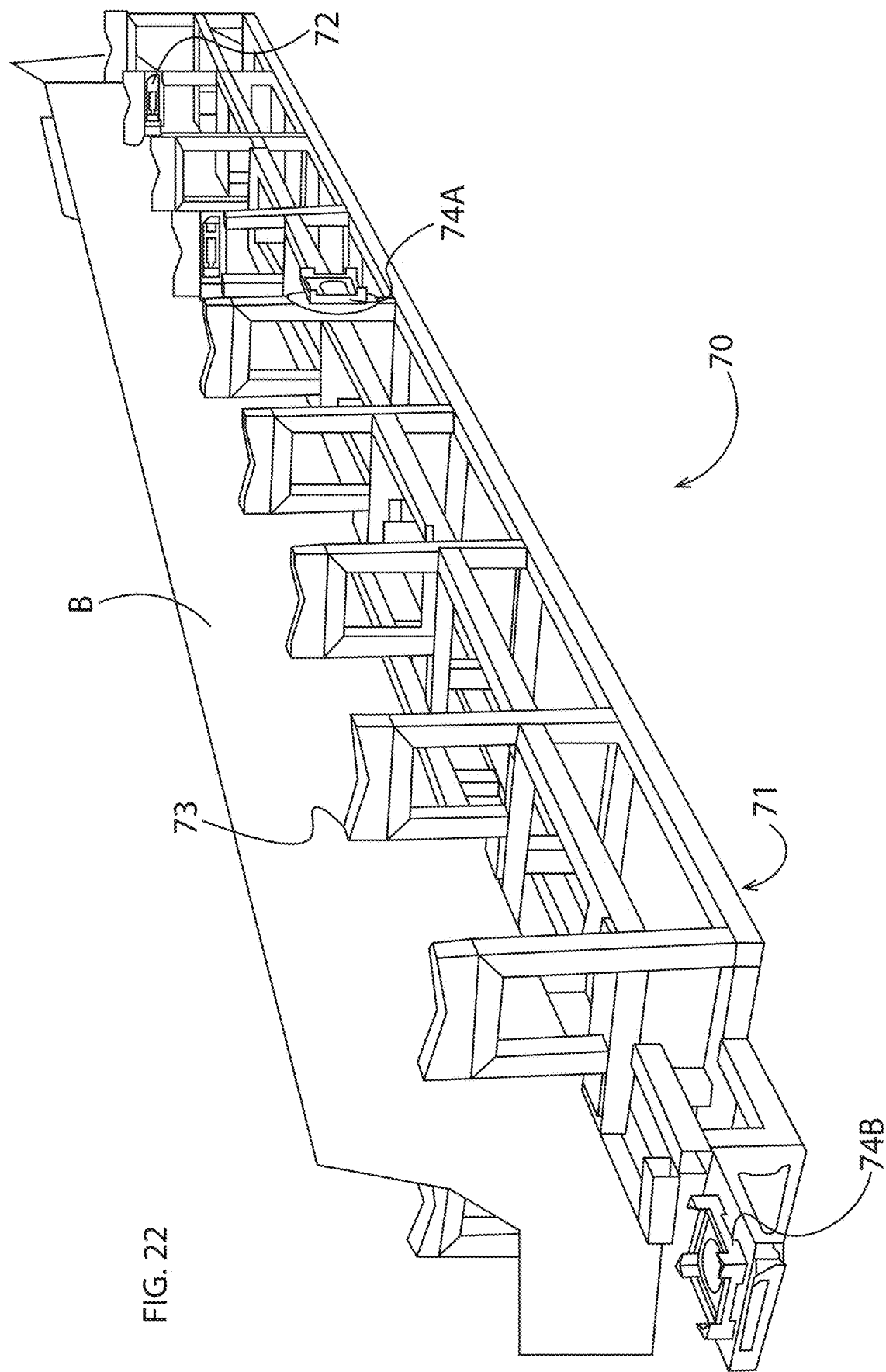
FIG. 22 is a perspective of a blade support cart (BSC) supporting a rotorcraft blade in a vertical orientation.
Figure 23:
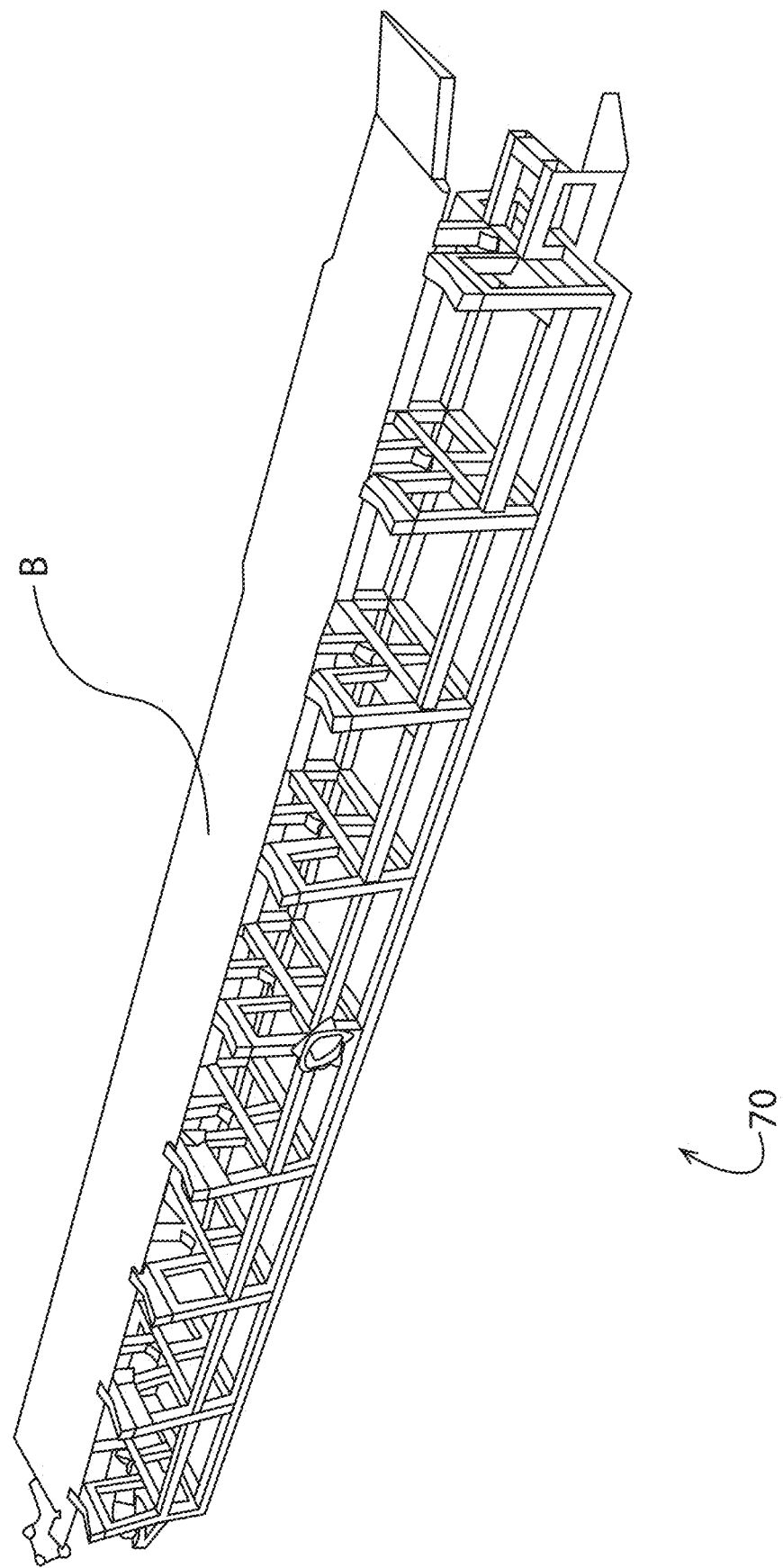
FIG. 23 is a perspective of the BSC supporting the blade in a horizontal orientation.
Figure 24:
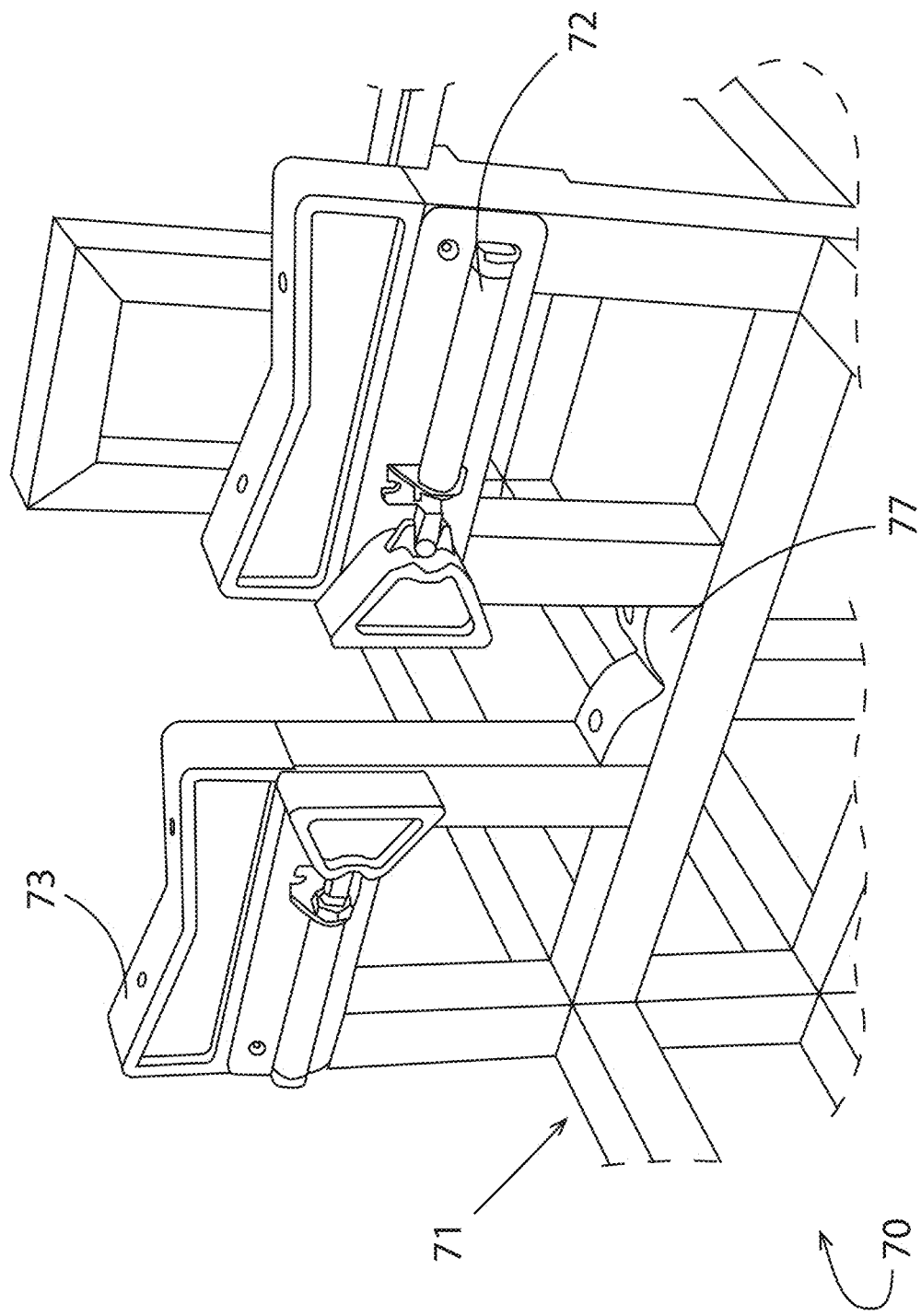
FIG. 24 is an enlarged fragmentary perspective of a portion of the BSC.

Referring to FIGS. 22-24, the BSC 70 is usable at both locations inside the cell 10 and locations outside the cell, depending upon the operation being performed. The BSC 70 is used for transport, transfer, support, and balancing of the blade during cell operation. The BSC 70 generally comprises a fame 71 configured to support a rotorcraft blade B in a vertical orientation (FIG. 22) and a horizontal orientation (FIG. 23). The frame 71 defines a recess for receiving the blade B in the vertical orientation. The frame 71 includes a set of cradle support members 77 for receiving and the longitudinal edge of the blade during use. The BSC 70 further comprises a plurality of pneumatic cylinders 72 for gripping the blade B in the vertical orientation to securely hold the blade in place. Stiff polymer support pads 73 are located on top of the frame 71 for holding the blade in the horizontal orientation. The support pads 73 are suitably contoured to the profile of the blade so that there is sufficient support when performing cell functions that apply local pressures to the blade. In certain embodiments, the blade B is positioned on the BSC 70 in the vertical orientation during transit and is positioned in the horizontal orientation during cell operations.

Three slave tool changers 74A, 74B are affixed to the BSC 70. Center tool changer 74B can be used to transfer the BSC 70 and blade B from a docking location outside of the cell 10 to the rotational positioners 22 inside the cell. Two more tool changers 74B are mounted near the blade cuff and blade tip. These tool changers are configured to mate with the master tool changers on blade rotator mounts 170 (each, hereinafter, BRM), described below. The tool changers 74B are configured to provide rigid support of the blade B during cell operations.

Figure 25:
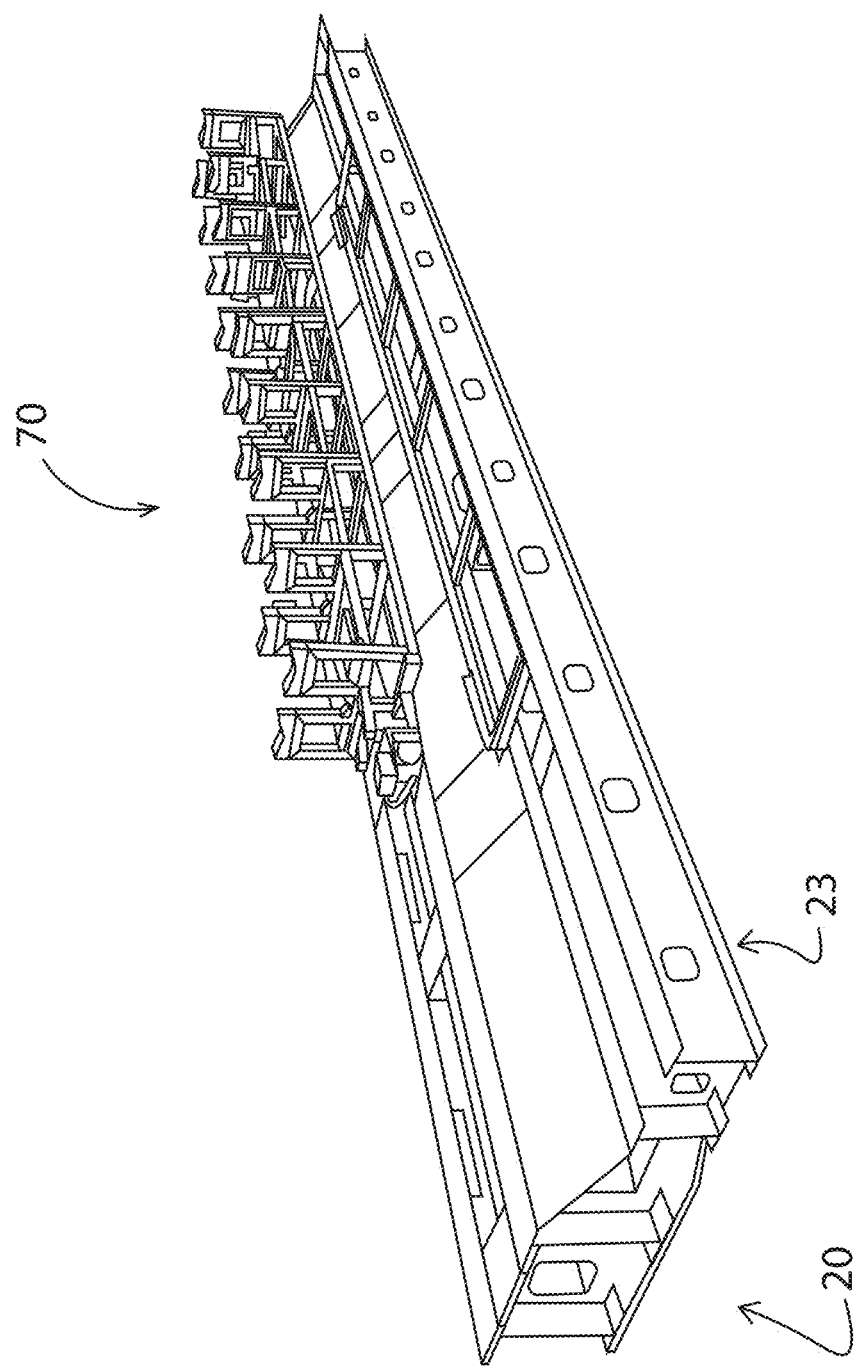
FIG. 25 is a perspective of the BPS and BSC configured for transport.
Figure 26:
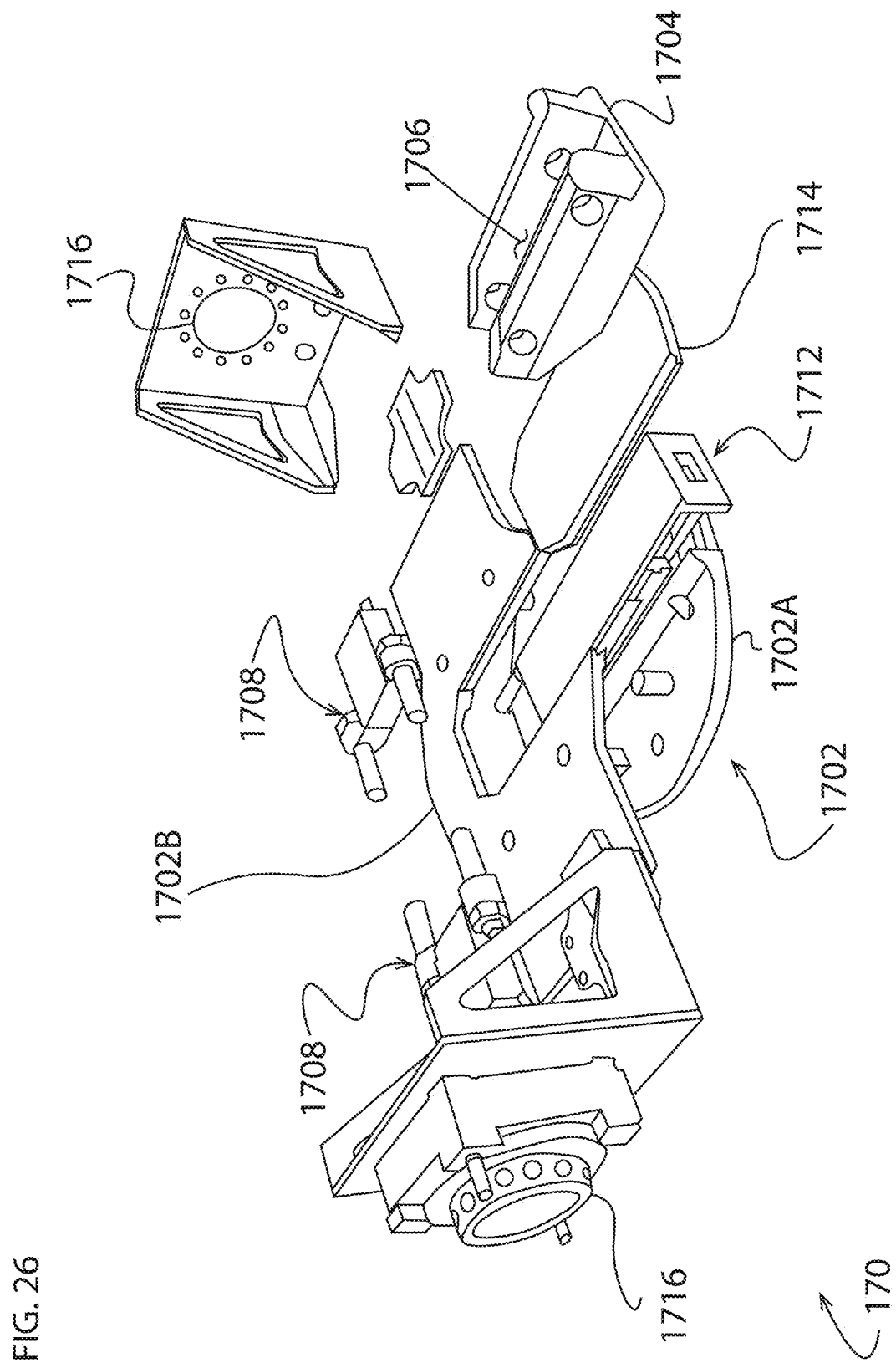
FIG. 26 is an exploded perspective of a blade rotator mount (BRM) of the JARVIS cell.

Referring to FIG. 25, in one or more embodiments, the BSC 70 is configured to mount on the BPS 20 during transit.

7. Blade Rotator Mounts

Referring to FIGS. 26-30, the JARVIS cell 10 further comprises a BRM 170 on each of the rotational positioners 22 of the BPS 20. The BRMs 170 are configured for operatively mounting the blade B on one or both of the rotational positioners 22 so that the cell 10 can rotate the blade during cell operations. Each BRM 170 broadly comprises a rotatable base 1702 formed from one or more plates 1702A, 1702B. The base 1702 is configured to fastened to the rotational positioner 22 with, for example, screws.

Figure 27:
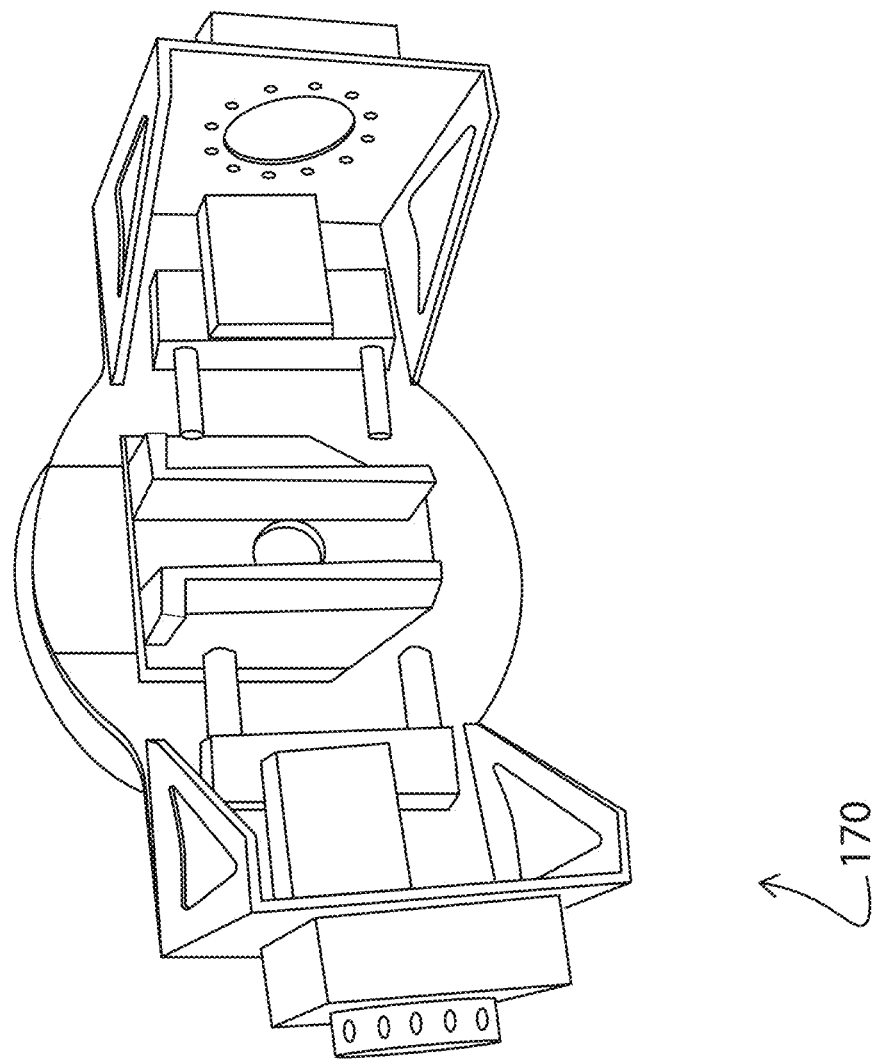
FIG. 27 is a perspective of the BRM in a standby configuration.
Figure 28:
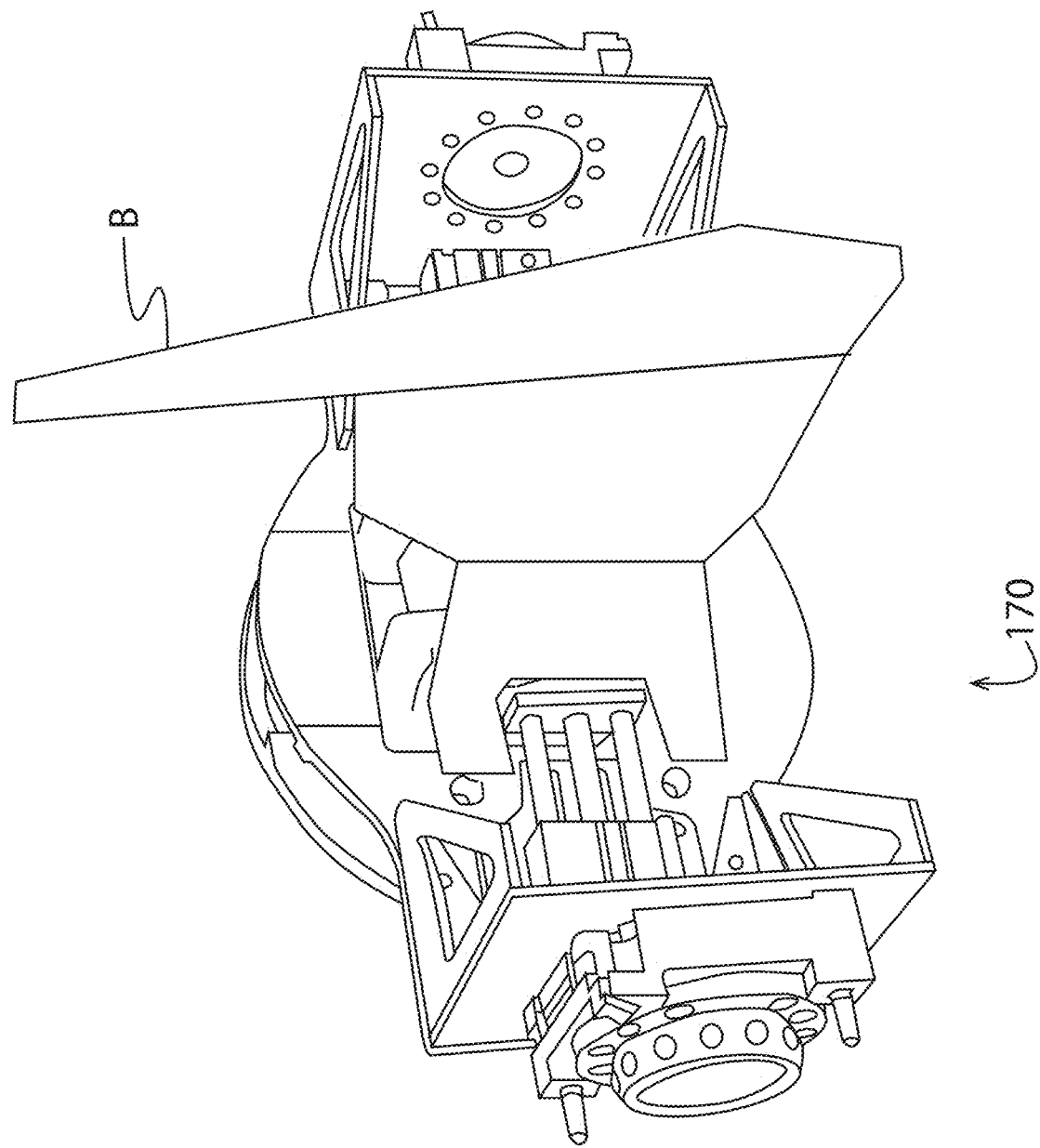
FIG. 28 is a perspective of the BRM coupled to a blade cuff in a working configuration.
Figure 30:
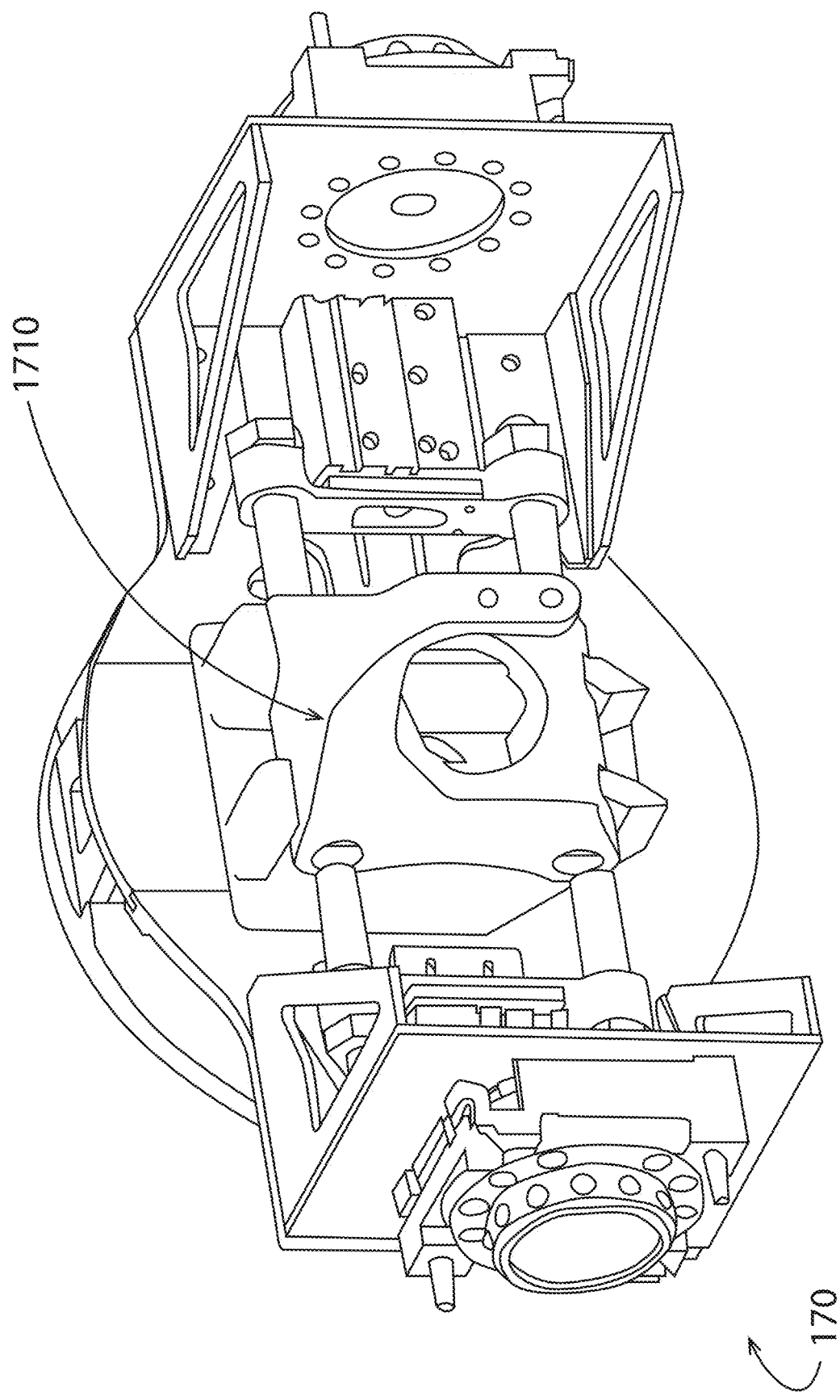
FIG. 30 is a perspective of a tip converter for the BRM.

A cuff mount 1704 is supported on the rotatable base and defines a channel 1706 configured to receive a portion of a cuff of the rotorcraft blade therein. Guided pneumatic pins 1708 are movably connected to the cuff mount 1704 for movement between a release position (FIG. 27) and a lock position (FIG. 28). When the cuff of the blade B is received in the channel 1706, the pins 1708 can be moved from the release position to the lock position to lock the cuff onto the cuff mount 1704 so that the blade B is supported on the rotational positioner 22 and can be rotated thereby. It is also possible to operatively connect to cuff mount 1704 to the tip end of the blade B for rotatably supporting the blade by the tip. As shown in FIG. 30, a tip converter 1710 is configured to releasably couple to the cuff mount 1704 for releasably attach a tip of the rotorcraft blade to the BRM 170.

Figure 29:
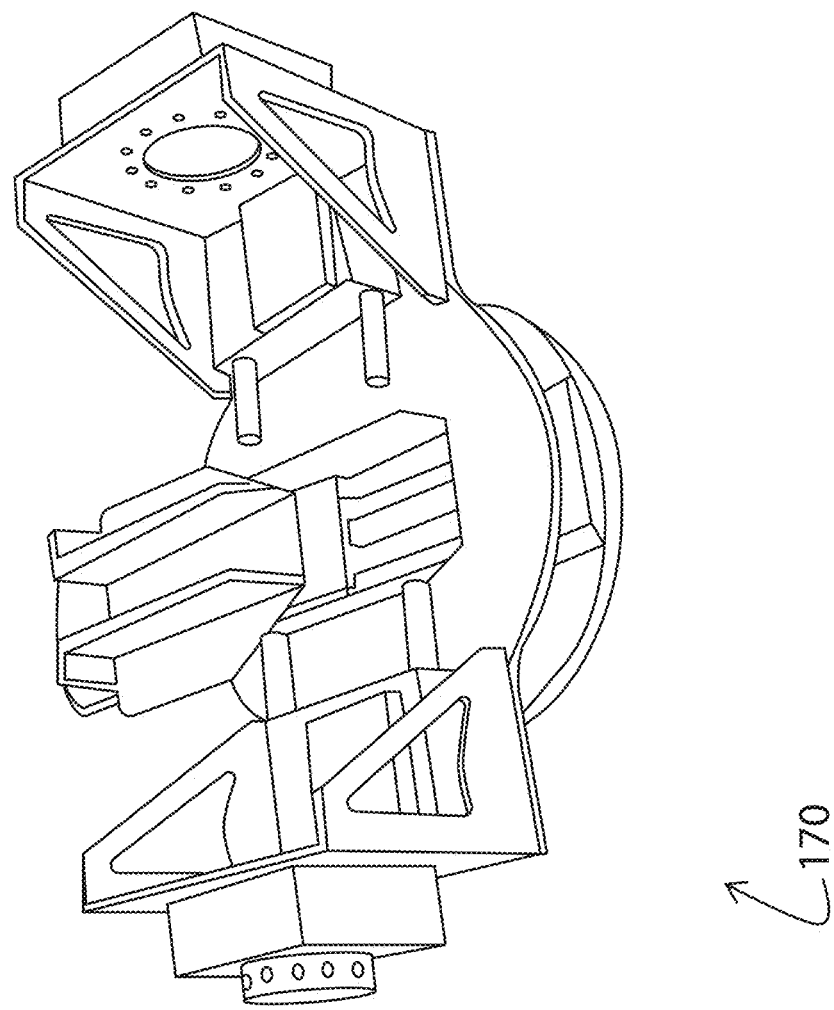
FIG. 29 is a perspective of the BRM in a balancing configuration.

In the illustrated embodiment, the BRM 170 further comprises cuff mount driver 1712 (e.g., a pneumatic cylinder) configured to drive movement of the cuff mount 1704 relative to the rotatable base 1702. In the illustrated embodiment, the cuff mount 1704 is fixed onto a slide plate 1714 that is slidable in relation to the base plate 1702. The driver 1712 is operatively connected to the slide plate 1712 to drive movement of the slide plate and cuff mount 1704 between a mounting position (FIGS. 27 and 28) and a release position (FIG. 29). In the mounting position, the cuff mount 1704 is operatively aligned with the pins 1708 so that the pins can be actuated to couple the blade cuff to the cuff mount. In the release position, the cuff mount 1704 is misaligned with the pins.

The BRM 170 has three different configurations; 1) Standby; 2) Working; 3) Balancing. FIG. 27 shows the BRM 170 in the standby configuration, which is the default mode for the unit. In this configuration, the cuff mount 1704 is in the mounting position and the pins 1708 are retracted, awaiting blade engagement. To enter working configuration shown in FIG. 28, the rotor blade cuff is inserted into the channel 1706. Once alignment is achieved, the pins 1708 extend, and clasp cuff holes. The rotational positioners 22 can then rotate the blade B to facilitate cell operations. Periodically throughout processing, moments may be calculated for determination of weight addition and subtraction. During this balancing process the pins 1708 retract, and the driver 1712 drives the cuff mount 1704 to the release position away from the cuff. This is the balancing configuration shown in FIG. 29. This action allows for free vertical movement of the blade B. In one or more embodiments, the BRM comprises nylon pads at interface points on each side of the tapered pin-to-cuff mount.

Additional features exist for connection to the BSC 70. In particular, the BRM 170 comprises two tool changers 1716. Either of the tool changers 1716 can be selectively connected to the tool changer 74B of the BSC 70 for making an operative connection of the cell 10 to the BSC.

8. Modular Tool Cartridges

Figure 31:
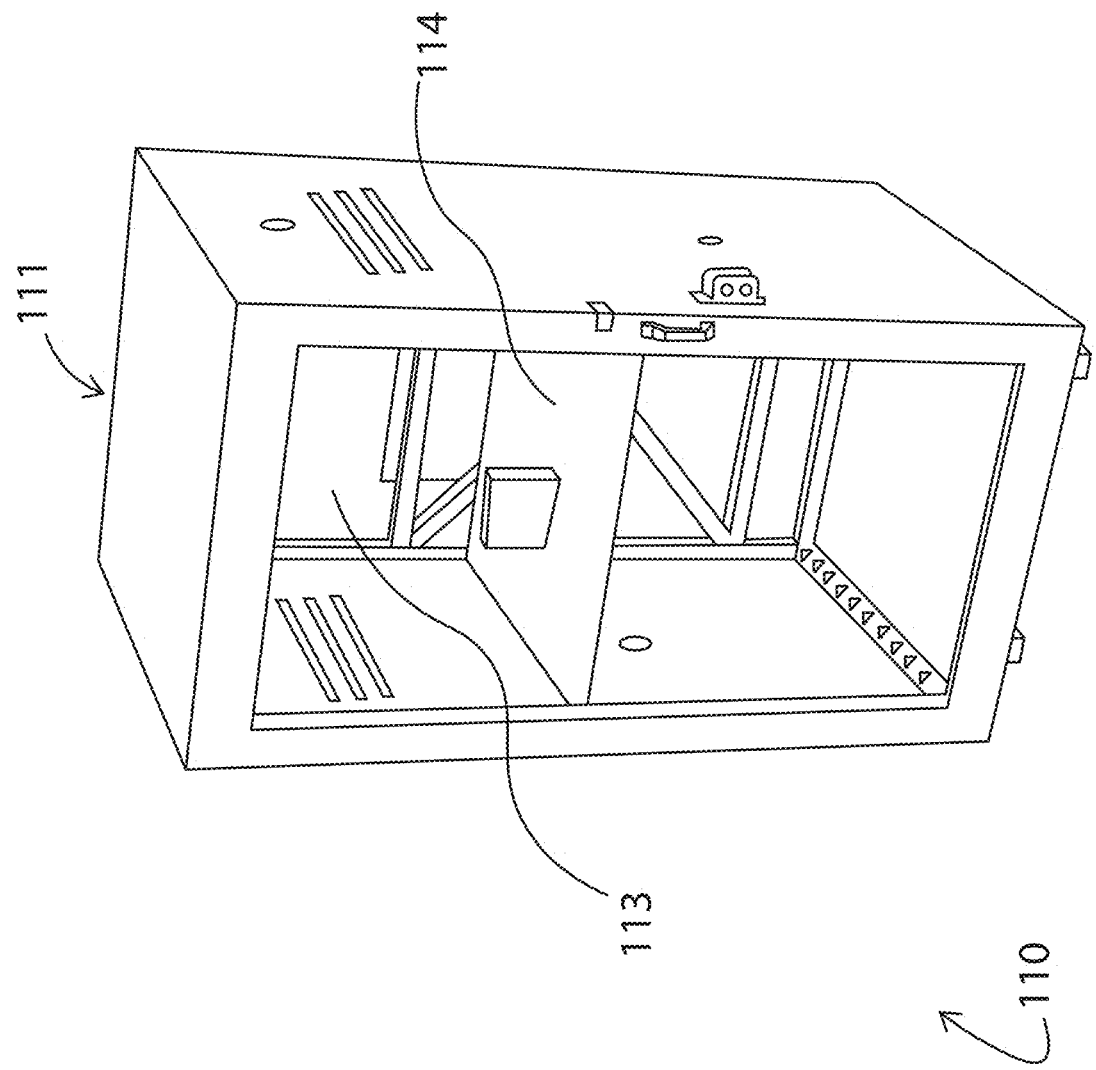
FIG. 31 is a perspective of a modular tool cartridge (MTC) of the JARVIS cell.
Figure 32:
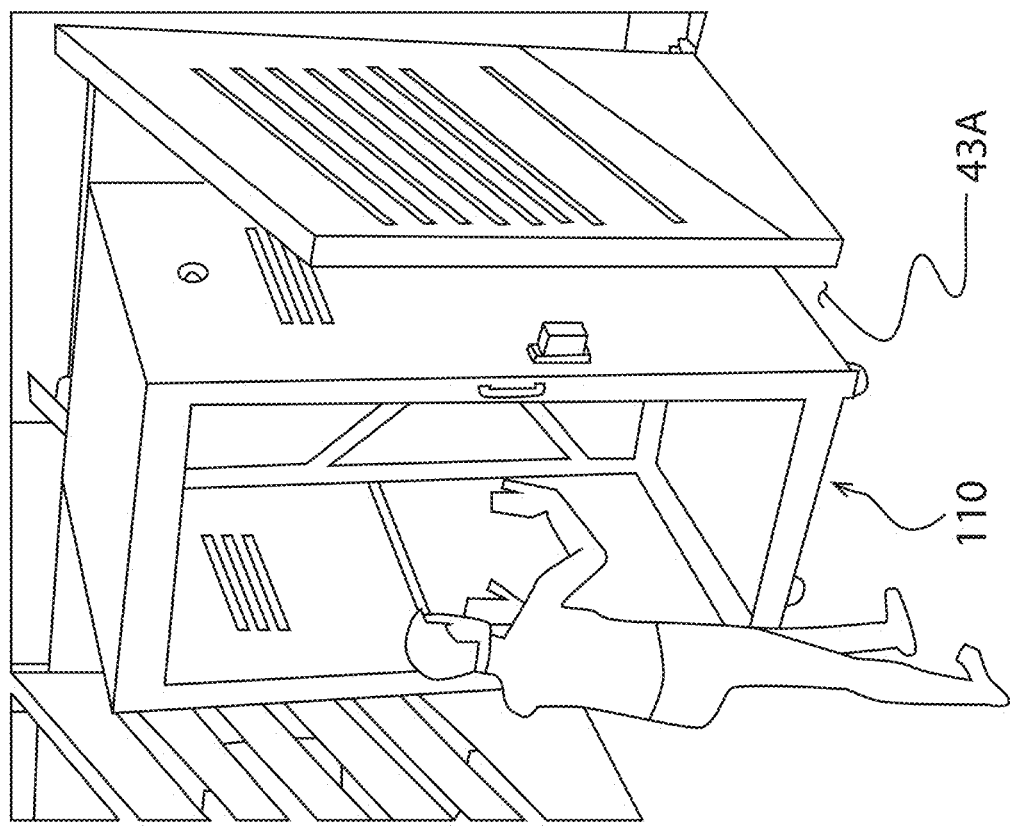
FIG. 32 is a perspective illustration of a person loading an MTC into the TDS.
Figure 33:
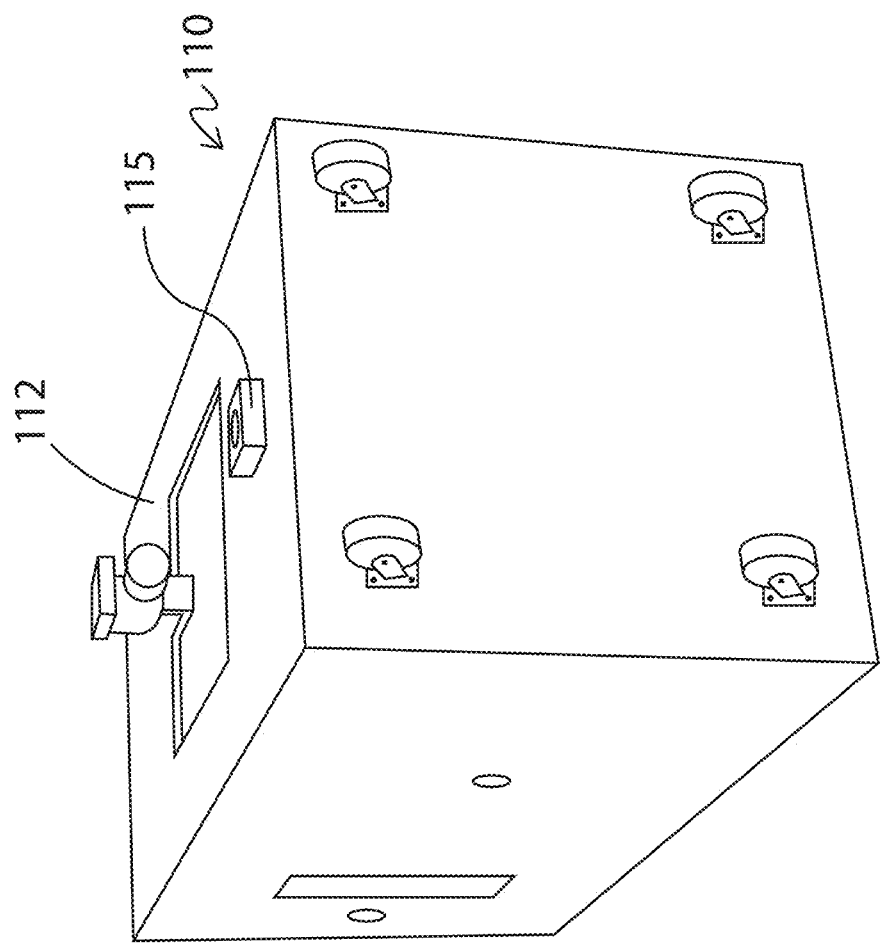
FIG. 33 is another perspective of the MTC.

Referring to FIGS. 31-33, each MTC 110 is designed to house a respective tool or robotic end effector for use in the processing of rotor blades (broadly, composite parts). Exemplary end effectors will be described in further detail below, but this section focuses on the external housing features of the MTCs 110—e.g., features in common among al or several of the MTCs 110. Up to six MTCs 110 can be used in the illustrated embodiment of JARVIS cell 10. Each MTC broadly comprises a cabinet 111 supported on casters. The cabinet 111 has a front wall 112 and a back door 113 opposite the back wall. The cabinet 111 further comprises left and right side walls extending from the front wall 112 to the back door 113 and a bottom wall, a top wall, and a tool support shelf 114 spaced apart along the height of the housing between the top wall and the bottom wall. All equipment required for the tool operation is held inside the cabinet 111. Each cabinet 111 contains modular shelving with brackets and containers for mounting. The cabinets 111 can be modified to custom fitted for controllers, spare parts, and extra tools as required. Additionally, each cabinet 111 is equipped with cooling fans to ensure adequate temperatures are maintained at all times.

A slave tool changer 115 is mounted on the back wall 112 below the tool support shelf 114 for operatively coupling to a master tool changer 45 of the TDS 40 when the MTC 110 is loaded into the MTC slot 43A. In general, the tool changers 45, 115 comprise a plurality of communication connectors of different types, e.g., at least one power connector, at least one pneumatic connector, and/or at least one vacuum connector. In one embodiment, the tool changer 115 is a QC210 tool changer, which allows for rigid attachment to the TDS 50. With proximity sensors present on the TDS 40, the JARVIS cell 10 will recognize when the MTCs 110 is pushed into an MTC slot 43A in the TDS 40 and respond by automatically activating a locking mechanism.

The back wall 112 defines a tool pass through opening 116 at least partially above the shelf 114 through which the robot 24 can access the tool in the MTC 110 during use. Each tool will possess a tool changer mount for operatively connecting the tool onto a mating tool changer on the end of the robot 24. To ensure that the robot does not miss the tool and trigger motion collision errors, each mount for can be precisely located with a laser tracker, and displacement between the locking tool changer on the robot 24 and the respective tool center point can be well defined. When the MTC 110 is not being used by the JARVIS cell, the tool from the MTC 110 can be used externally.

9. Patch Machining Cartridge

Figure 34:
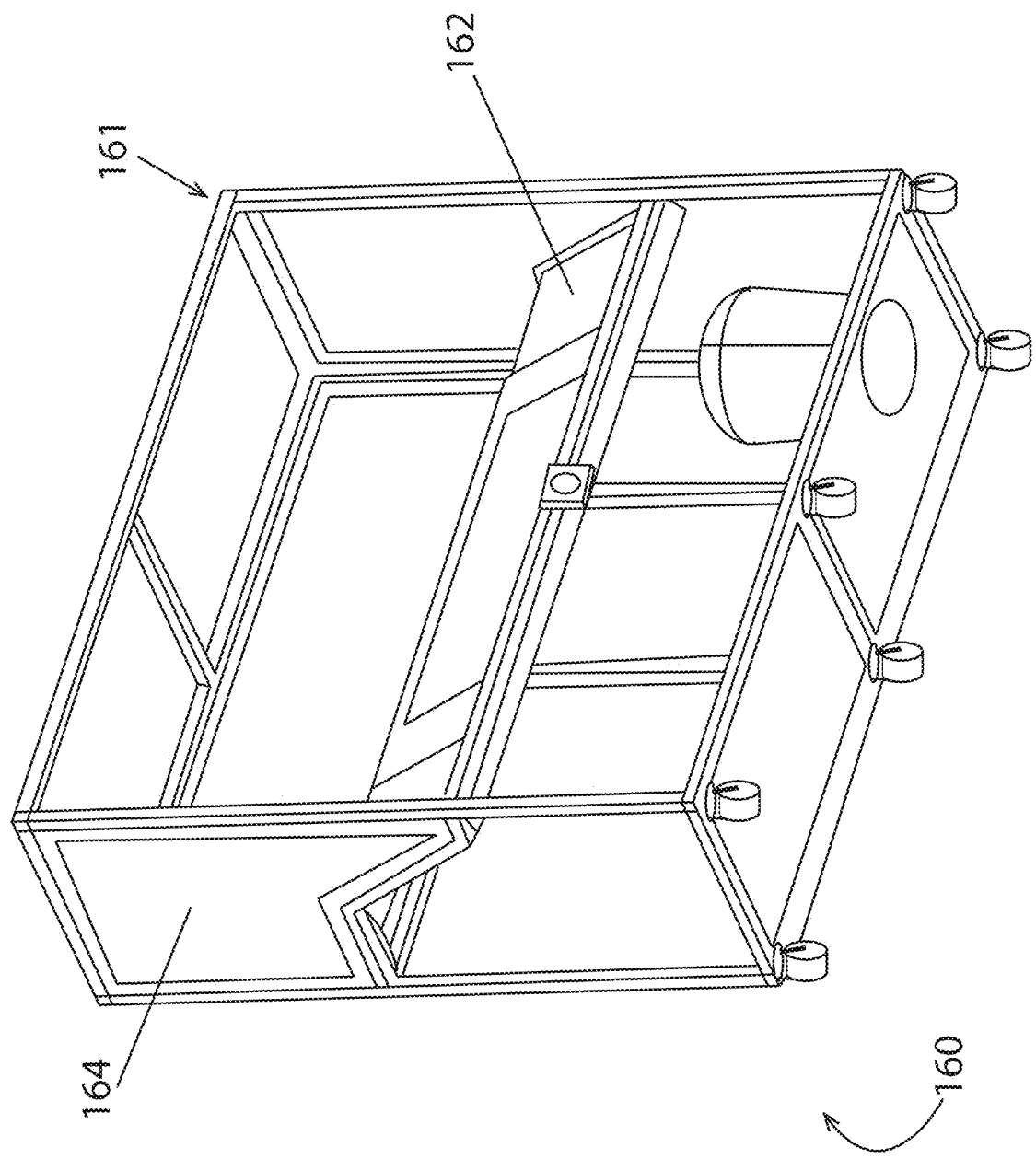
FIG. 34 is a perspective of a patch machining cartridge (PMC) of the JARVIS cell.
Figure 35:
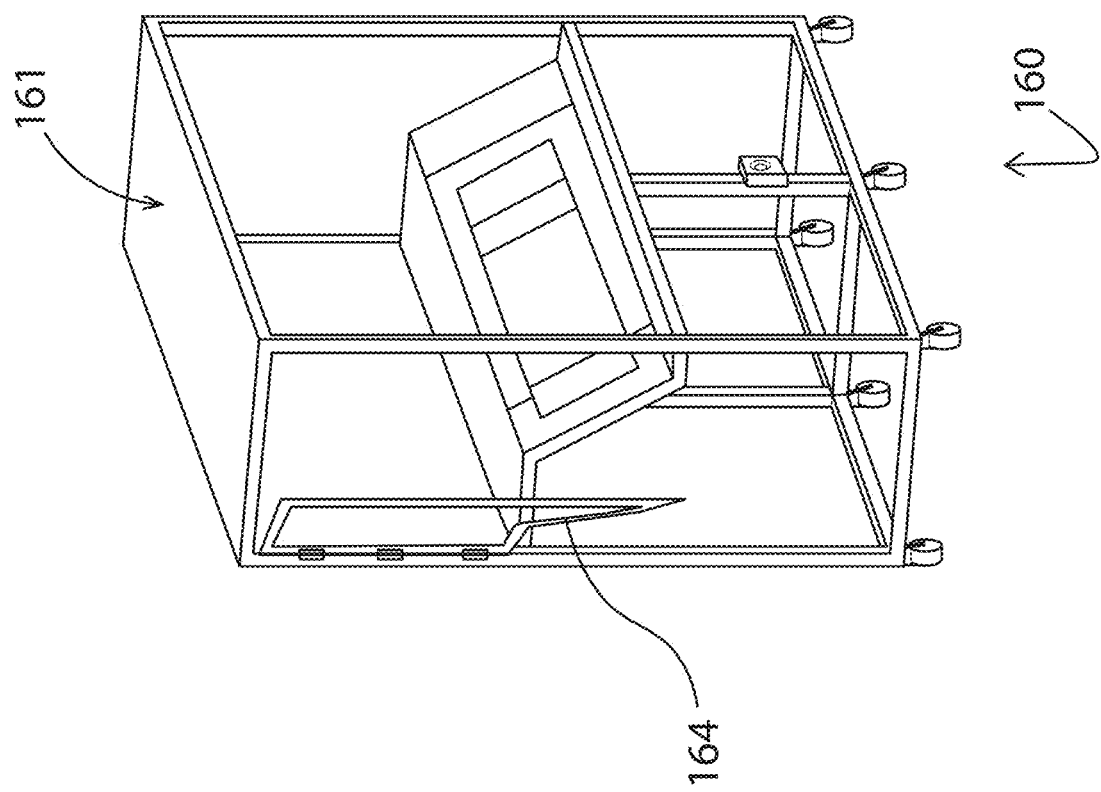
FIG. 35 is another perspective of the PMC.
Figure 36:
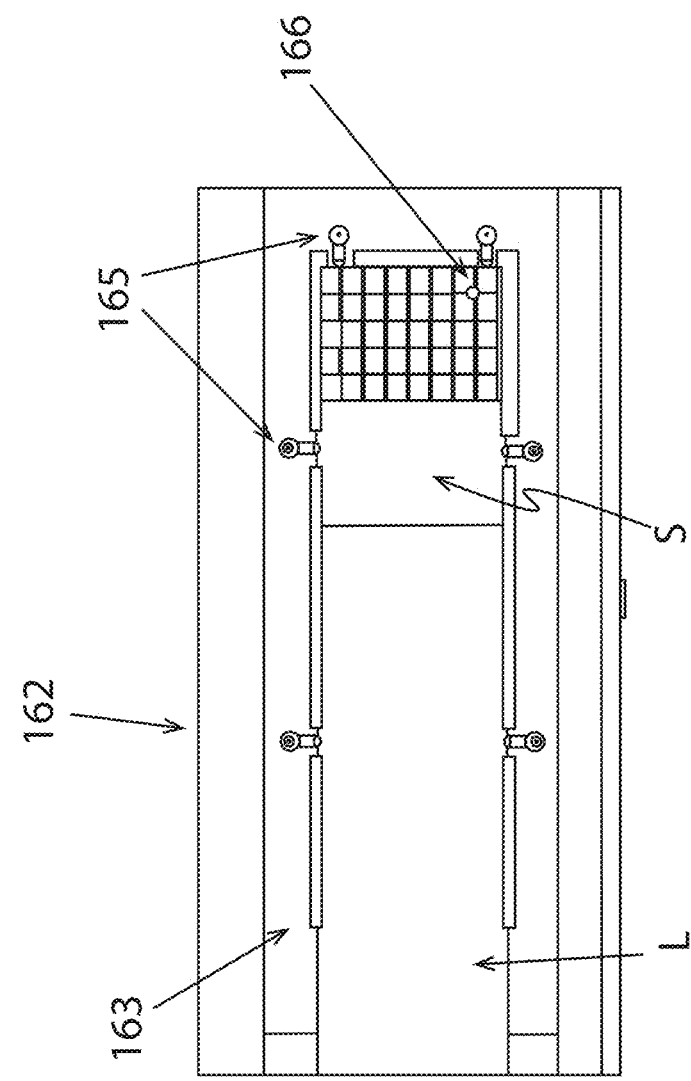
FIG. 36 is a top plan view of a work surface of the PMC.

Referring to FIGS. 34-36, the PMC 160 is configured to facilitate machining of repair patches for repairing the composite part after inspection. The PMC 160 broadly comprises a housing 161 supported on casters. The front side of the housing 161 comprises a slave tool changer for operatively connecting to a master tool changer 45 on the TDS 40. The housing 161 comprises a wall 162 defining a work surface on which a patch can be made. A pair of guide channels 163 are formed on the wall for slidably receiving a sacrificial sheet S laminate sheet L, the latter of which is usable to form the repair patch. The housing 161 comprises a selectively openable and closable door 164 on one side. The technician can load the sheets S, L into the guides 163 through the opened door 164 and the close the door, and then the robot 24 can perform scarf machining through the open front side of the housing 161. The PMC 160 further comprises a plurality of pneumatic clamps 165 for housing the sheets S, L in place during the patch making process. Additionally, the PMC 160 comprises a vacuum port 166 formed through the wall 162. A vacuum can be coupled to the vacuum port 166 for securing the sheets S, L in place on the work surface under vacuum pressure. Once repair patch size is determined from the JARVIS cell 10 software and upon approval from the operator, the robot will perform scarf machining on the premade laminate L. Due to dangers associated with debris from machining, safety features may be implemented that halt operations upon housing opening or detachment.

10. Cell Safety

Figure 37:
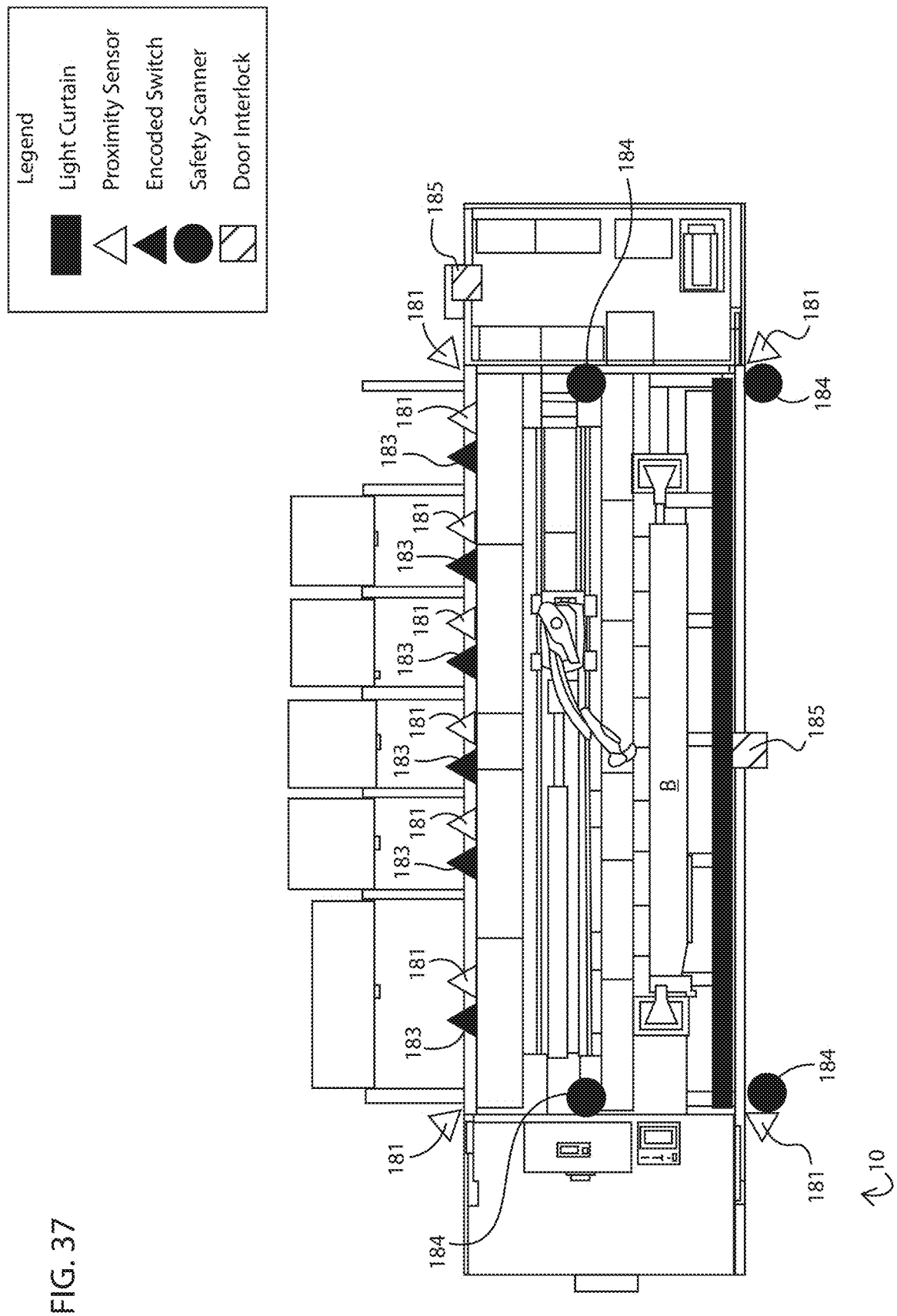
FIG. 37 is a top plan view of the JARVIS cell with schematic markings showing the locations of certain safety features.
Figure 38:
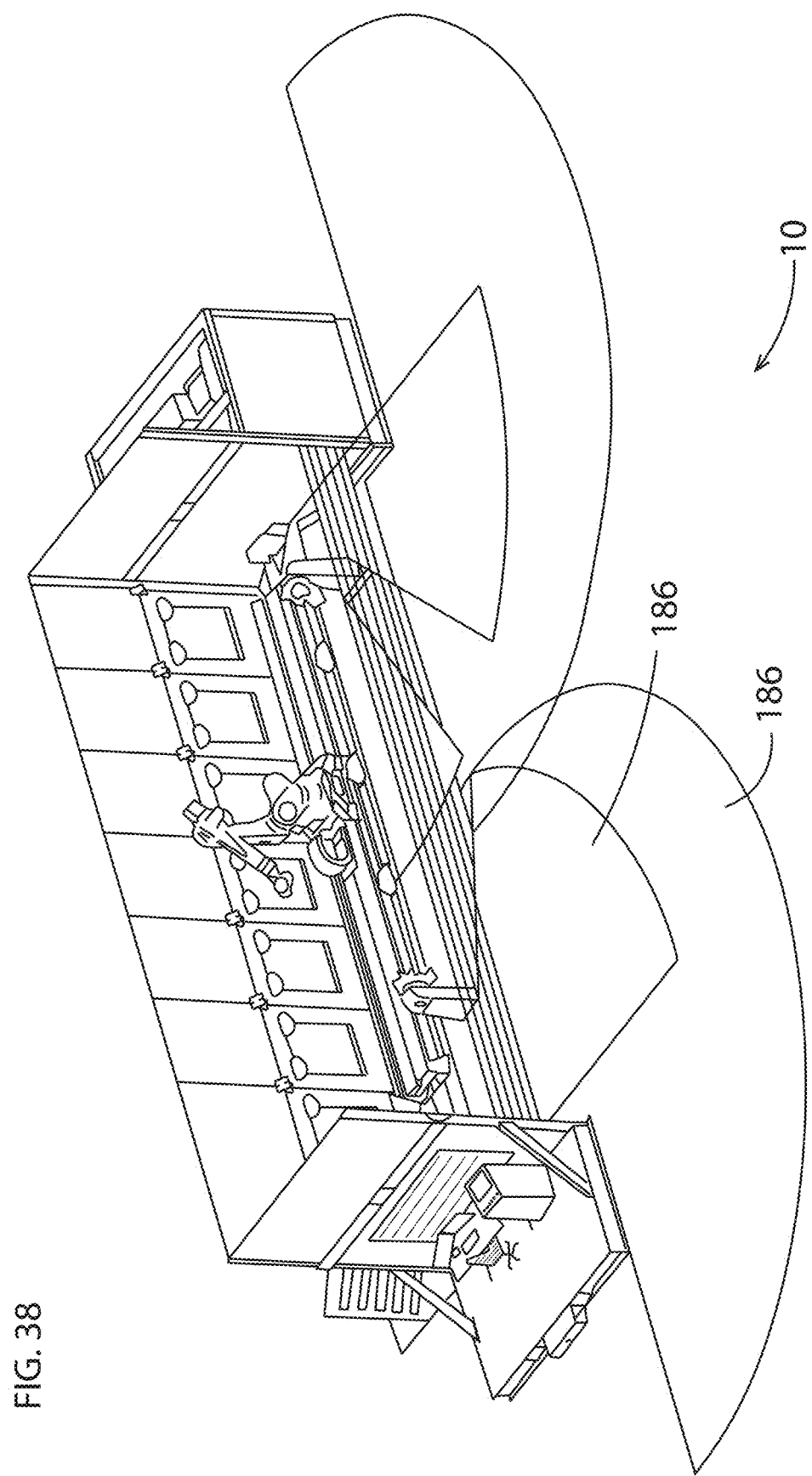
FIG. 38 is a perspective of the JARVIS cell with illustrations of a safety scanning range thereof.

In order to maintain operator safety, an exemplary embodiment of the JARVIS cell 10 achieves a Safety Integrity Level (SIL) 2. SIL refers to the functional safety rating based upon International Electrotechnical Commission (IEC) 61508 and its similar standards, IEC 62061 and IEC 61800-5-2. To achieve this level of safety, all functional safety controllers are fail-safe rated and communication protocols are developed to an SIL-2 standard. In addition to the fail-safe devices, any moving parts, walls, doors, connections, and floors are actively monitored. As shown in FIG. 37, the illustrated JARVIS cell 110 employs light curtains 181, proximity sensors 182, encoded switches 183, safety scanners 184, and door interlocks 185 to ensure safe operation of the cell. In addition, FIG. 38 shows the safety scanning range 186 of an exemplary embodiment of the JARVIS cell.

The safety scanners 184 function by actively monitoring inside and the surrounding outer areas of the cell. In an exemplary embodiment, each scanner 184 has a range of 216.0-inches through a 270-deg field of view (FOV). The FOV is located approximately 2-inches above the mounting surface, allowing foot traffic, large tools, and miscellaneous objects to be detected. Various zones are defined and can be adjusted relative to the active function of the cell 10.

Light curtains 181 serve as invisible fences. These devices comprise of a sender and receiver. The sender transmits multiple light beams that are detected by the receiver. If any of the beams are broken, a signal is sent to the safety controller. The encoded switches 183 can be magnetic switches that send a signal when connected. If they are separated, the signal stops. Door interlocks 185 are attached to the BIS 30 on the sliding doors. These function by sending a signal if the door is closed. If the door is opened or not properly closed, the signal will deactivate, in some cases, deactivating the main cell operations. Proximity sensors 182 are used generically to detect if all walls, protection doors and connectors are assembled correctly.

An exemplary embodiment of the JARVIS cell employs three stop and two monitoring levels. The first level, Stop-0, is only used during emergency stop (E-Stop) conditions. In this condition, all brakes will apply and motor power is immediately shut-off. To clear the stop condition, the operator must clear the source and perform a full safety reset on the cell. The second level, Stop-1, acts as a "soft-stop" and will brake the robot though motor power remains. This condition will typically occur if the operator decides to activate a program hold or pause function. The third stop level, Stop-2, is activated by the JARVIS program exclusively, and does not have a manual override. In this condition, the robot will simply hold position, keeping the brakes deactivated and the motors on. There is no escape procedure required to leave this condition.

The two monitoring levels force the robot to adjust speed and some program functions and are controlled by the safety scanners during routines where the doors are left open. In Monitor-0, if the scanners sense an object approaching, the robot slows down relative to the proximity of the object. This will also adjust the program to avoid the area, if possible. Monitor-1 serves strictly as a silent monitor; this function feeds messages but does not alter any robot program paths, speed or trigger any stops.

Figure 39:
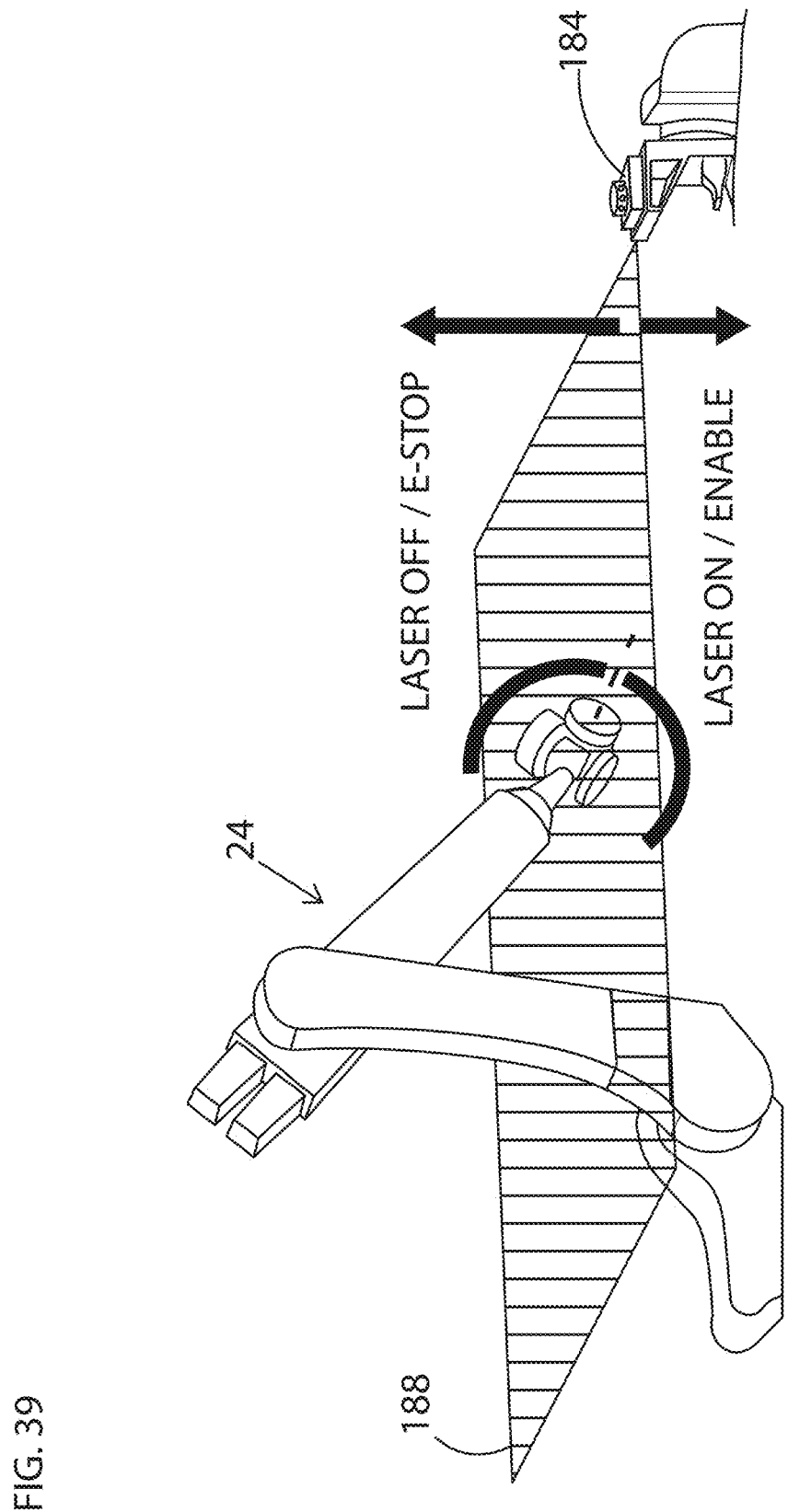
FIG. 39 is a perspective of the JARVIS cell robot and a laser scanner, with schematic markings noting how the JARVIS cell uses the laser scanner to prevent laser activity outside of a defined safe area.

During procedures requiring the use of industrial laser systems, special safety procedures are required to achieve a laser safe environment. Custom zones are produced to restrict robot motion, speed and path planning. These zones are configured so that the robot never directs the laser in an unsafe direction. If the robot does violate the zone, a Stop-0 will occur. In this condition, all motion will be disabled, brakes will activate, and the main power supply for the laser will be shut-off. To recover from this event, the operator manually jogs the robot back into the safe zone. A conceptual example of the defined zones is shown in FIG. 39 in which one of the laser scanners 184 monitors for motion above and below a defined safety plate 188. Motion below the plane 188 is permitted, but motion above the plane causes a Stop-0 event.

II. Cell Processes

Exemplary embodiments of certain processes that can be performed using the JARVIS cell 10 will now be briefly described. In general, the JARVIS cell 10 is configured for use in verifying and inspecting repaired composite parts such as rotorcraft blades to ensure that the part is repaired to meet required specifications. As explained more fully below, the JARVIS cell 10 can also be used to perform certain processes involved in making the necessary repairs to a composite part. The inspection methods employed using the JARVIS cell 10 can generate a robust data set with information about the composite part and repairs thereto. In addition to using these data for repair verification and making further repairs to the composite part, these data can be used outside of the cell processes in downstream continuous improvement processes.

Broadly speaking, this disclosure expressly contemplates 15 different cell processes, which will be described in detail below: (1) Blade Identification; (2) Blade Loading; (3) Virtual Scanning; (4) Digital Imaging; (5) Laser Shearography; (6) Pulsed Thermography; (7) Static Balance; (8) Core Ply and Repair Patch Design Selection; (9) Paint Removal; (10) Damage Removal; (11) Core Restoration; (12) Core Shaping; (13) Surface Preparation and Bond Readiness Testing; (14) Repair Patch Machining; and (15) Adhesive Application. This disclosure focuses on use of the cell with rotorcraft blades, but it will be understood that the same processes can be adapted for other types of composite parts. Before discussing each of these fifteen process in detail, a broad overview of how the JARVIS cell may be used to verify blade condition and make any necessary repairs will first be provided.

In an exemplary process, a composite part is introduced into the cell through the BIS 30. Initially, the blade is identified for purposes of maintaining the database. If the blade has previously been subject to inspection or repair by the cell, an identifier for the cell can be determined by a barcode scan, text recognition, or manual entry of a known identifier for the part. Otherwise, a new database record for the part is created with a new unique identifier.

An inspection system of the cell 10 subsequently conducts a detailed nondestructive inspection of the blade. In an exemplary embodiment, the inspection includes conducting a three-dimensional laser scan of the part from which a detailed three-dimensional model of a portion of or the entirety of the blade can be created. The inspection can further comprise taking a series of photographs of the part from one or more (e.g., all angles), conducting a pulsed thermography scan of the part, and conducting a shearography scan of the part. In one or more embodiments, a plurality of the above-described inspection steps are conducted by the robot 24. For instance, the robot can attach to a laser scanner end effector stored in one of the MTCs 110 and then perform a laser scan to obtain the three-dimensional model of the part. Subsequently, the robot can release the laser scanner into its MTC 110 and attach to a digital camera end effector stored in another MTC 110 and then take the required images of the part. The robot 24 can then release the camera end effector into its MTC 110 and attach consecutively to a shearography end effector and pulsed thermography end effector in their respective MTCs 110 to conduct shearography and pulsed thermography scanning. It will be apparent that other NDI end effectors can be used from other MTCs 110 if desired.

Upon completion of the non-destructive testing, a damage assessment system of the cell 110 is configured to create a digital twin of the part and store the digital twin in the inspection and repair database. The digital twin comprises the three-dimensional model of the part and each of the other types of non-destructive testing data wrapped onto the three-dimensional model. In an exemplary embodiment, the system uses an image stitching process to stitch together a set of overlapping NDI images of one or more types of NDI data to form a composite image that is wrapped onto the three-dimensional model. For instance, one embodiment of the cell creates a stitched composite photographic image of the part, a stitched composite shearography image of the part, and/or a stitched composite pulsed thermography image of the part that are wrapped onto the three-dimensional model.

The digital twin is stored in the inspection and repair database for future reference and is also used to assess the part for damage. In an exemplary embodiment, the damage assessment system may automate the damage assessment process by training a convolutional neural network to identify locations of damage in the NDI images. After the damage is assessed, either by a user or a machine learning image analysis model, the cell 10 can be used to repair the composite part.

In an exemplary embodiment, a repair system of the cell 10 facilitates composite scarf joint repair and core repair. For each type of repair, paint is first removed from the repair area. In an exemplary embodiment, the robot 24 attaches to a color-selective laser ablation tool to perform the paint removal. The laser ablation end effector may suitably be held in a modular tool cartridge or be an internal component of the cell. In certain embodiments, the cell 10 includes a laser projection system that is configured to project an image onto the area where a repair is to be conducted. After removing paint from the area in question, skin and/or core material is removed from the part. Suitably, the robot 24 attaches to a milling end effector (which may be held in a modular tool cartridge or maintained as a separate part) and uses the milling tool to automatically remove the damaged material based on coordinates generated from the nondestructive testing data.

The cell 10 can conduct a scarf repair of damaged skin of the composite part. Before machining the scarf repair patch, the cell 10 scans the area that has been prepared for repair. Based on the scan data, the system automatically generates a shape file for the scarf repair patch. A precured laminate is loaded onto a Patch Machining Cartridge of the cell. The robot uses the milling end effector to cut the precured laminate to the determined size and shape for the scarf repair patch on the PMC 160. In an exemplary embodiment, the robot attaches to an atmospheric plasma generator and uses the atmospheric plasma generator to prepare the surface for bonding by increasing the surface energy of the bonding surfaces. The cell can project an image onto the surface of the composite part indicating where adhesive should be applied. A user can manually position a structural adhesive film and then position the machined scarf repair patch onto the adhesive.

For a core repair, following scarf machining and after the core material is removed, a core plug formed from the same material is machined to fit tightly into the pocket formed by removal of the damaged core section. The core plug can be formed outside of the cell in an appropriate process. Before placing the core plug into the part, the surfaces of the composite part are preferably prepared for bonding. Again, the robot 24 uses the atmospheric plasma generator to prepare the surface for adhesion. The core plug is then adhered in the desired location before the robot 24 again uses the milling end effector to shape the core plug in-place to match the contour of the part. In an exemplary embodiment, the cell 10 uses a laser projection system to project an image onto the composite part indicating the location where adhesive should be applied. Suitably, an adhesive film can be manually applied to the indicated location before placing the plug and subsequently machining the core repair to the desired contour.

When repair is complete, another inspection of the composite part can be conducted to create and store a detailed record (e.g., digital twin) of the repair. The repair records stored in the database are believed to provide utility in long-term sustainment operations. For example, a technician can evaluate the past inspection and repair records for a composite part to make a more informed assessment of whether the composite part can withstand another required repair or update.

1. Blade Identification

Initially, the composite part is identified for purposes of maintaining a database that stores information about all of the composite parts being inspected, verified, and/or repaired using the JARVIS cell 10. If the part has previously been subject to inspection or repair by the cell 10, an identifier for the part can be determined by a barcode scan, text recognition, or manual entry of a known identifier for the part. Otherwise, a new database record for the part is created with a new unique identifier.

Initially, the blade B (broadly, a composite part) is visually inspected for indications of notable structural damage outside of defined ROI. Upon confirmation, identification of the blade is performed. However, at any given time, JARVIS cell 10 has the capability to work on any processes required for the blade of interest. Therefore, multiple blades will be at intermediate stages within the JARVIS cell 10 process flow at all times. Thus, a robust method of blade identification is required prior to cell operations.

When the blade is mounted on the BSC 70 prior to induction, the operator will identify the blade. If the identified blade has previously been through the cell operations, the operator will be presented with the historical data from previous repair operations. If the blade does not have an entry in the JARVIS database, the user is given the option to insert the new blade information into the database and begin processing.

In one or more embodiments, one of the following is used to identify the blade: a standard barcode or QR code scanner; optical character recognition system on a mobile device; and/or manual data entry.

When a barcode or a QR code are emblazoned on the blade B, it can be scanned using the code scanner. The code reader will be able to communicate with a processor (e.g., a processor of the workstation 64) executing JARVIS software (described, further below), preferably through a wireless data connection, providing the operator the option to freely walk around the blade while in the BSC 70. The information detected by the reader will be converted into a string of characters, providing the option to search for the blade information in the JARVIS cell 10 database.

The second option for blade identification is the use of a mobile device comprising a camera and configured to run an application that communicates with a processor executing the JARVIS software. The operator can walk around the blade and capture images of the blade surface using the mobile device camera. The captured images will be transmitted to the JARVIS processor, which analyzes the images using optical character recognition an OCR software module that captures any recognizable character information displayed on the blade. This information includes the serial numbers and repair report numbers referencing previous repair and maintenance activities.

The third option is used when the barcode/QR reader and OCR methods fail to accurately identify the blade. In this case, the operator is given the option to manually enter the blade serial number information to the workstation 64 of the JCS 60.

2. Blade Induction

Figure 40:
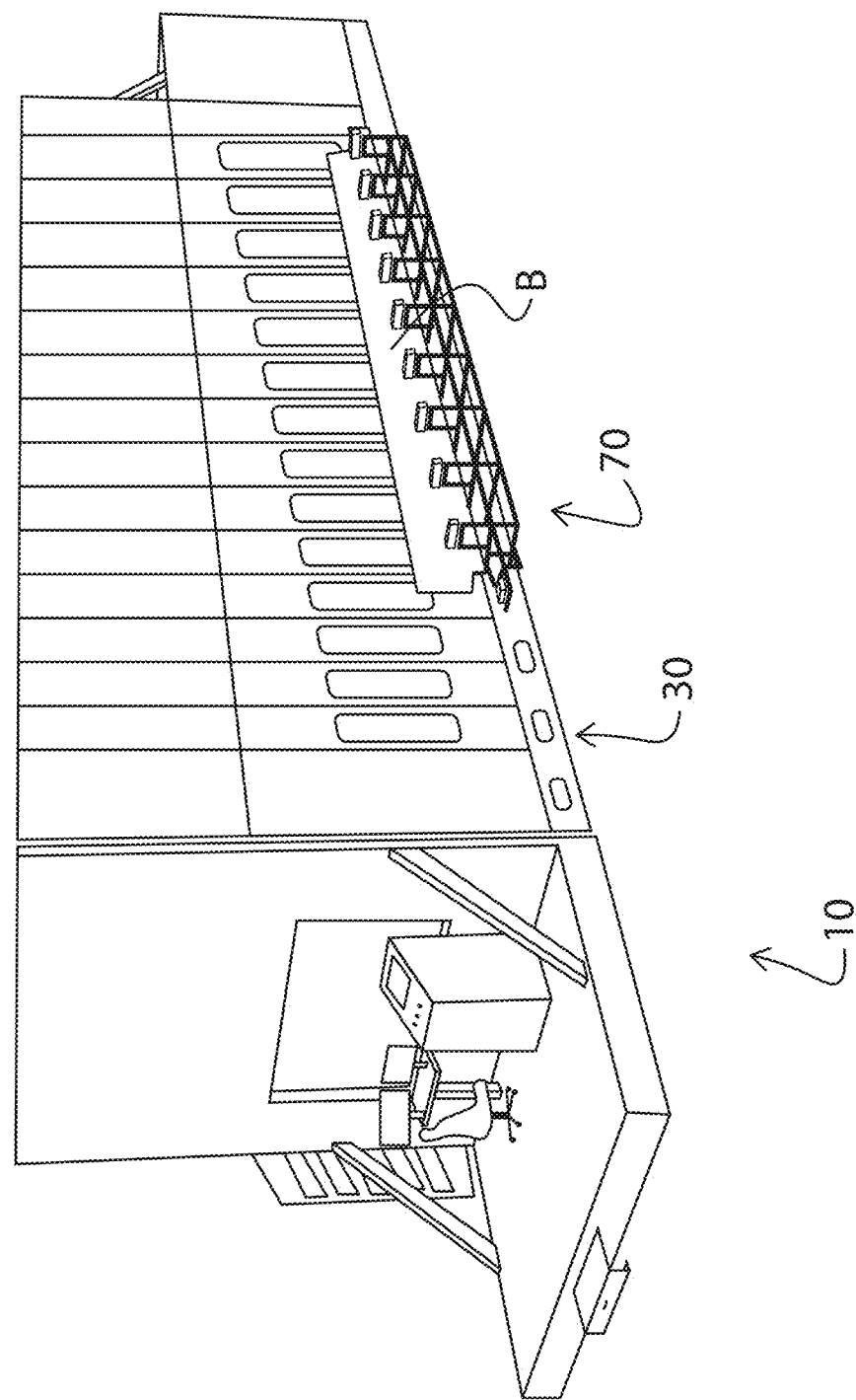
FIG. 40 is a perspective of a blade loaded on a BSC in front of the JARVIS cell.

In an exemplary process, after identifying the blade, it is introduced into the cell 10 through the BIS 30. The blade identification process either creates a new database entry or loads an existing file in preparation for cell entry through the BIS 30. When transferring the blade, as shown in FIG. 40, the BSC 70 is placed directly in front of the of the BIS 30 and an operator initially docks the blade to the cart in a vertical orientation so that the leading edge faces down against the cradled supports 77 and then is slid up against the end stop on the tip side of the blade. Once the blade is correctly positioned in the BSC 70, a tip converter 1710 is attached to the tip end of the blade. Upon completion, the BIS 30 opens the door assembly 33 and the robot 24 extends and attaches to the BSC 70 at the center tool changer 74A. When the robot 24 attaches to the BSC 70, pneumatic stabilizers 72 located along the length of the blade will activate, keeping the blade from shifting during transport.

Figure 41:
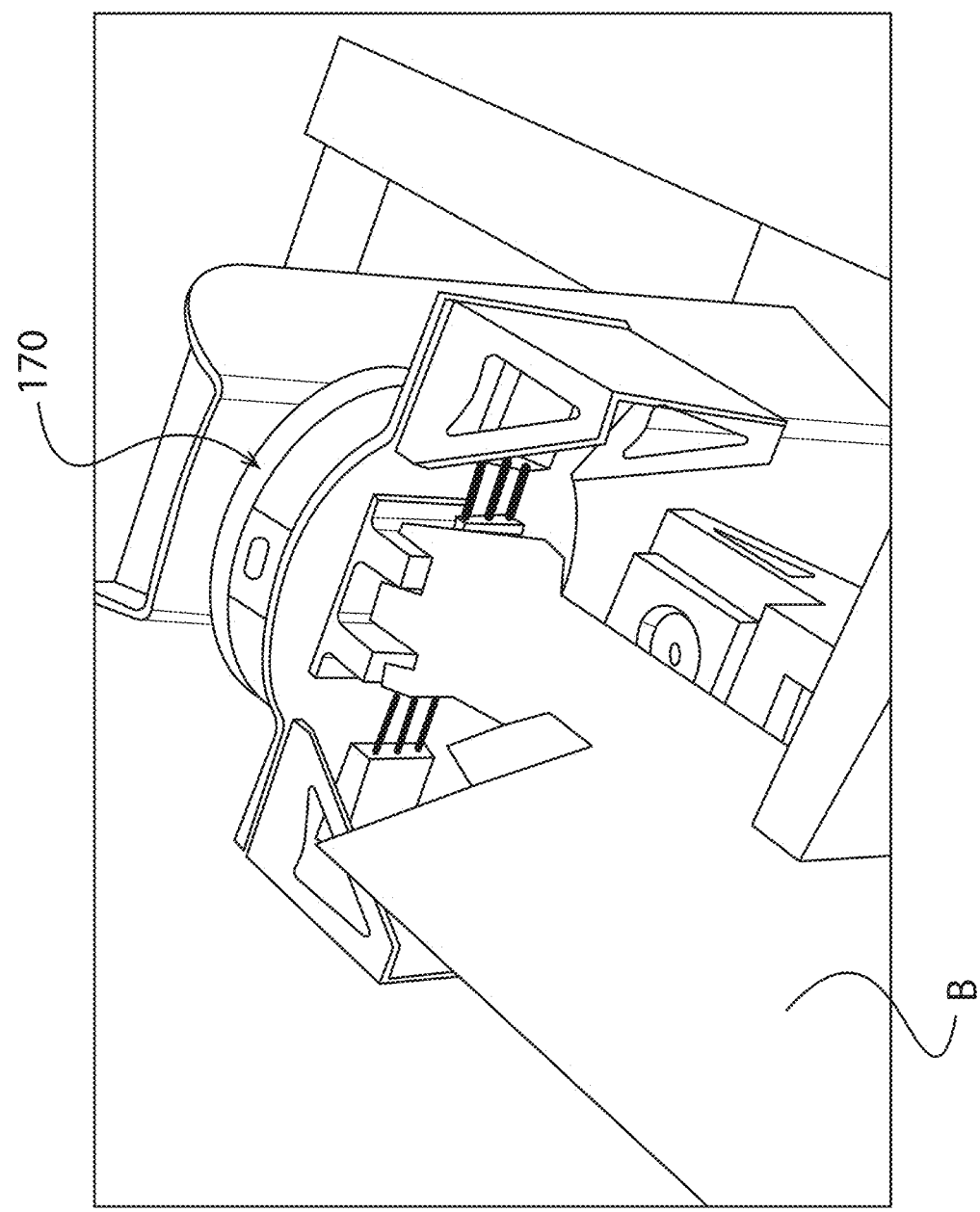
FIG. 41 is an enlarged perspective of a portion of the interior of the JARVIS cell where a blade cuff is mounted onto the BRM.
Figure 42:
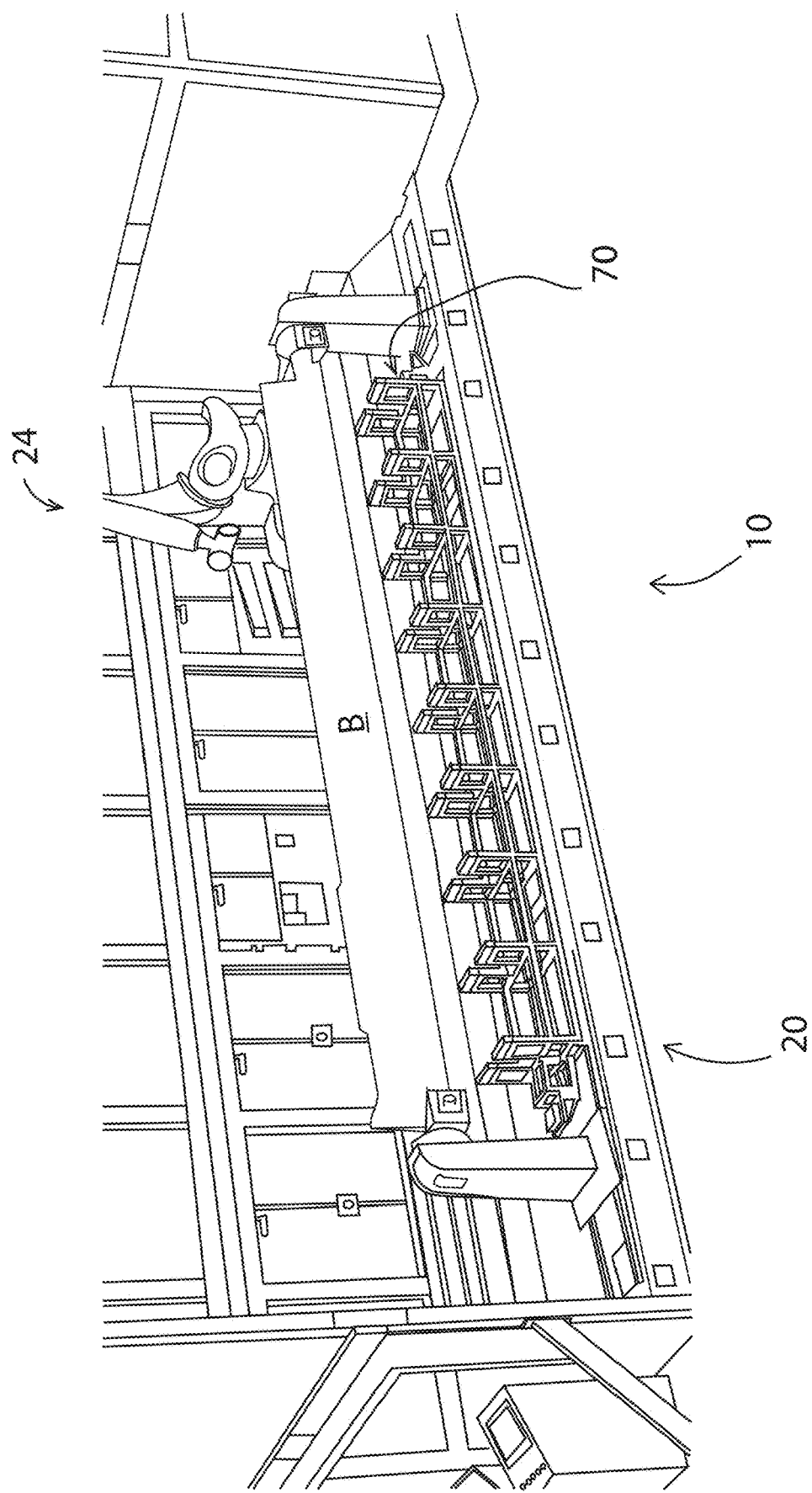
FIG. 42 is a fragmentary perspective of an interior scene of the JARVIS cell in which a blade is supported on rotational positioners of the BPS.
Figure 43:
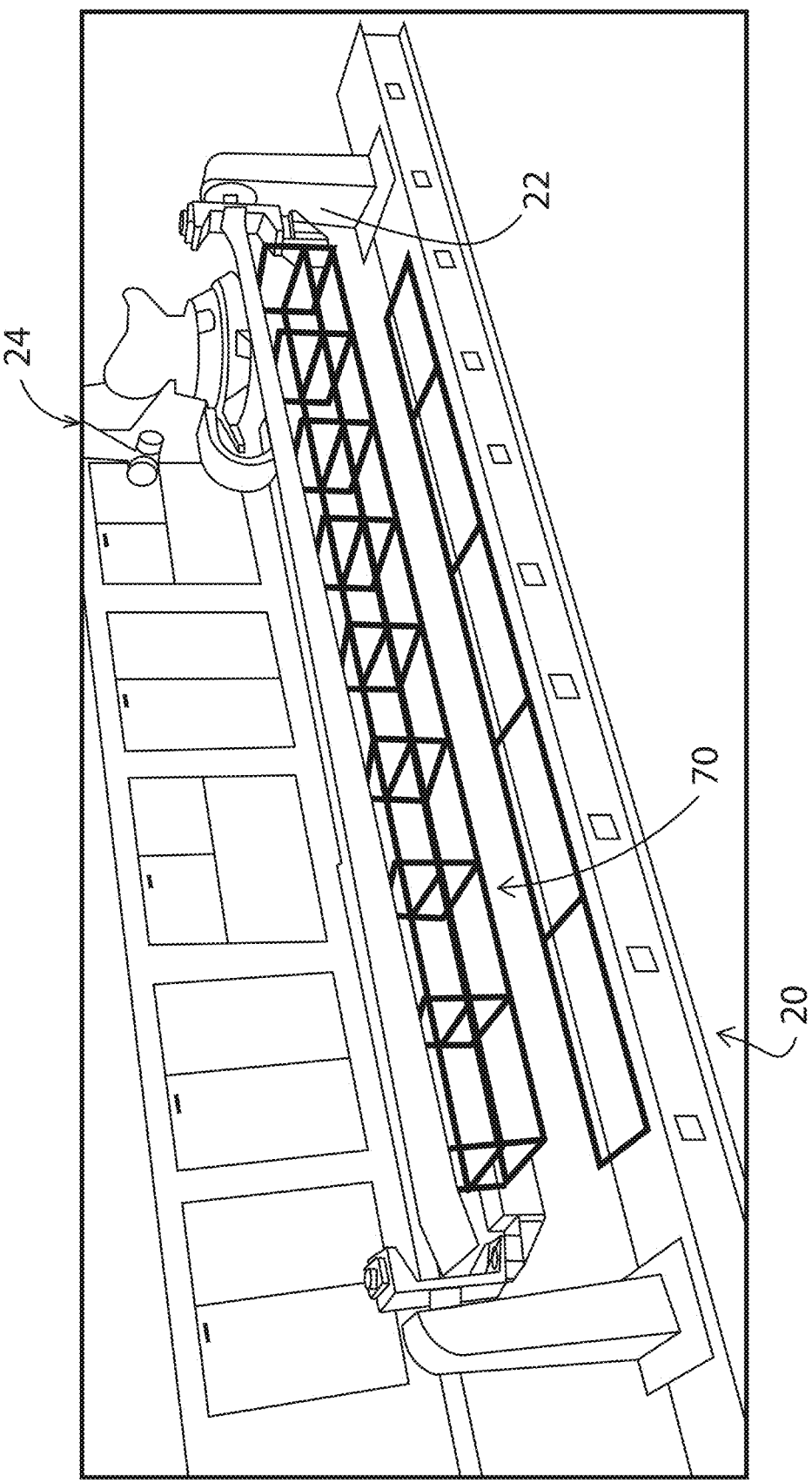
FIG. 43 is a fragmentary perspective of an interior scene of the JARVIS cell in which the BSC and blade are supported together on the rotational positioners.

When the blade first enters, the JARVIS cell 10 performs a docking sequence. During the docking sequence, the robot 24 lifts the BSC 70 and positions the blade between the BRMs 170 where it locks into place (see FIG. 41). Once the blade cuff and tip have been locked into the BRMs 70, as shown in FIG. 42, the BSC 70 releases and the robot 24 lowers it onto the BPS floor for storage. Once locked, the blade is free to rotate with rotational positioners 22. For certain cell processes, to counteract blade sag, the BSC 70 can also be docked directly onto the BRMs 170 so that the rotational positioners 22 rotate the blade and BSC together. This can be referred to as a "stabilization mode." When docked in the stabilization mode, the BSC 70 serves as a stabilization fixture for all processes requiring the blade chordwise direction to be horizontal. While in stabilization mode, the blade can freely rotate and work can be performed at any angle, drastically improving robot reachability. FIG. 43 illustrates the blade in the stabilization mode.

3. Virtual Scanning

Figure 44:
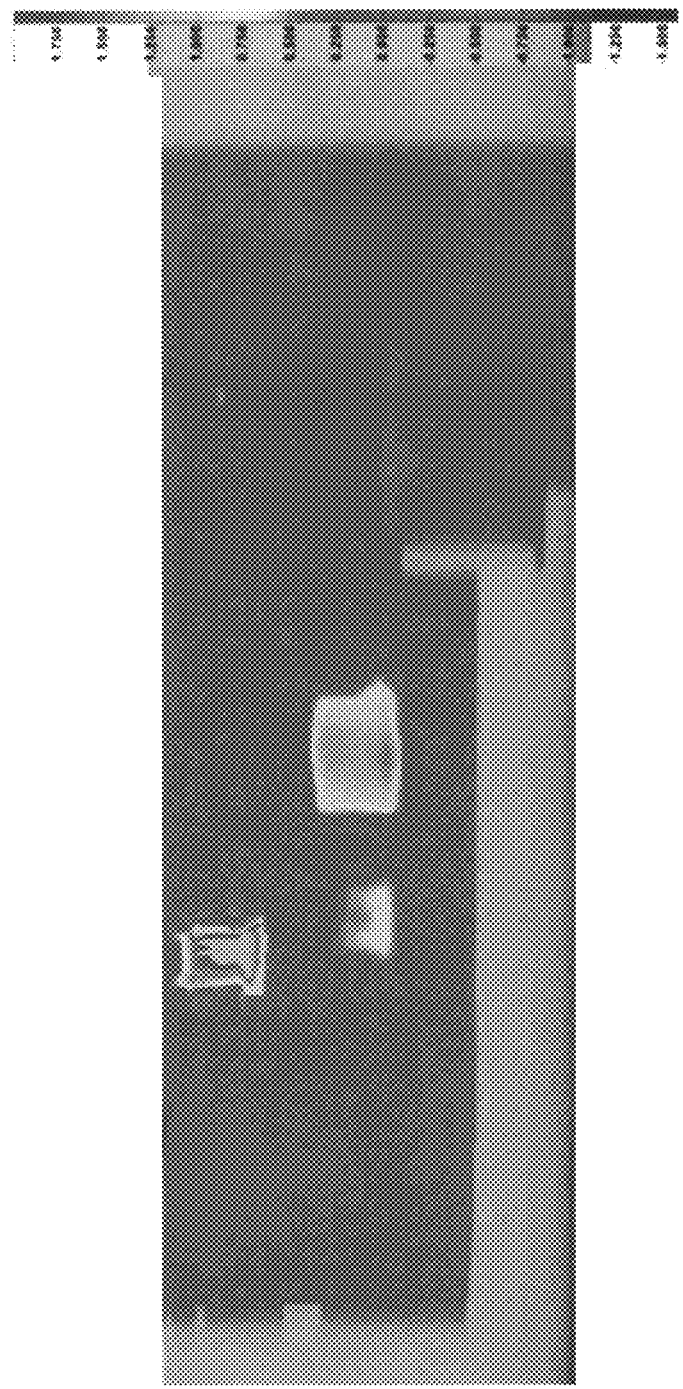
FIG. 44 is a screen shot of a heat map image showing deviation of a blade surface from nominal surface geometry wherein the heat map image is acquired by a virtual scanning process.

Once the blade is securely mounted in the BRMs 170, a virtual scanning process is initiated. JARVIS cell 10 utilizes a combination of laser profilometry and laser trackers for generation of a 3-dimensional (3D) exterior profile. Using this exterior profile, JARVIS cell 10 compares scanned data with the nominal profile. If scanned profile differs from nominal, due to previous scab repairs or other imperfections, the deviations are displayed and stored as shown, for example, in a heat map 4400 in FIG. 44. In the illustrated embodiment, all indications can later be compared to laser shearography data for further evaluation.

Virtual scanning provides a foundation for all other data to be displayed. All NDI data uses the surface model generated in the virtual scanning step to provide the end user with the ability to visualize indications of damage. Virtual scan data is utilized in the generation of tool paths for processing and provides high-fidelity geometrical details for quality control of repair machining operations.

In an exemplary embodiment, Hexagon metrology equipment is used to perform virtual scanning. The inventors believe that this equipment offers highly accurate scanning capabilities and has been extensively integrated into automated systems. Thus, the AT960 laser tracker and TSCAN profilometers are used for virtual scan operations in one or more embodiments. The AT960 Tracker is a portable metrology laser tracker that allows for automatic alignment and tracking of parts, fixtures, and tools. This tracker is automated through scripted macro files, which allows integration into an existing software framework. In one or more embodiments, this equipment is located on the exterior of the ESS as multiple stations will require use of laser tracking to maintain location. The T-Scan 5 is a dynamic laser profilometry device that allows for detailed point cloud collection of surfaces. Different rates, widths, and tolerances are easily adjusted. This equipment will be stored in an MTC 110 and can be used both inside and outside JARVIS cell 10 cell. Accordingly, in one or more embodiments, the JARVIS cell 10 comprises an MTC 110 storing a surface profile scanning device (not shown) (e.g., a laser profilometry device such as the T-Scan 5), wherein the laser scanning device comprises a tool changer for selectively connecting the industrial robot 24 to the laser scanning device so that the JARVIS cell can automate virtual scanning of the blade using the laser scanning device and the robot. Polyworks Inspector can be used to run both the AT960 and T-Scan 5. Polyworks Inspector is a universal 3D analysis and quality control software solution that is widely used throughout the aerospace industry. This software can be chosen to run the AT960 and T-Scan for its seamless integration.

4. Digital Imaging

Digital imaging enables displaying the blade in a virtual environment. Prior to conducting digital imaging, the front and back of the blade are scanned with the virtual scanning process discussed above. Using the geometrical information gathered from the virtual scanning process, a 3D model of the blade is generated and the JARVIS database is updated with the 3D model data for the blade.

Figure 45:
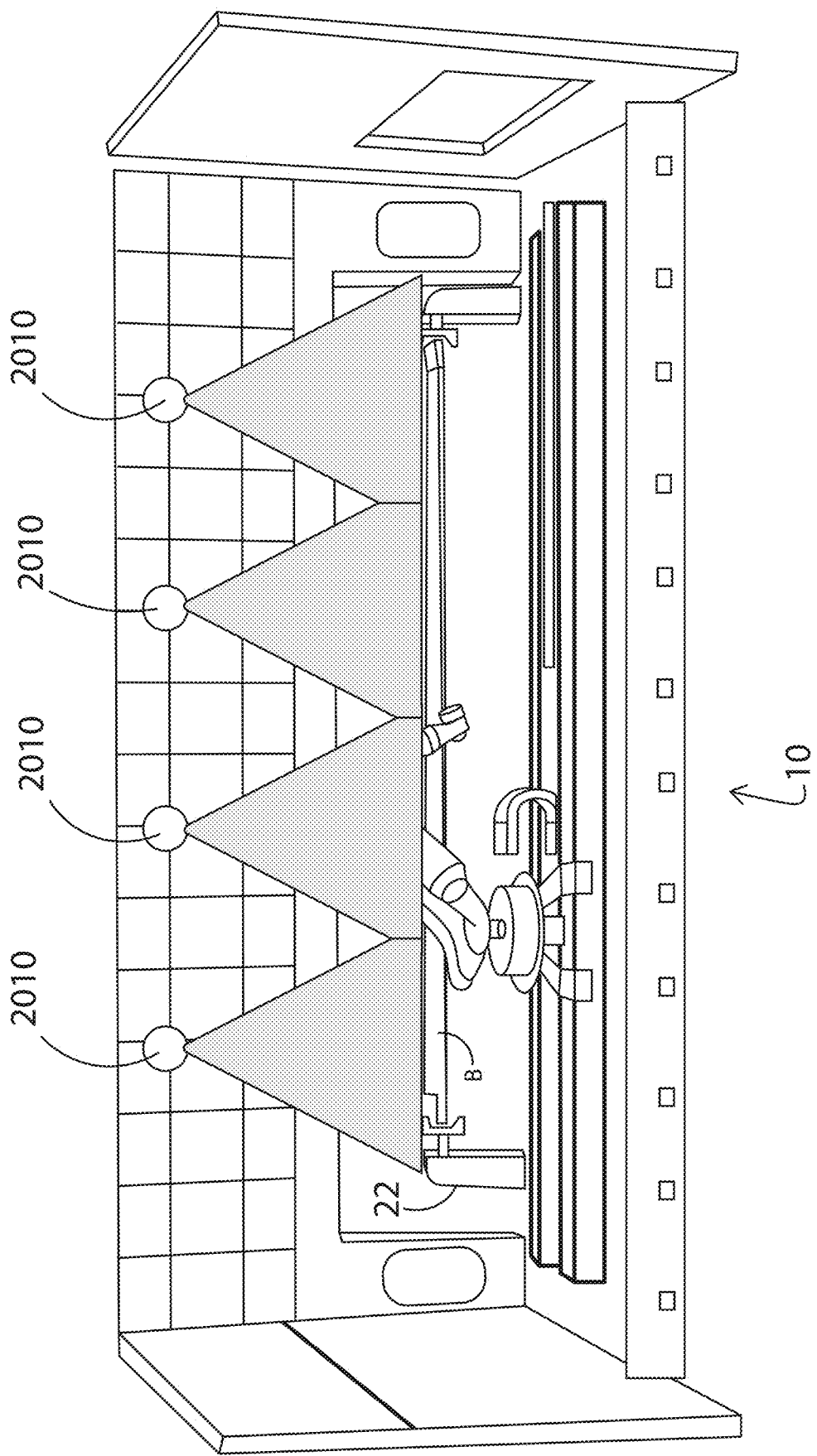
FIG. 45 is a fragmentary perspective of an interior scene of the JARVIS cell in which cameras for a digital imaging process are shown schematically.

Digital imaging uses as an optical inspection method to capture the visual state of the blade. Referring to FIG. 45, multiple high resolution cameras 2010 are mounted inside of the cell 10 for capturing images of the blade B. These images are processed to generate a complete image of the full blade. The processed images are then overlaid on the blade model developed using the virtual scanning process above. The digital images are analyzed to identify any potential defects that can be reliably seen through visual inspection methods. The cameras 2010 also serve a secondary purpose, providing the main operator a live view of multiple locations in the JARVIS cell 10. The tertiary purpose for the cameras 2010 is to analyze any writing or printing on the blade to allow information ingestion of the blade history. The cameras 2010 are mounted in pre-determined locations in the JARVIS cell 10 cell. These locations are selected to achieve full areal coverage of the blade. The four mounted digital cameras capture the entire blade section. The top and the bottom skin image acquisition is achieved by rotating the blade using the rotational positioners 22. The acquired images are stitched using the image-stitching module in the JARVIS software framework, described in further detail below. In an exemplary embodiment, the cameras 2010 comprise a camera sensor such as a Blackfly S GigE (MODEL: BFS-PGE-50S5C-C: 5.0 MP, 22 FPS) and a lens such as a Tamron 25 mm 1.1" C Mount Lens.

Figure 46:
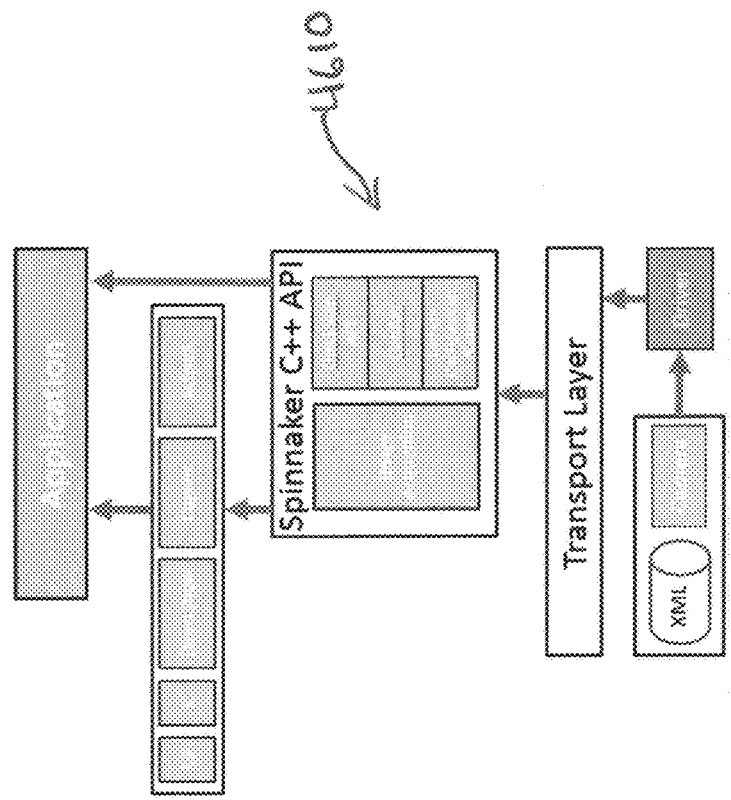
FIG. 46 is a schematic block diagram of an exemplary digital imaging system for the JARVIS cell.

The JARVIS software allows for a plurality of blade images to be remotely captured for use during the optical inspection phase of damage detection process. Additionally, the JARVIS software is configured to stitch images together to generate a full image of the blade. In one embodiment, stitching is conducted using a FLIR Machine Vision camera and its accompanying Spinnaker Software Development Kit (SDK). FIG. 46 provides a schematic illustration of how the SDK 4610 is integrated into JARVIS cell 10 cell.

The Spinnaker SDK allows for the functions of the camera to be remotely controlled and integrated into the JARVIS software framework. A reference is created that points to a list of all connected cameras and then another reference is created to the first camera in the list as shown in FIG. 46. The Spinnaker SDK prevents multiple cameras from being used simultaneously. After the camera is connected, a session can be opened and any of the desired camera functions can be performed using the Spinnaker SDK.

The most important feature of the Spinnaker SDK for the JARVIS software framework is allowing images to be captured remotely and downloaded to the computer. Once the Spinnaker SDK has been initialized and the camera session has been opened, image capture is achieved through a command sent to the camera, initializing acquisition. Prior to capturing the images, an acquisition mode is set. If a single photo is needed, the mode will be set to single frame. However, if multiple photos are needed, then the mode will be set to continuous or multi-frame. After the required photos are captured, a command is sent to the camera to end the acquisition of images. Since there is no memory card in the FLIR cameras, photos are downloaded to the host computer. The download process is completed during the image acquisition phase. When the image is captured, it is saved to a local data buffer in the camera for access from the JCS 60. The captured raw image is then converted into a viewable image and saved to the desired location on the JARVIS software framework. While multiple cameras will be used in the JARVIS cell 10, the photos can still be saved into a pre-defined location. However, common practice dictates that the cameras' serial numbers should be used in the file name to avoid files being overwritten.

Additional functions provided by Spinnaker SDK include live view capabilities and the ability to record videos. This will allow for a live video feed of the JARVIS cell 10 operations to the control station 60 while the camera is capturing the images or other tools are being used. To create a live view, the camera references an image frame, which is downloaded to a data buffer. The downloaded image frame is then displayed in the desired window. To get a continuous feed as opposed to a single image, the image frame is continuously re-downloaded and updated in the window until the view is terminated by the program or the user. To record a video, a list of images is created using the image capture method. The images are then appended to a file to create a video. Once the images are all appended, the file is closed and the video can be opened and viewed.

Although Spinnaker SDK can be used in one exemplary embodiment of a digital imaging system for the JARVIS cell, it will be understood that other embodiments can employ other digital imaging systems.

5. Laser Shearography

Prior to conducting any high-fidelity NDI on the blade, the data visualization and acquisition infrastructure are established, as described above. The geometrical data is converted into a 3D model of the blade and the optical images captured during the digital imaging process are stitched and overlaid on to the blade model to provide a virtual inspection platform and an initial model of a digital twin for the blade. While virtual scanning and digital imaging provide key information for digital twin creation and extreme damage indications, sub-surface damages remain undetected at this stage. In conventional rotorcraft sustainment programs, primary concerns relating to skin-to-core disbond, impact damage, and core crush are currently addressed using tap testing, via coin or tap hammer. As explained more fully below, the JARVIS cell 10 empowers sustainment programs to employ more robust NDI and maintain better track and monitor the effect of the lifetime repairs on a given blade or set of blades.

To mitigate potential errors and provide the end user with enhanced flaw detection capability, improved rates, and archived inspection images/data, an exemplary embodiment uses laser shearography for automated damage detection. Simply, laser shearography provides the ability to image defects and damages through changes in displacement measurements. This technique uses a baseline image taken at an initial state of stress. This state of stress and the associated strain at each location is nulled, allowing for strategic stress application. Stress is applied via mechanical loading, thermal excitation, vacuum excitation, or vibration excitation. Surface strain response due to applied stress is compared with the baseline condition and patterns are formed. Analysis of these patterns provides indications of stiffness and thus the presence of damage is captured from the stiffness mismatch.

Inspections of the rotor blade benefit from this methodology when evaluating the ROI as low stresses are sufficient due to the thin (3-ply) GFRP skin aft of the main spar. All damages resulting in skin-to-core disbond are targeted in this process using laser shearography methods. Using predefined tool paths generated for the main rotor blade, robot 24 will begin by picking the laser shearography system from the corresponding MTC. Once firmly attached to the robot workhead, the system will begin executing inspections beginning at the blade root with a combined vacuum and thermal stressing system. In one or more embodiments, the inspection area covered in one image I is set to be about 18×18 inches for a total of 324.0-$in^2$ per image. Each image must overlap the previous to ensure software-stitching algorithms can correctly identify locations of each image. In one embodiment, sixteen images are taken on each side of the blade for a total capture of thirty-two images. With an approximate time of sixty seconds per image, the inventors estimate the processing time to be less than 45-minutes.

Upon completion, images from the laser shearography inspections are stitched using a JARVIS software. The stitched composite images are overlaid onto the blade model and the database is updated with the laser shearography data. The shearography data is passed through the damage/anomaly detection module to evaluate possible damage indications.

Laser shearography inspections can make use of the Laser Technology Inc. LTI-2100HP-300 in one or more embodiments. This system can be equipped with a 300-mW @ 532-nm green laser, a 2-kW thermal stress system, and a surface mount vacuum system and controller. The LTI-2100 laser shearography system incorporates a CDRH/IEC 60825.1 Class 3B continuous wave (CW) diode pumped solid state laser as the primary source and operates at 532-nm with a power of 300-mW. Due to this, laser emissions near the exit aperture fall within the class 3B emission levels. A second laser source, a collimated red laser operating at 635-nm at a power of 3 mW, is also present. This laser source is rated as a Class IIIa/3R laser product. To protect against potential exposure risks, the JARVIS cell can be rated for Class IV laser products upon cell closure and this cell closure shall be maintained throughout all processes performed. Accordingly, in one or more embodiments, the JARVIS cell 10 comprises an MTC 110 storing a laser shearography inspection device (not shown) comprising a laser, at least one of a thermal stress system and a vacuum stress system, and a tool changer for selectively connecting the industrial robot 24 to the laser shearography device so that the JARVIS cell can automate laser shearography testing of the blade using the laser shearography device and the robot.

Figure 47:
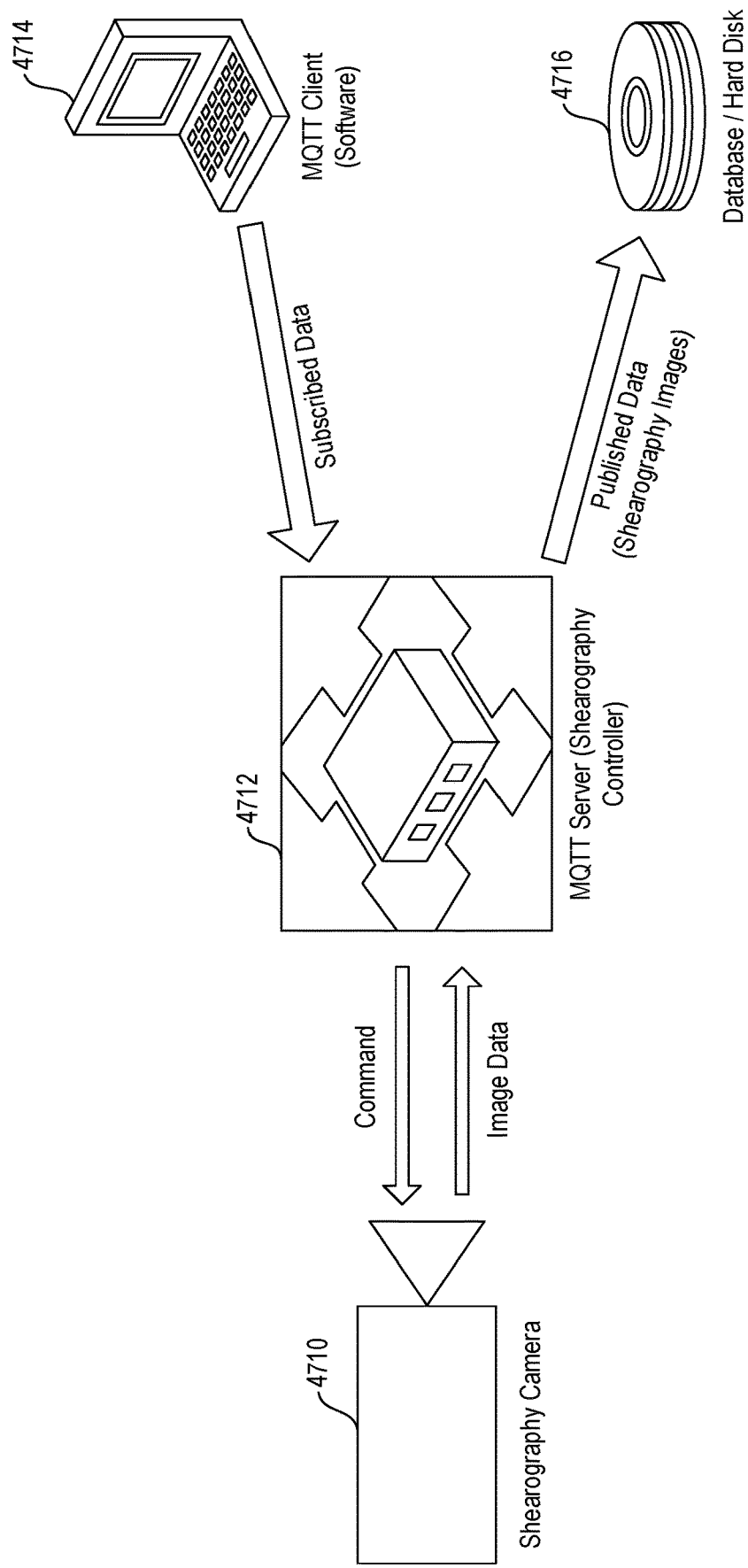
FIG. 47 is a schematic block diagram of a laser shearography system of the JARVIS cell.

A software interface is provided to handle the interface between the laser shearography system and the JARVIS software framework. In an exemplary embodiment, this interface is written in the .NET Framework (C#) to allow open communication between the written software and the LTI-2100 laser shearography system. An external library called MQTTnet can be configured to handle the calling of Message Queueing Telemetry Transport (MQTT) functions for the .NET Framework. MQTT is a machine-to-machine connection protocol that many industrial systems use to handle low-latency communication between multiple devices. MQTT is built with simplicity in mind as it allows communication between devices without significant overhead. MQTT establishes a connection through Ethernet/IP. A connection overview can be seen in FIG. 47, where a shearography camera is represented at reference number 4710, the MQTT server is represented at reference number 4712, an MQTT client is represented at reference number 4714, and a database is represented at reference number 4716.

The client will be handled inside the shearography software module. The shearography software client allows the framework to connect to the server, which is handled by the shearography system. Using the MQTTnet library, a client must first establish an MqttFactory. The MqttFactory handles multiple clients and can run them asynchronously. When a client is established, it must be configured to handle the connection to the server.

The client contains many options including account credentials connection locations. A client ID must be given when connecting to the server; this is usually a default value such as "Client1" when connecting. The client then must be given the Transmission Control Protocol (TCP) IP address of the server. Due to the security restrictions of the project, this must be a local air-gapped IP address.

Additionally, the username and password must be given in the client options. The username and password combination will be configured on the sever and will be hard-coded into the JARVIS shearography software module. The MQTTnet library handles the passwords by storing it as a string in plain text. Attempts will be made to add support for secure string, which will allow an operator to enter the password or a hashed version of the password to be automatically input and then erased from memory. When using the TCP connection, a port must also be specified when putting in the IP address. For connectivity reasons, the TCP/IP and port will be hard-coded into the JARVIS software module.

Primarily, the client's job is to consume (receive) messages from the server. A server message consists of a topic, payload, quality of service (QOS) and retention. The topic received in the message specifies details about the message being broadcast. The payload is the data stored within the message; it is encoded in UTF-8 format. The QOS is how the client and server handshake to ensure the message delivery.

This ensures accurate and reliable delivery of the entire message. The retention tells if the message is retained on the server after the message has been pushed to the client.

After the connection to the server is established from the client, the client can subscribe to a topic. When a client is subscribed, the server will push messages to the client about the particular topic. The method used for subscribing is asynchronous, meaning the client does not have to check with the server periodically and will be pushed a message when the server is ready. Simply, the client will carry out the command upon delivery.

Publishing messages from the client to the server is critical, as the JARVIS shearography module needs to tell the server when to run a test. A message must be created first client-side. The client uses the MqttApplicationMessageBuilder class to initialize a new message with blank properties. The properties are then filled in by the software module to command the server to carry out specific tasks. Not all properties are required when creating and sending a message. When a message/command is published to the server, it will typically confirm with a status reply so the software can tell if the command has been accepted.

To automatically carry out a test, a look up table must be created for the laser shearography system. When a test is run, it uses the look up table to run specific tests with different parameters. An example of which can be seen in Table 2 below.

TABLE 2

| SectionID | Row | Column | HeatTime | TestTime | TimeDelay | RefreshType |
|---|---|---|---|---|---|---|
| 1 | 1 | 1 | 5 | 10 | 1 | 1 |
| 2 | 2 | 1 | 4 | 11 | 1 | 1 |
| 3 | 3 | 1 | 5 | 13 | 1 | 1 |
| 4 | 1 | 2 | 7 | 10 | 1 | 1 |
| 5 | 2 | 2 | 10 | 10 | 5 | 0 |
| 6 | 3 | 2 | 4 | 9 | 5 | 0 |
| 7 | 1 | 3 | 5 | 8 | 5 | 0 |
| 8 | 2 | 3 | 5 | 12 | 5 | 0 |
| 9 | 3 | 3 | 6 | 11 | 5 | 0 |

The look table has several columns. SectionID is the identifier for which test parameters will be loaded when the test is executed. Row/Column is a geometric locator for the test. This information can be used by the Mosaic Window function to position the sections, assuming a rectangular grid with the origin in the top left. HeatTime/TestTime/TimeDelay are test parameters are loaded when a test command is issued for a given SectionID. They correspond to the "Thermal Test" parameters and have units of seconds. RefreshType is binary, where 0 means "Refresh After Heat" and 1 means "Refresh Before Heat". Note: If RefreshType is 1 (Refresh Before Heat), the TimeDelay parameter is not used. However, that field still must be a non-zero, non-negative value.

6. Pulsed Thermography

Laser shearography provides an indication of damages caused by impact or other phenomena leading to core-to-face sheet disbond. Another primary concern with thin GFRP laminate constructions is moisture ingression. Caused by facesheet damage or porosity, moisture ingression can deteriorate structural adhesives through ground-air-ground thermal cycling effects. Additionally, rotorcraft performance relies on precisely tuned rotor blades for operation. Presence of water or other foreign object debris (FOD) adds unaccounted weight and can create undesirable flight characteristics. Current methodologies make use of X-ray digital radiography (XDR) for interrogation of internal structure for indications of moisture ingression.

XDR provides excellent detection and visualization of entrapped moisture and is the preferred method of inspection. However, XDR technologies are not readily available for field deployment and performing imaging with film is not desirable due to safety concerns and expendable requirements. To mitigate these concerns, a pulsed thermography system can be utilized. Pulsed thermography has the ability to image nearly as quickly as automated XDR systems, but poses no large safety concerns.

In thermography, a stimulus is applied to the component at the region of interest. In pulsed thermography, this can be in the form of scanning lasers, jets of air, or commonly, flash lamps. Infrared cameras then monitor the surface temperature variation during the heating or cooling phase. Reflection pulse thermography utilizes the stimulus and the recording infrared camera on the same side of the component, while transmission pulse thermography utilizes the stimulus on one side of the component while the infrared camera records from the opposite side. In both reflection and transmission pulse thermography, the thermal energy generated propagates into the component through diffusion, while an infrared camera monitors the surface temperature variation. Due to changes in thermal effusivity in the presence of a disbond, delamination, or other flaw, heat flow is altered and is thus captured by the infrared camera.

Inspections of a rotor blade benefit from this method when evaluating the JARVIS ROI as heat flow is altered in the presence of moisture. Using predefined tool paths generated from the main rotor blade, JARVIS will begin by picking the pulsed thermography system from the MTC. Once firmly attached to the robot workhead, the system will begin executing inspections beginning at the blade root.

Inspections are performed from the bottom side of the blade, as moisture will be settled against the lower blade skin. With the ability to rotate the blade about the feathering axis, rotation will be allowed and optimized to improve reachability while maintaining benefits of underside imaging. In an exemplary embodiment, inspection area covered in one image is approximately 8.0-inches×10.0-inches for a total of 80.0-in$^2$ per image. Each image must overlap the previous to ensure software-stitching algorithms can correctly identify locations of each image.

Pulsed thermography inspections can be conducted using of a Thermal Wave Imaging (TWI) inspection system. The system features a FLIR SC4000 camera recording at 60-Hz, which has a resolution of 320×256 pixels, a 42 Hz internal frame rate, and a 14-bit data resolution. The camera and hood comprise a robot end effector stored in an MTC 110 in such a way as to allow for safe and efficient pick and place from the MTC using a QC21 robotic tool changer. Other suitable pulsed thermography systems can also be used without departing from the scope of the disclosure.

For integration with the pulsed thermography system, the MOSAIQ application from TWI may be used. The MOSAIQ application is a tool used specifically for thermographic signal capturing and signal reconstruction. Thermal Wave Imaging has included automation support inside MOSAIQ that can be used accessed through a component object model (COM) interface.

With the MOSAIQ software interface, the capture and data handling can be automated though the JARVIS software framework. This allows the ability to control the pulsed camera flash along with the camera capture command. The aim of the JARVIS software framework is to automate the pulse thermography process, which is conventionally done by hand. Software will permit the capture of thermography images on the entire blade, automated stitching of the images, in addition to image curvature corrections and automated saving.

As explained above, the thermal camera being used for the automated pulsed thermography is the FLIR SC4000 high-speed infrared camera. The high frame rate and 14-bit data resolution creates large data files, thus an efficient transfer method must be used. In one or more embodiments, the camera connects to the PC using an onboard capture card connected through a PCI slot located on the motherboard. A MDR to SDR cable is used to connect the FLIR camera from the Camera Link port to the capture card. This connection allows the data to be off-loaded to the main JARVIS system at high speeds.

The MOSAIQ application makes use of a special FLIR capture engine provided with the software for native support. This capture engine automatically picks up the attached camera and allows easy integration without the need for additional software development kits (SDK).

The trigger for the flash bulbs will be connected directly to the controller. Prior to any capture commands being issued to the MOSAIQ automation interface, a signal is sent to the flash controller. This signal will initiate a pulse to the flash bulbs, followed by a signal for capture command.

Using the JARVIS software framework, a thermography interface module may be written in the .NET Framework (C#). The thermography software module can access both the automation and capture interfaces written into the MOSAIQ application. These application interfaces control the automated data collection and capture settings, respectively.

The SC4000 IR camera's internal frame rate is processed at 420-Hz, while the capture rate is at 60-Hz. Thus, an average of 60 frame timestamps can be used for each cell. Depending on the section of the blade being examined, a different timestamp may show enhanced images due to the varying thickness and support structure.

With the camera and hood mounted on the robot 24, control of the flashbulbs cannot be obtained through the automation interface. Therefore, control of these flash bulbs must be handled through a separate integration in the thermography interface. This is accomplished through a trigger signal that is sent from the thermography module to the controller using the JARVIS communications module.

The frame exported from any timestamp is exported as raw byte data in a multi-dimensional array of values. These values are arranged in a grid of 320×256 corresponding to each pixel in the captured frame. The automation interface includes options to export these values arrays into an image format using multiple normalization techniques. These image formats include common image formats such as jpeg, png, and bitmap.

After the entire project dataset is exported into images, the image data is then sent into the image stitching software module for consolidation. After the images are stitched into one article, it is then sent into the feature detection software module. This allows previous repair history to be segmented and new damage indications to be found.

7. Static Balance

It can be seen that the virtual scanning, digital imaging, laser shearography, and pulsed thermography processes provide NDI data that can be used to identify necessary repairs. Prior to performing intrusive repair operations, data will be collected on static blade weight and balance. Pre-repair static balance evaluation will allow data to be collected and archived for determining effects of repair processes on weight distribution. With advanced digital twin data collection for known damage severity and subsequent repair sizes across large quantities of repaired main rotor blades, JARVIS machine-learning algorithms can be taught to optimize blade repair geometries. In an exemplary embodiment, to accomplish this, three static balance checks are performed. Two balance checks will only capture weight, spanwise moment, and chordwise moment with no weight adjustments applied. These checks will be performed pre-repair and post damage removal, prior to repair processing. The third and final balance check will occur post-repair and will be the final process performed before dynamic balancing.

Currently, static balance checks do not occur mid-operation. Rather, all processes are completed and post-repair static balancing is performed before dynamic balancing. In this evaluation, the Avion AVM-OM-001 static balance fixture is used. This system, upon proper setup, obtains span and chord moment values for comparison to desired specification. A 36,000-in-lb span moment is required on the UH60 A/L after paint application, and systems are calibrated using an optimized "master" blade. To achieve required specifications, various locations on the main rotor blade are loaded with weight to compensate for weight added during repair processing.

Figure 48:
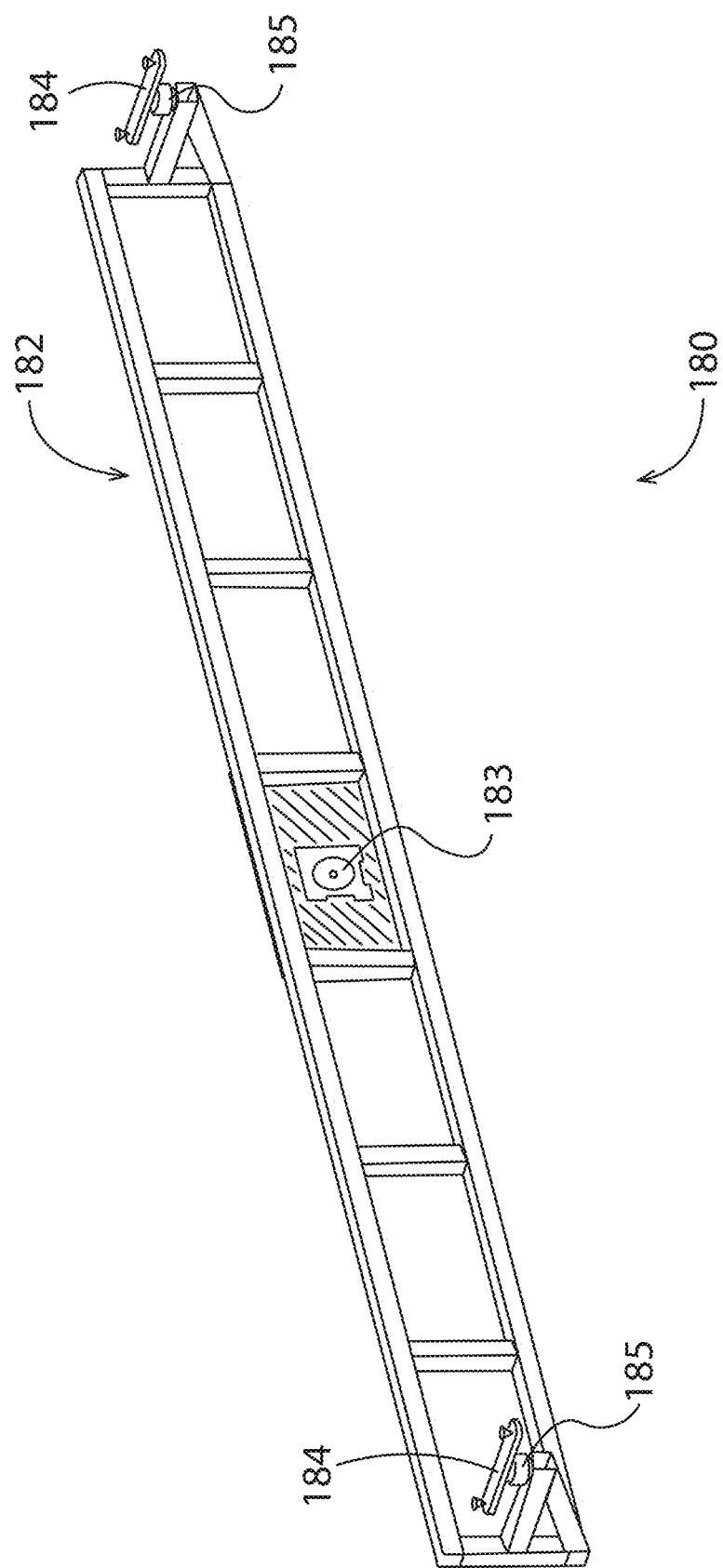
FIG. 48 is a perspective of a static balancing fixture (SBF) of the JARVIS cell.
Figure 49:
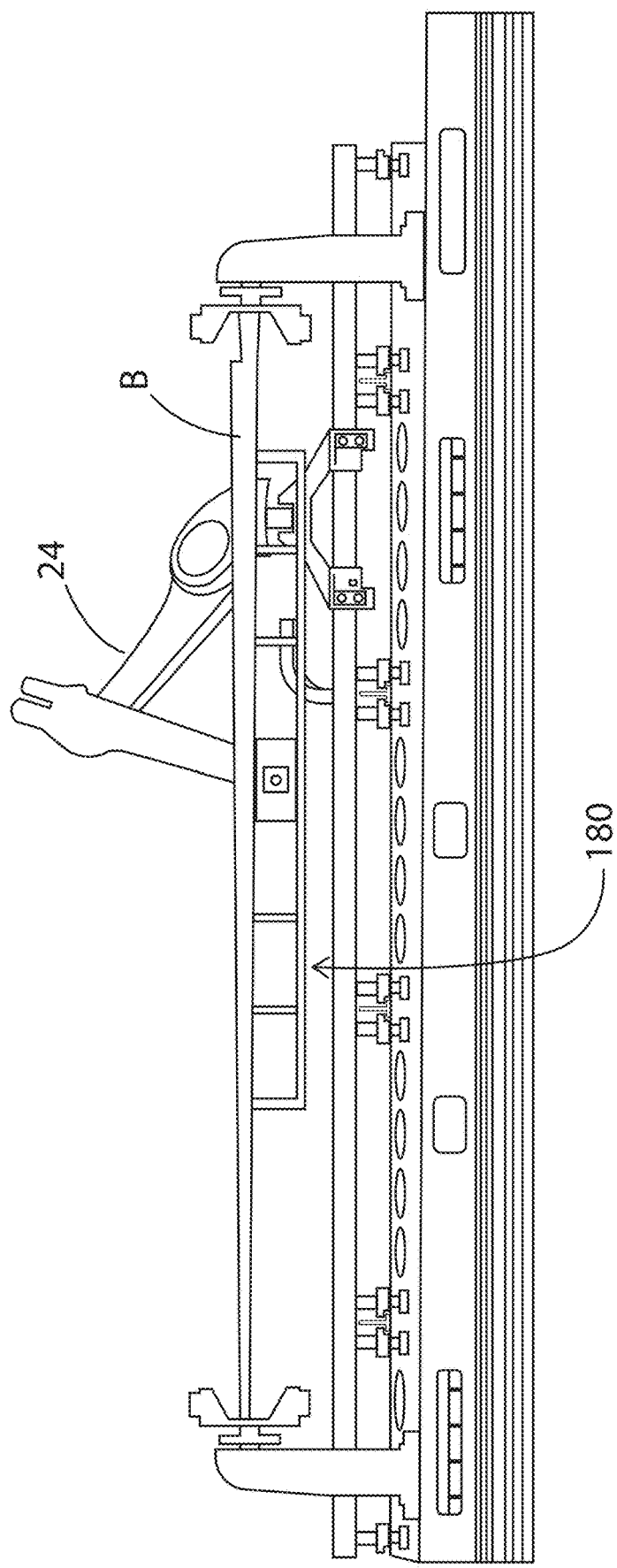
FIG. 49 is an elevation of the JARVIS cell using the SBF to test static balance of a blade.

Referring to FIGS. 48 and 49 static balance of the rotor blade B in JARVIS will use a custom balance fixture 180 (SBF) stored inside of the cell 10. The SBF 180 comprises a frame 182 and a tool changer 183 at a midpoint along the frame. The tool changer 183 allows the industrial robot 24 to connect to the SBF 180 and employ the SBF for static balancing processes. At the opposite end portions of the frame 182 frame, the SBF 180 comprises balancing supports 184 supported on load cells 185.

Using the industrial robot 24 to pick up SBF 180 from the upper wall of the TDS 40, the fixture 180 will then be positioned underneath the main rotor blade with support locations shown in FIG. 49. Once in place, the robot will monitor the load sensors 185 until the weight of the blade is achieved. Blade cuff and tip attachments at the BRM 170 will then be released to allow 1.0-inches of vertical movement to ensure no blade contact is made. Indexing pneumatic actuators with displacement gages will retract and record offset values in the chord-wise direction to ensure tolerances are met. Weight and moment data will be recorded and BRM attachments will fire back into place. The robot will lower the SBF 180 away from the blade B, swing, and place the unit back on the TDS 40.

8. Core and Plug Repair

The non-destructive inspection (NDI) data is analyzed by JARVIS software modules (described in further detail below). This is accomplished through detailed analysis of results from all inspection methods through the damage assessment tool. The damage assessment tool assists the JARVIS operator with damage indication identification. The JARVIS software framework analyzes the results from all NDI methods and runs a feature and anomaly detection algorithm on all data types to generate damage/suspect areas of the blade. This information is provided to the operator in a graphical user interface with damages overlaid onto the blade model. This provides the operator location information about the suspect damage/anomaly locations which aids in decision-making.

After the damage area is confirmed by the operator, the JARVIS software framework provides pre-determined repair patch and core dimensions to the operator that can be used for repair scheme development.

Based on the input from the JARVIS operator, required dimensional data format files are developed by the software framework. These data packages are used to develop the tool paths for damage removal and core/patch machining in the repair process. The pre-determined repair geometries can be updated to increase the repair core/patch combinations as required.

Core plug and repair patch design selection process generates the required repair scheme geometries based on the results obtained from the damage assessment module. This module will cross-analyze the results of the multiple inspection techniques featured in JARVIS. Each of these inspection techniques generates a suspect area that references a specific location on the blade. The damage assessment modules compares the suspect areas to each other by location to determine if a suspect area is detected across multiple inspection systems.

The digital imaging module gives an overhead view of the external areas of the blade. This allows the optical data to show any suspect areas such as marks or abrasions on the surface of the blade. The virtual scan exports meshed surfaces of locations that extend from the nominal surface. The meshed surfaces can also be given as point cloud information. The point cloud information allows accurate point-to-point data to be examined and compared to evaluate overlap in other NDI data captures. Both the thermography and shearography inspections produce data as an image. With the help of the laser tracker reading the machine position, image results are tied to specific blade locations much like digital imaging. Therefore, when a blade image result is saved to the database, the location of the defect and an approximate size is also saved. The feature recognition module is used to detect the defects in the digital imaging, shearography and thermography software modules. Using machine learning, it can scan through the images produced from the inspections and produce a mask around areas that are identified as defects, past repairs, or unknown indications.

9. Paint Removal

Damage detection techniques ranging from visual inspection methods to high-fidelity inspection methods provided JARVIS users with information on defects and damage that must be repaired. Prior to repair operations, paint must be removed to allow artisans to perform repair processes in the ROI. Current operations rely on plastic media blasting (PMB) or abrasive sanding. PMB performs paint quickly, the speed of PMB can be negated from rework due to damaged GFRP skin plies. Abrasive sanding performs paint removal more slowly, but artisans have improved control of removal depths. To mitigate errors during processing and focus on rate dependency, an exemplary embodiment of JARVIS uses laser ablation for automated paint removal, instead of the conventional methods.

Figure 50:
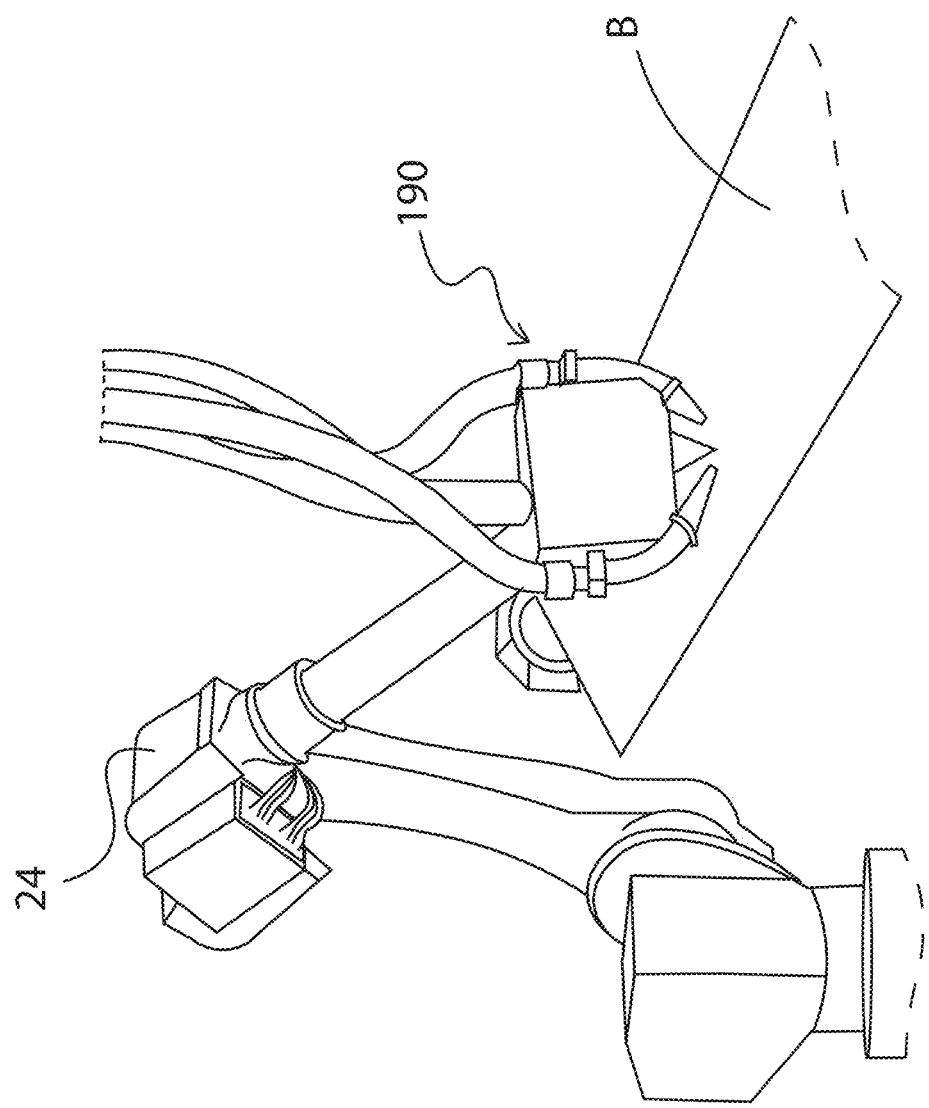
FIG. 50 is a fragmentary perspective of a robot conducting paint removal with a laser ablation system.

Laser ablation of paint uses laser energy focused and absorbed by the surface, resulting in the vaporization of the coating. Referring now to FIG. 50, in one or more embodiments, the JARVIS cell comprises an automatic rotor blade stripping system (ARBSS) workhead 190 configured to operatively connect to the industrial robot 24. This workhead 190 automatically detects and removes paint from the surface of the blade. In an exemplary embodiment, the workhead 190 comprises a General Lasertronics Corporation (GLC) ARBSS and a tool changer (not shown) configured to selectively connect the work head to the industrial robot. Thus, paint removal can make use of a General Lasertronics Corporation custom rotary workhead and laser system. Such a system contains a 500-W Ytterbium pulsed fiber laser, a vacuum system for debris removal, and a color selective sensor for fire/no fire command. GLC custom workhead and laser unit. The workhead 190 will be mounted to an ATI QC-210 tool changer and will be hard mounted to the inside of the cell. No outside operation of the laser ablation paint removal system will be permitted due to class IV laser safety requirements. The inventors have discovered that the workhead 190 is able to reduce paint stripping time by 90% in comparison with conventional paint stripping techniques such as abrasive sanding.

Figure 51:
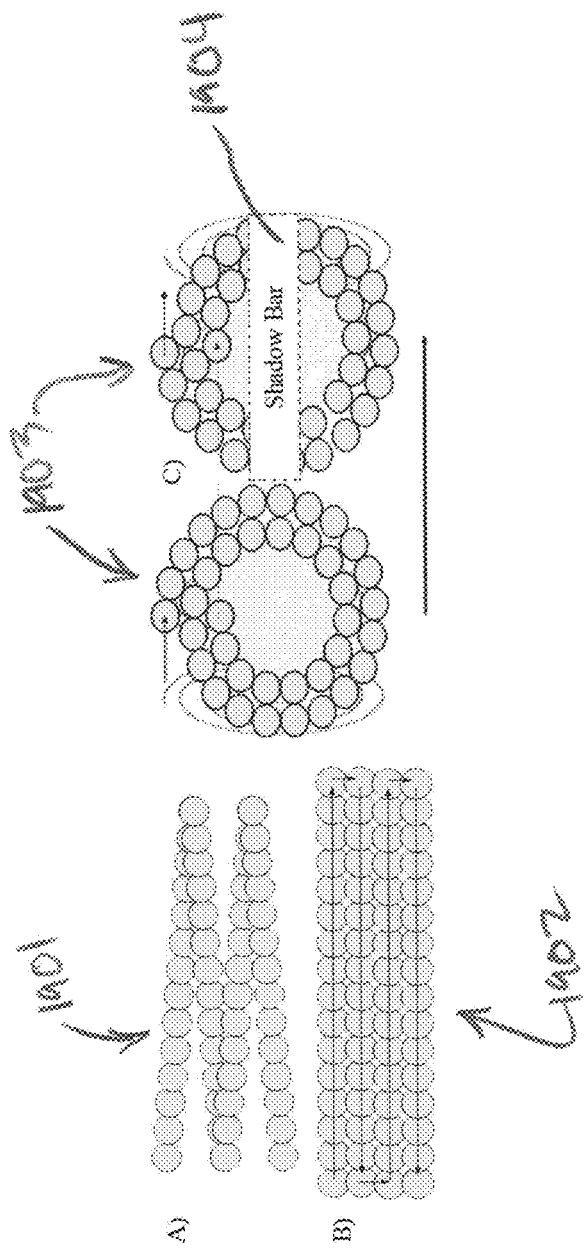
FIG. 51 is a set of schematic illustrations of laser ablation patterns.

The workhead 190 can optionally use a complex galvanometer to create a linear raster pattern 1901, 1902 in the X and Y direction as shown in FIG. 51. This directs the laser in straight lines along the surface of the blade. While this two axis approach can achieve the goal of removing paint, the inventors discovered issues including spotty removal, slow movement of the workhead, and complex control measures to ensure the laser does not repeatedly fire in the same location as damage of the substrate below can occur.

These potential issues have led a workhead that employs circular scan patterns 1903 are used as shown in FIG. 2.49C. Since the laser must only move in one way (circular) instead of along the X and Y axis linearly, the workhead was designed to be more compact and robust. The circular raster also allows the scan to be done smoothly and at a constant speed. In addition to the increase in movement speed, removal rate is also increased as the surface is hit multiple times by the laser in a single pass. This allows the laser to be run at a lower power, decreasing the risk of damaging the substrate or the system while still achieving the desired removal rates. Initial design flaws caused overheating and burning of the outside edges, though these errors were mitigated through the use of a shadow 1904. Shadow bar generation relies on a control system to interrupt laser firing at locations where high energy concentrations are present, or areas found during system tuning to create large heat affected zones (HAZ).

Laser ablation paint removal benefits from this methodology when removing external paint from the damaged region of interest (ROI) as precise control is obtained. Color selective firing of the laser system prevents firing on locations where topcoat is already removed. Using this feature, the laser system will not remove topcoat past the primer layer. JARVIS will begin by picking the laser system from the inside of cell. Once firmly attached to the robot workhead, the vacuum system will activate and the JARVIS control system will navigate the end effector to the ROI. The ROI for stripping will be predefined and set to be one-inch outside of the required scarf area.

GLC rotary workhead allows for a scan path of 1.25-inches in width. The inventors estimate a workhead speed of 1.0-inches/second with two passes is required. Dual passes combined with optimized tool paths reduce HAZ and allows for enhanced stripping results.

10. Damage Removal

Figure 52:
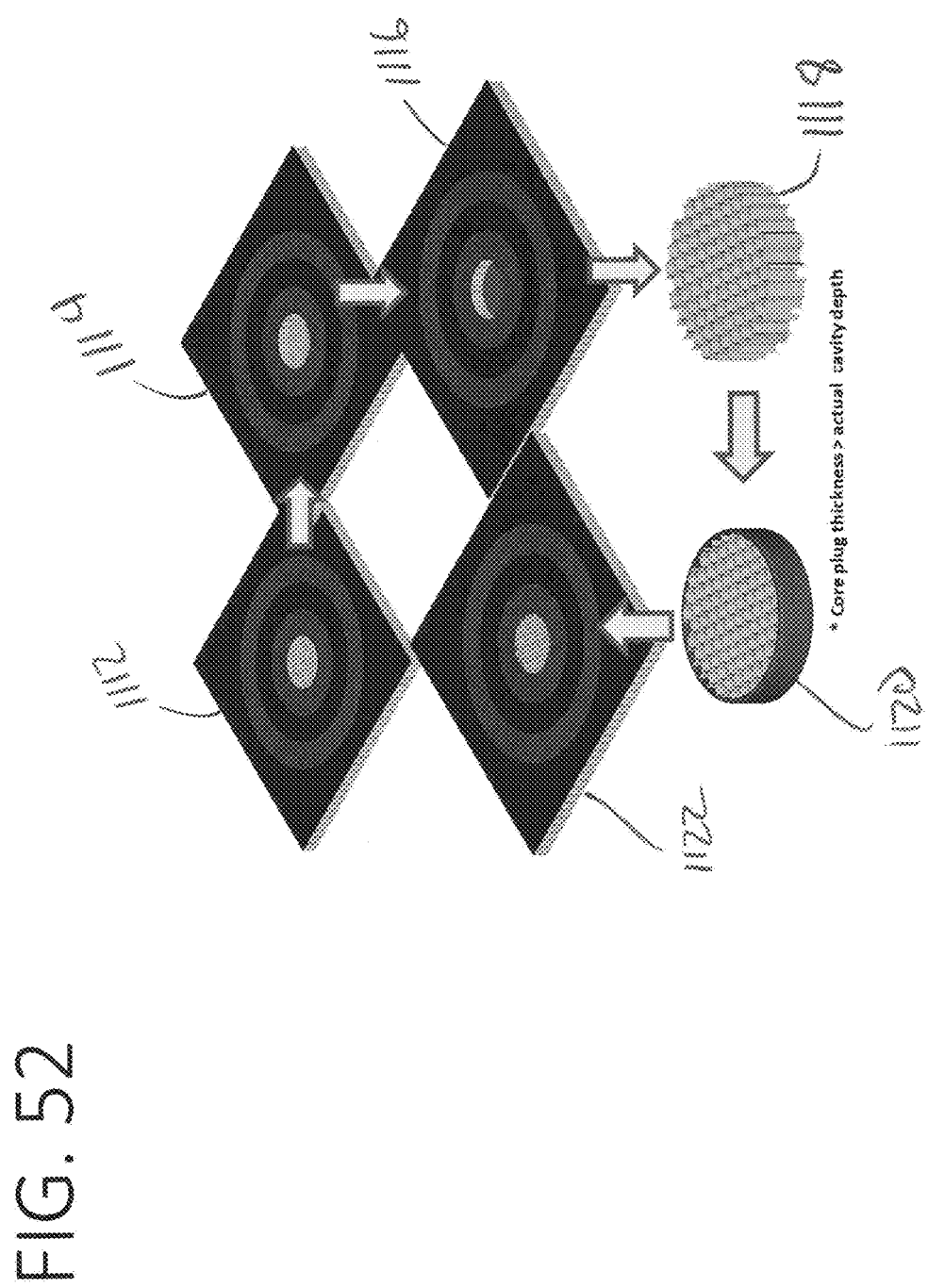
FIG. 52 is a schematic illustration of a plug repair process.

Blade repair process includes the removal of the damaged blade section (parent material) and replacement of the removed section with a repair material. After paint removal, the repair region requiring removal is again identified and approved by the user. As explained in further detail below, in the illustrated embodiment, the JARVIS cell 10 is configured to perform both skin scarf patch repairs and core splice repairs. Skin scarf patch repairs focus on removal of the skin and tapered scarf sanding of the edge for better adhesion of the repair patch. Referring to FIG. 52, core splice repairs comprise removing the damaged top skin layer (step 1112) and then removing the damaged core layer (step 1114). Based on repair type required, the JARVIS cell 10 is programmed with pre-determined damage removal patterns for skin scarf repair or core full-depth core splice repair configurations. Each of these repair configuration associates a required damage removal scheme. The tool path for the selected damage removal scheme is generated using a JARVIS software module that converts Computer Numerical Control (CNC) tool path to ROBO tool paths. After the tool path for the robot is generated, the repair area is removed using a composite machining tool mounted to a spindle motor connected to the industrial robot 24. Upon completion, virtual scanning will be performed and geometrical information will drive core plug and skin patch sizing.

Robot post development is the process by which CNC code is converted into a program that specific robot controllers can read. This is necessary as robots cannot read CNC code outright and each robot manufacturer has their own code that they allow their robots to read. In an exemplary embodiment, RoboDK is used to perform the post development process. The post development process generally comprises the following steps (1) setting up of the station in RoboDK, (2) loading the CNC code into RoboDK, and (3) altering the processed program. Setting up the station in RoboDK purely consists of adding the required robot, track, and necessary settings for the given tool path. This station set-up is saved and used for the loading of the CNC code. For each tool path, a new station is made, thus creating a template for each path. Since there are a limited number of paths available, these stations do not need to be dynamically created. The CNC code, machine reference point, and the tool center point is passed into RoboDK for post processing. In this embodiment employing a KUKA industrial robot 24, this is where the KRL code, KUKA Robot Language, is generated for use with the robot. This post process can be tested to check the feasibility of the given tool path in reference to the given reference point. If the test passes, the robot code will be properly generated for use on the specified robot. If the test fails, an unfinished source file containing the program will be generated and will not be able to run on the robot.

In the case that post processing is successful, the robot code will be altered by a program that removes specific lines of code that stop the program from being executed by the robot. The last step allows the option to run the robot code using approximated line motion or spline motion commands. Approximated lines are robot point-to-point movements, which are typically more accurate, but the movement can appear as to jolt violently from point-to-point. Spline motion is a smoothing technique which allows the points to be approximated along a spline curve and allow smoother motion. Spline motions are typically chosen for robotics due to ease of generation and less room for error.

11. Core Restoration

Core restoration may be required if indications of damage to the core-to-facesheet interface or core crush damages are detected during NDI. This is a critical step in the honeycomb core and pocket skin repair configuration as the damaged core must be replaced with pristine core material to maintain the structural integrity of the blade. The core restoration process is a manual process in the JARVIS cell 10. Operator is expected to perform all tasks related to core restoration manually. MEO guidelines are strictly followed during the core restoration process.

Core restoration will take place while the blade is mounted in the cell. Referring to FIG. 52, after the damage removal steps 1112, 114 are performed as described above, the initial step in the core restoration process is to clean any material or debris still present inside the machined cavity. After the cleaning process is complete, the inside of the bottom skin of the blade has surface preparation and repair readiness checks performed. The exposed bottom skin will ultimately be adhesively bonded to the core plug with film adhesive. Therefore, the bottom skin of the blade is surface prepared using the Atmospheric Plasma Treatment (APT) method and repair readiness check outlined in section II(13) below. At step 1116, a layer of film adhesive is cut to match the geometry of the cavity is placed on the bottom skin. Material handling guidelines are followed for film adhesive material, prior to extracting the required film adhesive layer. After the film adhesive layer is placed, the core replacement process is started. As shown in step 1118, the core plug is machined in the PMC 160. Step 1118 can be performed before step 1116 in one or more embodiments. The repair material used for core plug is preferably identical to the core material in the blade B. The core thickness of the plug is intentionally machined to be thicker than the parent material so that core shaping can occur after core placement, allowing the plug to match the blade contour prior to bonding the scarf patch. The machined core plug is cleaned with a vacuum cleaner to remove any core residue from core plug machining. The core plug fitment in the repair cavity is checked to ensure a snug fit. The prepared core plug is then wrapped with up to two layers of film adhesive, as shown in step 1120. The core plug with the film adhesive wrapped is inserted into the repair cavity as shown in step 1122. The repair section is vacuum bagged per the MEO guidelines and subjected to the cure profile per the material and MEO requirements.

12. Core Shaping

Core shaping requires the core plug to be placed into the blade and all adhesives to be completely cured. After the core restoration process is completed, a detailed virtual scan and digital images of the core plug protruding from the blade skin are captured and updated in the database. The data gathered from the virtual scan is analyzed to estimate the complexity of the blade contour. Based on the surface map, a tool path is generated to perform the core shaping process. This generated tool path is then converted to robot code using the same techniques described in the damage removal section above. The tool path is executed and excess core is removed to match the contour of the blade. After the core shaping activity is completed, a second virtual scan of the repair area is performed. Data from the second virtual scan is analyzed to ensure the core shaping process is successful and the shape of the core plug matches the entire contour of the blade undergoing the repair process.

13. Surface Preparation for Bonding

Once the core shaping has been performed and the operator and system have confirmed blade contour matching, bonding surfaces are prepared. In any adhesively bonded joint, there are four critical components that affect the quality of the bond: substrate, adhesive, surface preparation and adhesive processing. As the substrate and adhesive are already chosen for the rotor blade repairs, surface preparation and adhesive processing play a significant role in the robustness of any adhesive bond made using the JARVIS cell 10.

In one or more embodiments, the JARVIS cell 10 utilizes an Atmospheric Plasma Treatment (APT) surface preparation method to prepare the scarf sanded patch and blade area for bonding. Plasma is a state of matter that occurs when enough energy is supplied to a gas/air through electrical discharge and the gas/air becomes ionized and turns into plasma. Atmospheric plasma treatments generate plasma using air under increased pressure. Therefore, no special gases or chambers are required, thus resulting in a cost-effective and environmental friendly process.

Atmospheric plasma treatments of composite and metal surfaces are a quick and effective surface treatment method for bonding substrates together. Plasma treatments create high-energy surfaces that are ready for bonding by modifying the surface composition while keeping the surface morphology relatively unchanged. Studies have shown that atmospheric plasma treatments modify surfaces by increasing the oxygen content of the surface and introducing hydroxyl groups. Plasma treatments can clean surfaces by using the energy in the plasma to break the bonds in contaminants and vaporizing them. Plasma treatments can also activate a surface by breaking the bonds in the substrate and replacing them with hydroxyl groups, which are known to promote adhesion. Cleaning or activating a surface depends on the parameters chosen for the treatment and surface characterization methods such as Fourier Transform Infrared Spectroscopy (FTIR) or X-ray Photoemission Spectroscopy (XPS) can be used to identify the effects of the treatment.

Referring to FIGS. 54A-54C, an APT system can comprise a plasma generator 1142, a plasma control unit 1144, and a robot end effector comprising a plasma nozzle 1146. In an exemplary embodiment, the generator 1142 comprises a Plasmatreat FG5002S, the plasma control unit 1144 comprises a PCU-M, and the nozzle 1146 comprises a Rotational Jet RD1004. Other suitably APT equipment can also be used without departing from the scope of the disclosure. The Plasmatreat generator 1142 requires only air, electrical power, and an assembly to treat substrates. The generator 1142 works in tandem with the voltage transformer 51 and the compressed air unit to generate the plasma, which in turn exits the system through the plasma nozzle 1146. The nozzle 1146 is selectively attachable to the industrial robot 24. For example, in one or more embodiments, the nozzle 1146 can comprise a tool changer for connecting the nozzle to the robot 24. The nozzle 1146 is mounted on the robot 24 and is controlled through the JARVIS software framework. Based on the virtual scans performed of the repair area. The tool path is generated to move the robot with the rotation jet to treat only the required scarf areas.

Figure 53:
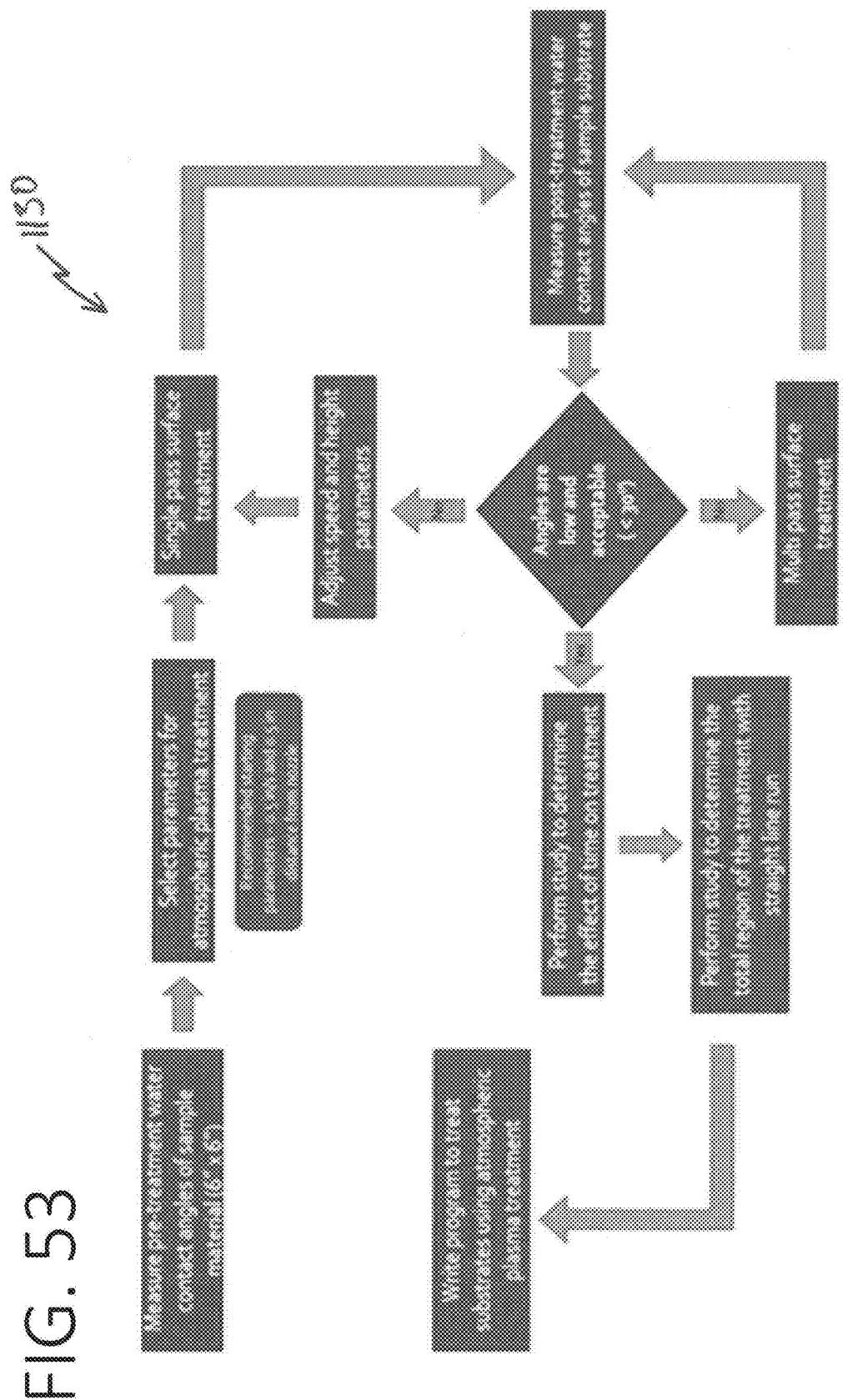
FIG. 53 is a flow chart of the steps and decision points of a process for atmospheric plasma treatment.

Three main parameters can be altered in order to obtain the most effective treatment: nozzle movement speed; nozzle working height (distance between nozzle and surface being treated); and number of passes. Generally, a slow speed and a small working height leads to the best treatments. The slow speed and shorter distance indicates a higher concentration of plasma is in contact with the surface for a longer amount of time, which in turn leads to greater activation of the surface. However, the treatment parameters are material specific and experiments should be conducted before bonding can be done in order to identify the best combination of parameters. FIG. 53 illustrates an exemplary process 1130 for determining the APT parameters.

Atmospheric plasma treated substrates eliminate operator variability. The Plasmatreat FG5002S unit has been designed to have an unlimited run time to continue with steady state operations, thereby allowing the treatment process to be automated. The primary goal of the atmospheric plasma treatment is to increase the surface free energy of the substrates that are being bonded in the repair process. APT provides a reliable method for increasing the surface free energy of the substrates.

The APT system is controlled using the JARVIS software framework and PLC controllers. Due to the simplicity of the software control portion of the equipment. The APT setting recipes will be pre-programmed into the controller. The JARVIS software framework controls plasma generation output using a logic controller switch to turn on and off the plasma generation.

Figures 55A, 55B:
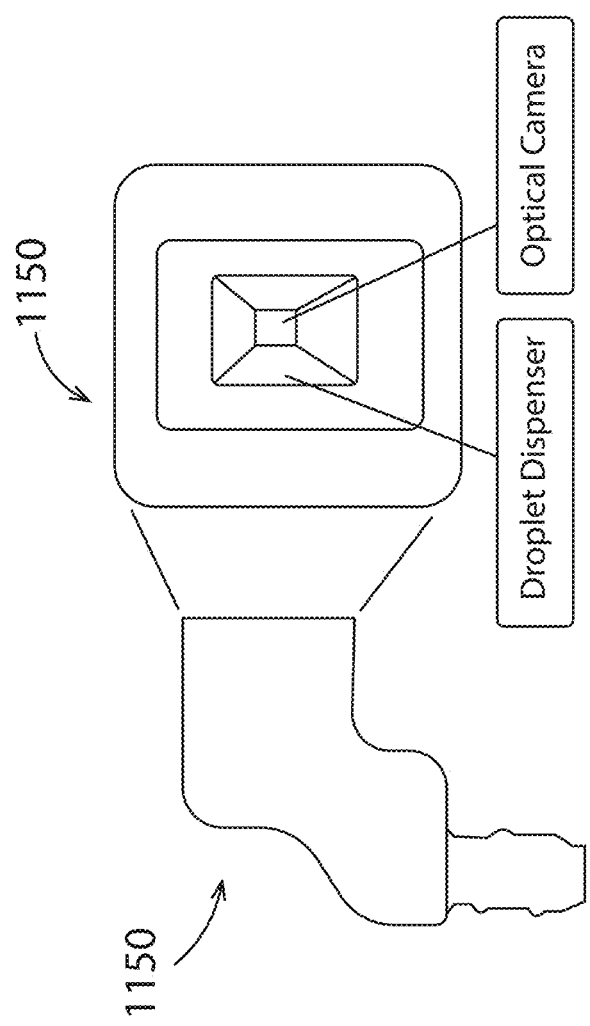
FIG. 55A and FIG. 55B are perspectives of a bond readiness testing device of the JARVIS cell.

Referring to FIG. 55, in one or more embodiments, the JARVIS cell 10 further comprises a bond readiness check module 1150. The bond readiness check (BRC) module 1150 measures the water contact angle of the prepared surfaces. The water contact angle measurements are compared with a standard to ensure if the surface preparation performed on the substrates are adequate to create a reliable bond. If the bond readiness check fails, the JARVIS II cell will repeat the surface preparation using APT system until the required surface energies are achieved on the substrates.

In an exemplary embodiment, the BRC module 1150 comprises a BTG Labs Surface Analysts XA unit to measure the water contact angle. The Surface Analysts XA uses a ballistic deposition to deposit liquid drops. A camera mounted on the inspection head captures an image of the water droplet and a processor of the module 1150 calculates the water contact angle using a proprietary algorithm. The operator can easily take measurements on surfaces with varied shapes, orientation, and texture. The ballistic deposition minimizes roughness effects, if the roughness varies greatly from point to point. Surface Analyst uses very small liquid drops, surface tension forces on the drop are much greater than gravitational forces. Therefore, providing accurate measurements of surfaces that are not perfectly leveled making it ideal for measuring surface energy levels on the blades with contoured areas. In an exemplary embodiment, the BRC module 1150 will be mounted on to the robot 24 to automate the repair readiness check. Similar to the surface preparation approach, the robot moves in a pre-determined path based on the data from the virtual scan. The robot 24 moves and captures the water contact angle measurement of the entire region that is prepared for bonding. The water contact angle measurements are analyzed and compared against a standard to make a decision to move forward with bonding. If the repair readiness check fails, the surface preparation parameters are revaluated and the repair readiness check will be re performed.

14. Repair Patch Machining

Repair patch machining uses virtual scan data from the post-machined skin and core plug to create a scarfed skin patch. To accomplish this, the virtual scan data from the complex contoured blade will be flattened in the JARVIS software and used for tool path generation.

Figure 56:
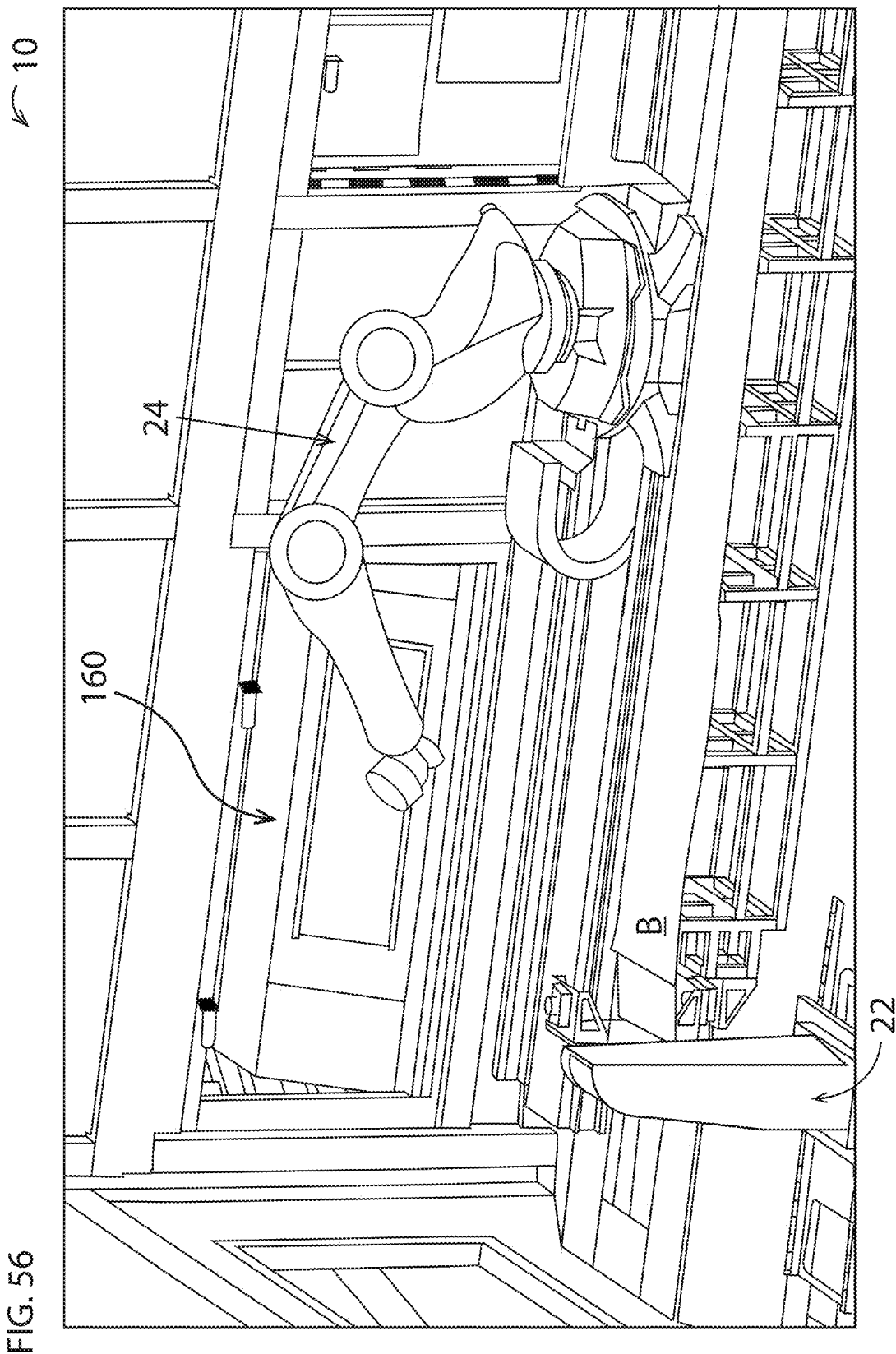
FIG. 56 is a fragmentary perspective of the JARVIS cell showing the robot performing a patch machining process.

In one or more embodiments, skin patches are machined from pre-fabricated GFRP laminates that are cured in an autoclave. The material used for the pre-fabricated patch is preferably identical to the parent material of the blade. The fabricated repair laminates are manually loaded into the PMC 160 where the robot 24 machines the scarfed patch to the shape determined by the JARVIS software. FIG. 56 illustrates the patch machining process conducted by the robot 24 using the PMC 160. After the scarf patch is machined, virtual scan process is used to perform geometrical inspection of the patch. Virtual geometrical inspection data of the scarfed patch and the repair region is evaluated to ensure proper fitment. If the fitment of the patch onto the scarfed region on the blade is satisfactory, the machined scarf patch will be used for the repair process.

15. Adhesive Application

Adhesive application is performed after the surface preparation of the mating surfaces are completed and all the laminate bond interfaces pass the repair readiness checks. All repair configurations performed in the JARVIS cell 10 require the use of structural adhesive materials. As explained in Section II(11) above, structural adhesives are used to join the core plug to the existing core material. For skin repairs also, structural adhesive is used to join the scarf patch to the repaired region of the blade. If correct processing of the adhesives is not followed, the quality of the bond and the structural integrity is compromised. Therefore, the materials and processing procedures used in the adhesive application play an important role in the bond process.

In one or more embodiments, film adhesive is used to bond the blade skin and scarf patch. Manufacturer recommended guidelines are used during handling of the film adhesive material. Many film adhesive materials must kept at subzero temperatures prior to use. Before applying the chilled film adhesive material, the material is thawed. Based on the core plug and repair patch design selection process in the overall repair process, the dimensions of the film adhesive layer is provided to the JARVIS operator. The operator is responsible for cutting the required ply geometry based on the input provided by JARVIS. The cut film adhesive layer is then placed on the repair region. Prior to adhesive placement process, the operator confirms the bond readiness. In one or more embodiments, the JARVIS cell 10 is equipped with a projection system that is configured to project an outline of the patch location onto the blade during scarf repair placement. The JARVIS software determines the location of the patch and instructs the projection system to project the outline onto the blade.

III. Operation and Control

The JARVIS cell employs a software framework that is broadly configured to (1) control the automated processes discussed above, (2) visualize the composite part and NDI data, (3) manage the JARVIS database, and (4) execute machine learning algorithms based on the NDI data and database content. The JARVIS software framework comprises a set of connected software modules executed by a processor of the JARVIS workstation 65. It will be understood that software modules comprise computer executable code stored in processor-readable memory and that one or more processors at the same or remote locations can be used to execute the code to carry out the software module's function. In an exemplary embodiment, the JARVIS cell 10 employs any combination of the following software modules: a communication module, a visualization module, an image stitching module, a database, a feature detection module (broadly, a damage assessment module), a toolpath generation module, and one or more NDI modules, such as a digital imaging module, a virtual scanning module, a thermography module, and a shearography module.

1. Control Architecture

Figure 57:
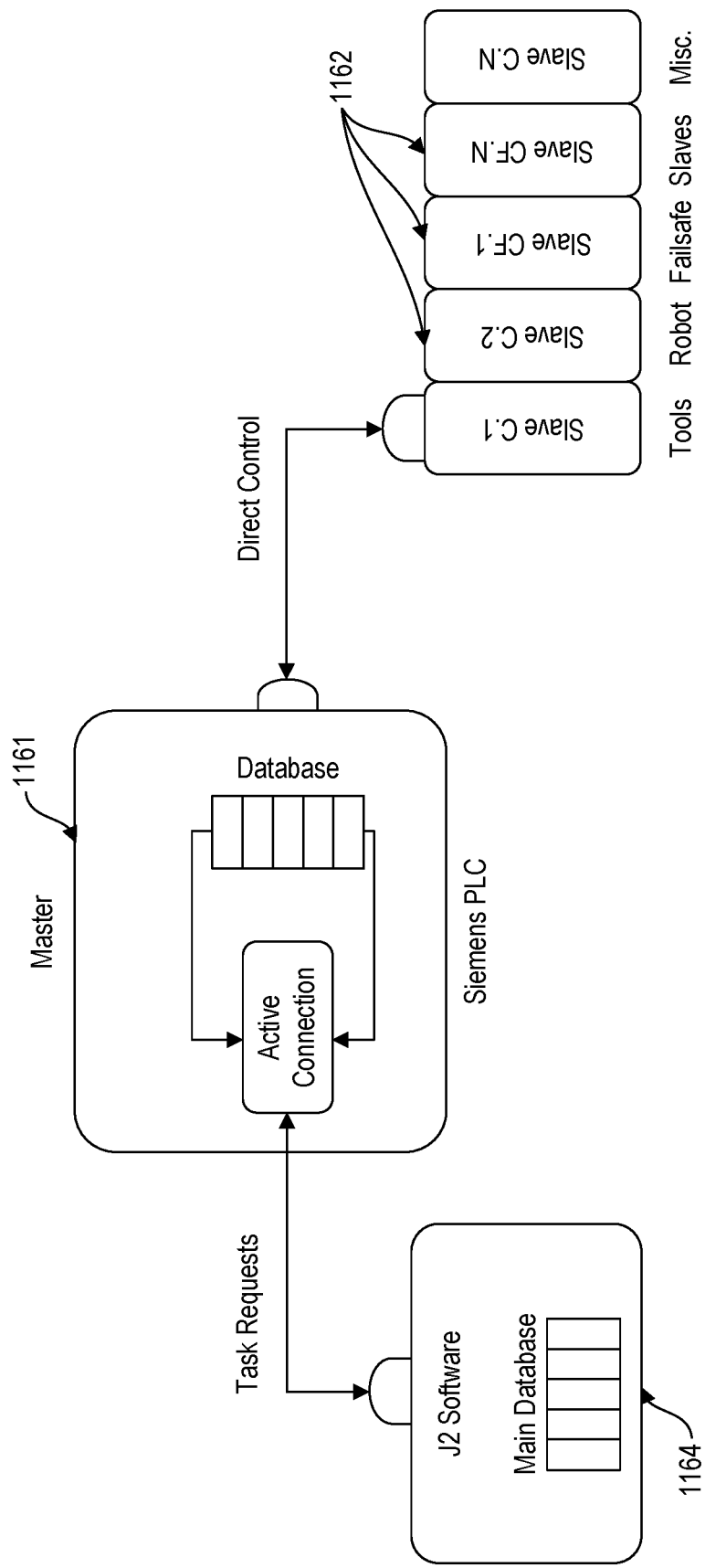
FIG. 57 is a schematic block diagram of a control system of the JARVIS cell.

Referring to FIG. 57, the JARVIS cell 10 fundamentally employs a master-slave control system 1160 comprising a main cell PLC 1161 and a plurality of slave controllers 1162 for various components of the cell. The JARVIS software framework 1164 is the front-end operation through which the operator interfaces with the system 1160 via a user interface device such as the workstation 65. The JARVIS software framework 1164 acts as an intermediary for the PLC 1161, which is used as the master, and the robot or tools, which are slaves 1162 to the PLC. Therefore, the software framework 1164 will not give commands directly to the tools or robot. With the software framework 1164 being a large collection of software modules, significant error could occur. Thus, allowing the PLC 1161 to handle routine operations for automation mitigates chances for error.

Figure 58:
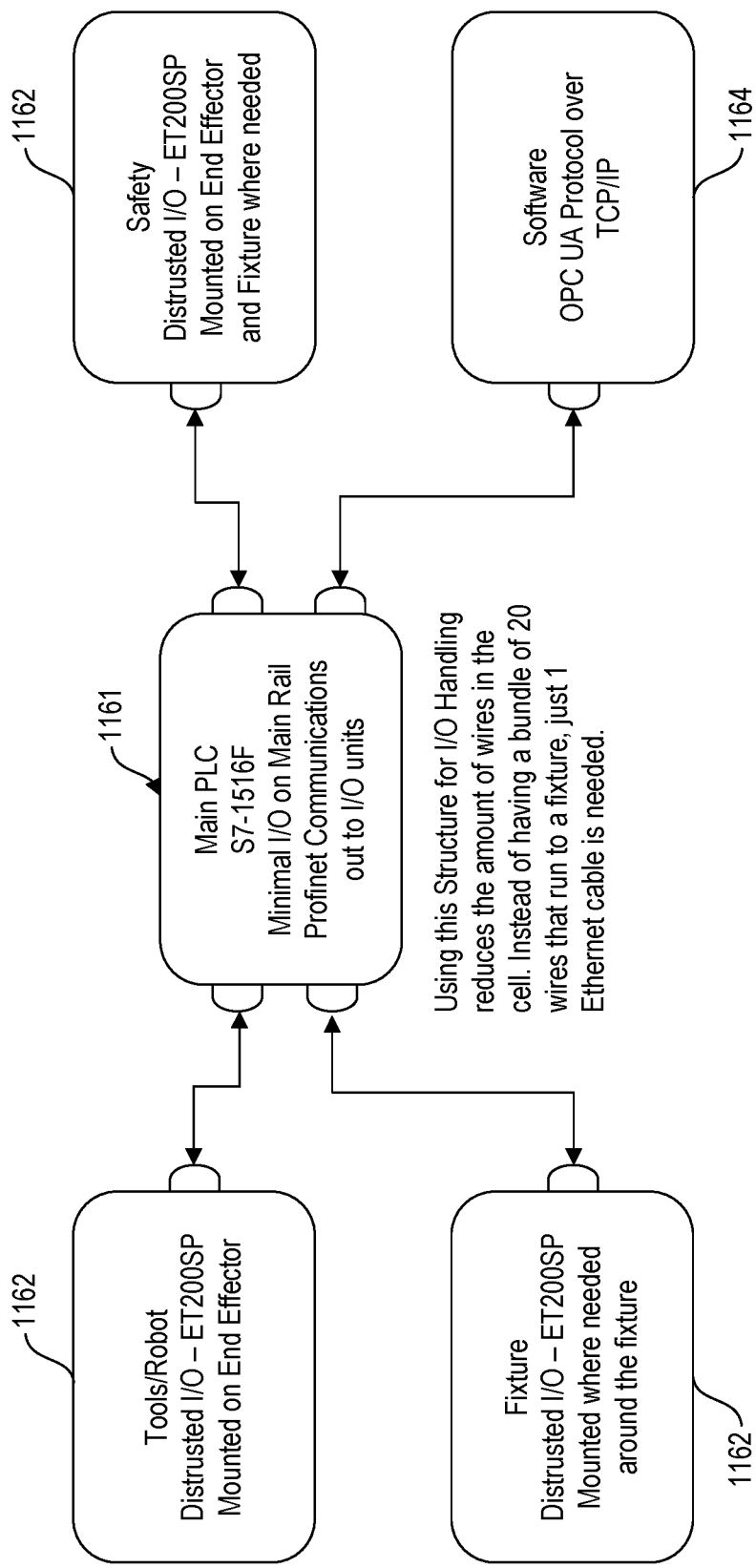
FIG. 58 is another schematic block diagram of a control system of the JARVIS cell.

In one or more embodiments, the JARVIS software framework 1164 establishes a connection directly to the PLC 1161 through an Ethernet/IP connection. The master PLC 1161 contains a local database on-board that allows it to hold and handle volatile data from the tools and robot. Any data being passed from the tools or robot 24 is transmitted through the PLC 1161 and sent directly to the software 1164. This is unless there is an alternate connection method to one of the slave units that allows data transmission directly to the software. These alternate connections are typically also Ethernet/IP connections. Ethernet/IP is the preferred connection method due to its excellent data throughput. Additionally, it allows multiple slave units over a singular connection. An overview of the connections for input/output handling are shown in FIG. 58.

The inputs and outputs of the master-slave allow the main PLC 1161 to handle most of the I/O without the software 1164 needing to poll the slave systems 1162 continuously for updated values. In one or more embodiments, the software 1164 connects to the main PLC 1161 via Open Platform Communications (OPC) using Ethernet/IP. The slave systems 1162 are typically connected via Profibus for core systems and Profisafe for safety systems.

Figure 59:
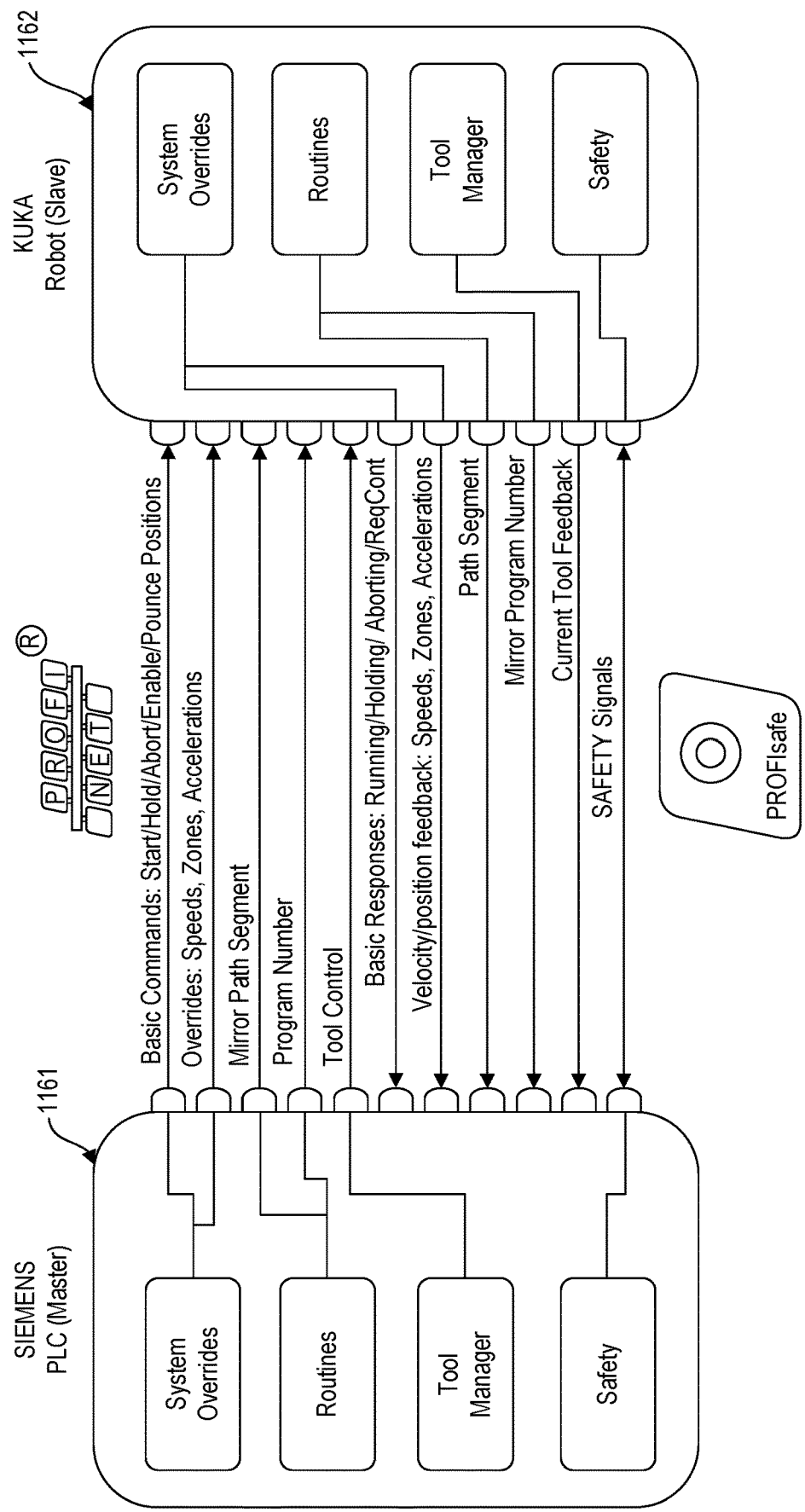
FIG. 59 is a schematic block diagram of a control subsystem of the JARVIS cell including a master PLC and a slave robot controller.

Referring to FIG. 59, the illustrated embodiment uses the Profinet protocol to handle the communication between the master and slave units 1161, 1162. Profinet is an industry technical standard that is used for communication between many factory and automation devices. Profinet establishes connection between the master and slave units 1161, 1162 using an Ethernet/IP connection for fast and reliable data transmission. The Profinet structure mimics the master-slave configuration by having an IO-Controller for the master 1161 and IO-Devices for the slaves 1162. Basic system commands like robotic movements such as start, hold, pounce, etc. are typically transmitted through the Profibus protocol. Profibus also handles the PLC routines such as program number selection, and mirroring path segments.

Profisafe is a sub-protocol of Profinet that handles safety equipment for automation applications. The safety equipment such as ESTOP buttons, floor scanners, and light gates are used on the Profisafe communication protocols. Profisafe is built on a separate stack than Profibus, which is right above the fieldbus level. Profisafe contains special redundancies to ensure safety equipment is always operational and being communicated to. Such remedies include special counters both on the master and slave side that increment with every communication. If the counters are mismatched, a communication error is implied and safety signals can be triggered. Other solutions for safety communication problems include watchdog timers that continuously count down, though are reset every time there is communicating between the IO-Controller and IO-Device.

2. Visualization

The JARVIS software framework comprises a visualization system with several different features. Firstly, the visualization system is configured to display a graphical user interface (GUI) for interacting with the various software modules. The GUI is how the user will view and use all data in JARVIS. Due to the JARVIS software framework being split into multiple software modules, efficient access to module-generated data is helpful. The JARVIS software interface provides an easy to use GUI that enables the operator to visualize all relevant information pertaining to the ongoing inspection or repair of the blade.

Figure 60:
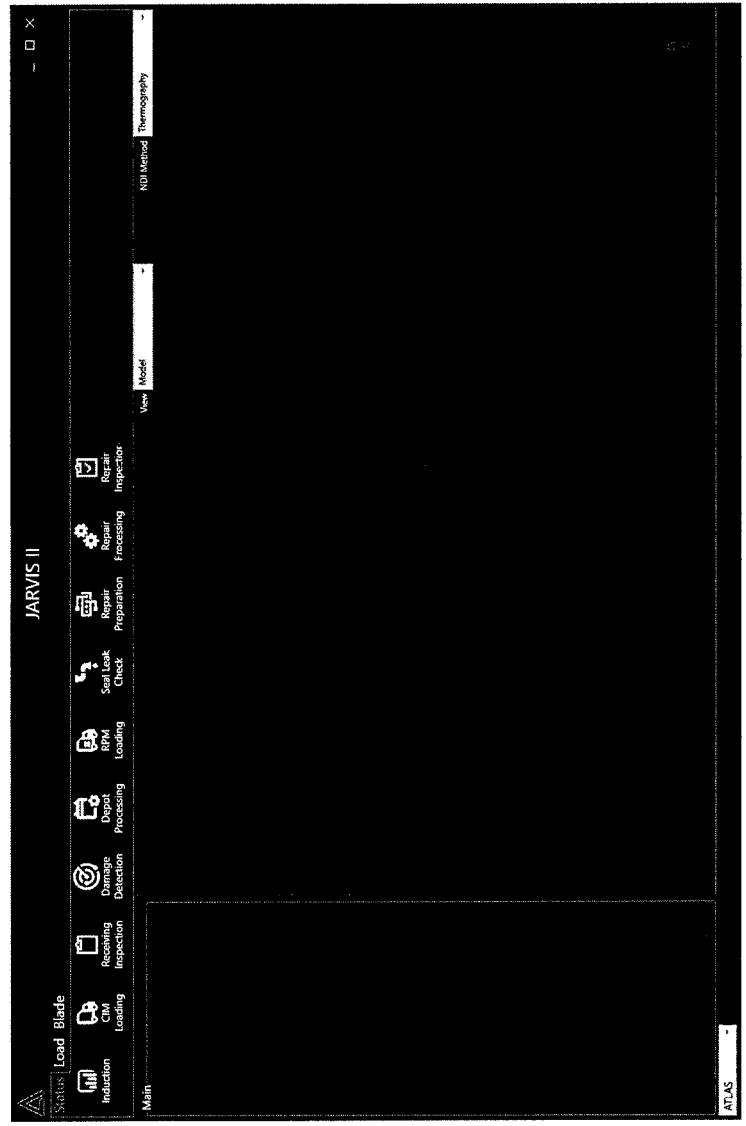
FIG. 60 is a screenshot of a user interface for a JARVIS cell software application.

One of the first design considerations is the organization and appearance of the main screen that is presented to the operator. It must be clear to the operator how to proceed, and thus a large selection of options should not be present. As a result, a consistent and clear organization is key for effectively utilizing the software modules. The main factor for organizing the primary visual identity of the application is observing how the application flow will affect the design of the interface. The GUI style is similar to Microsoft's Office applications. Referring to FIG. 60, in the illustrated embodiment, the GUI 1170 includes a ribbon of tabs 1171 for the various software modules and system control functions. The status tab informs the operator of the status of a given blade.

Figure 61:
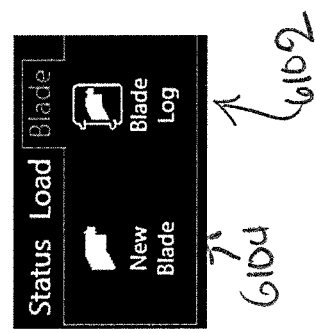
FIG. 61 is a fragmentary screen shot of a portion of a blade tab of the JARVIS cell software application.

On initial startup, as shown in FIG. 61, the operator is presented with the choice of blade selection items 6102, 6104. Blade selection item 6102 is for reading a blade ID that has already been entered into the JARVIS database, and blade selection item 6104 is for adding a new blade to the system. If a blade is registered, it can be recalled using the blade identification process discussed above, e.g., either by a barcode printed on the blade, or by the unique serial number. The history of the blade can be queried from the database containing all information available from previous JARVIS processing results. If the blade in question has not been registered, a new entry can be added to the system. The operator will then have to provide the system with the type of blade being scanned. The system will determine an idealized geometry and generate preliminary toolpaths accordingly.

Figure 62:
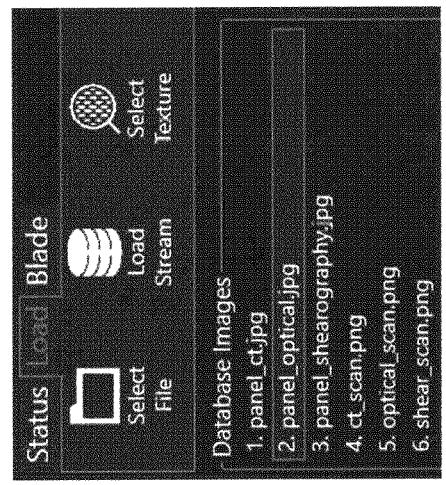
FIG. 62 is a fragmentary screen shot of a portion of a load tab of the JARVIS cell software application.

In one or more embodiments, the JARVIS software employs the concept of the digital twin to visualize the blade. A digital twin is an exact copy of a real-world structure in an observable digital format. Using a digital twin, the operator can view multiple perspectives of a blade that would otherwise be difficult to obtain. For JARVIS, the final creation of each digital twin is the product of a plurality of non-destructive inspection operations. This includes high-resolution 3D scans, laser shearography, and pulsed thermography. Other NDI scans are also possible. The data from these NDI inspection techniques are all held in the JARVIS database and configured as the digital twin. This data has been fully integrated with the GUI to allow seamless access to all available information. An example of some NDI information 6202 being displayed in the GUI for access is shown in FIG. 62.

Once the image stitching process has been completed, the new stitched image must be overlaid onto the 3D model. In one or more embodiments, UV mapping is used to overlay the images onto the 3D model. Those skilled in the art will be familiar with UV mapping. With the information obtained from these and other NDI processes, a full digital twin is created and visualized using, for example, the Helix Toolkit to display 3D data. Helix Toolkit is a collection of 3D components used for visualization purposes. With the core development framework for JARVIS being the .NET framework, the Helix Toolkit is suitable due to its .NET framework, allowing simple implementation. By default, Helix Toolkit has many different options for displaying 3D data such as model importing, point cloud plotting, and texture mapping. The start of the digital twin process is a point-cloud based system. This is obtained from the high-resolution 3D scan discussed in section II(3). Each one of the points captured by the scan can be digitized and plotted into 3D space. These points form the basis of the 3D model as they can then be meshed into a surface and saved into a model for viewing. To mesh points, Polyworks meshing tools can be used, which allows surface generation from the 3D point cloud.

With UV mapping a texture must be slightly warped or skewed to distinct dimensions as to adequately overlay onto the 3D model, without losing any detail or resolution. Once the image has been transformed correctly on the image, the image is then placed over the 3D model, generating the wrapped 3D model. The UV mapping process is done manually for the initial "template" blade being used to display the collected information. After the initial process, the UV maps are generated mathematically without the process being done by hand. In order to transform the image to the desired dimensions, a developer first maps a few points on the input image to the model. To ease the overlay process, a UV map of the blade was created to minimize the amount of warping an image has to go through, and to simplify the mesh, to allow the model to move around smoother and more freely. Due to the simplicity of the UV map, the calculations to place an image or texture in the appropriate location is straightforward. A simple copy and paste is all that is needed, without losing any quality or resolution in the original image. Creating a method to auto populate a UV map is fairly straightforward, and with the calculation of a homography matrix, creates the ability to warp and transform an image wherever necessary, while still retaining the quality of the image. Doing all of these calculations inside of the algorithm, eliminates the use of other software, and grants access to tweak and fix any issues that arise from the overlay process.

Figure 63:
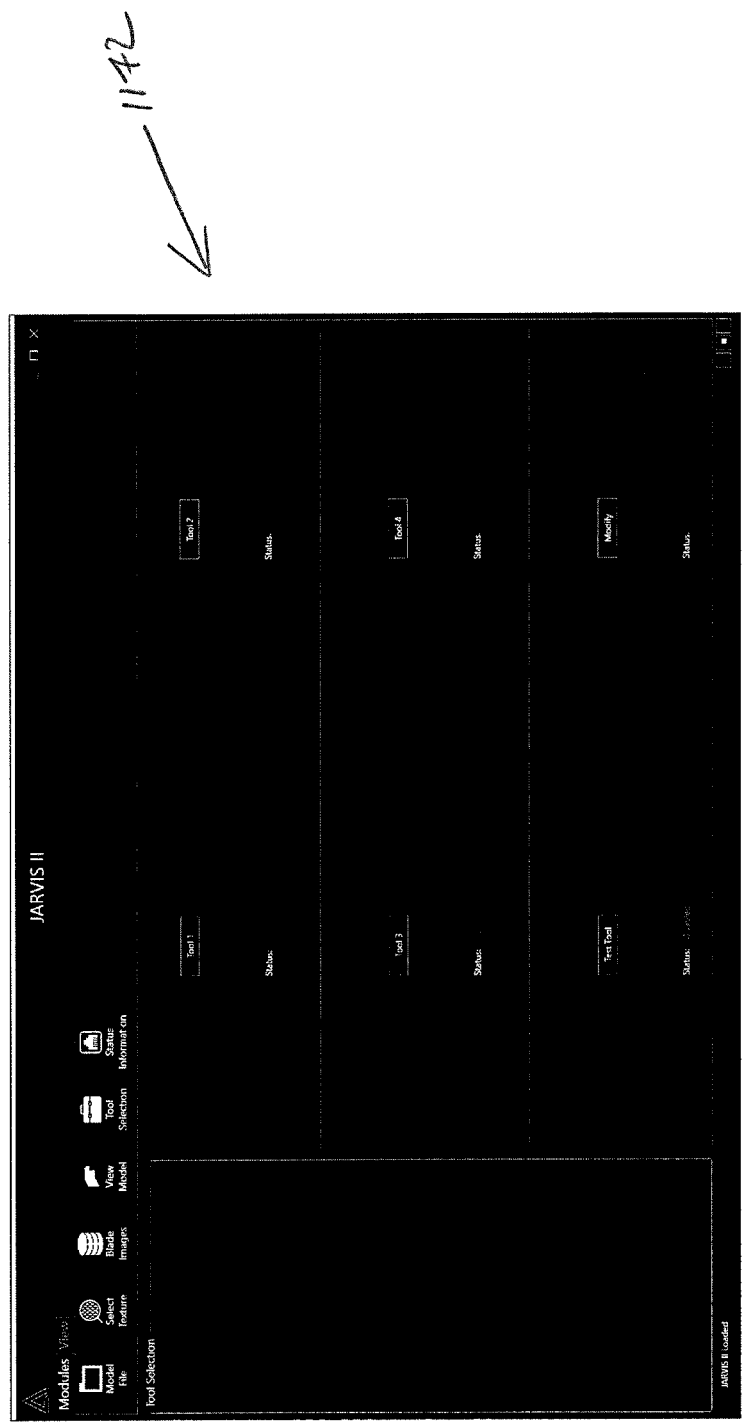
FIG. 63 is a screenshot of a tool page of the JARVIS cell software application.

Controlling and selecting tools can be done in a manual or automated fashion. The JARVIS operator can access a tool page 1172 through the main navigation ribbon, as shown in FIG. 63. The tool control page 1172 features items for every available tool and displays the status of each tool. Status information may be displayed as a highlight color. For example, the display item for the currently selected tool can be highlighted in green, a tool ready for operation can be highlighted in blue, and a tool that is disconnected or unable to be used can be highlighted in red. Any tool can be accessed by pressing the button corresponding to that tool. A confirmation will notify the user confirming the tool selection. The current tool will then be docked (e.g., in an MTC 110) and a new tool will be loaded (e.g., from an MTC).

Figure 64:
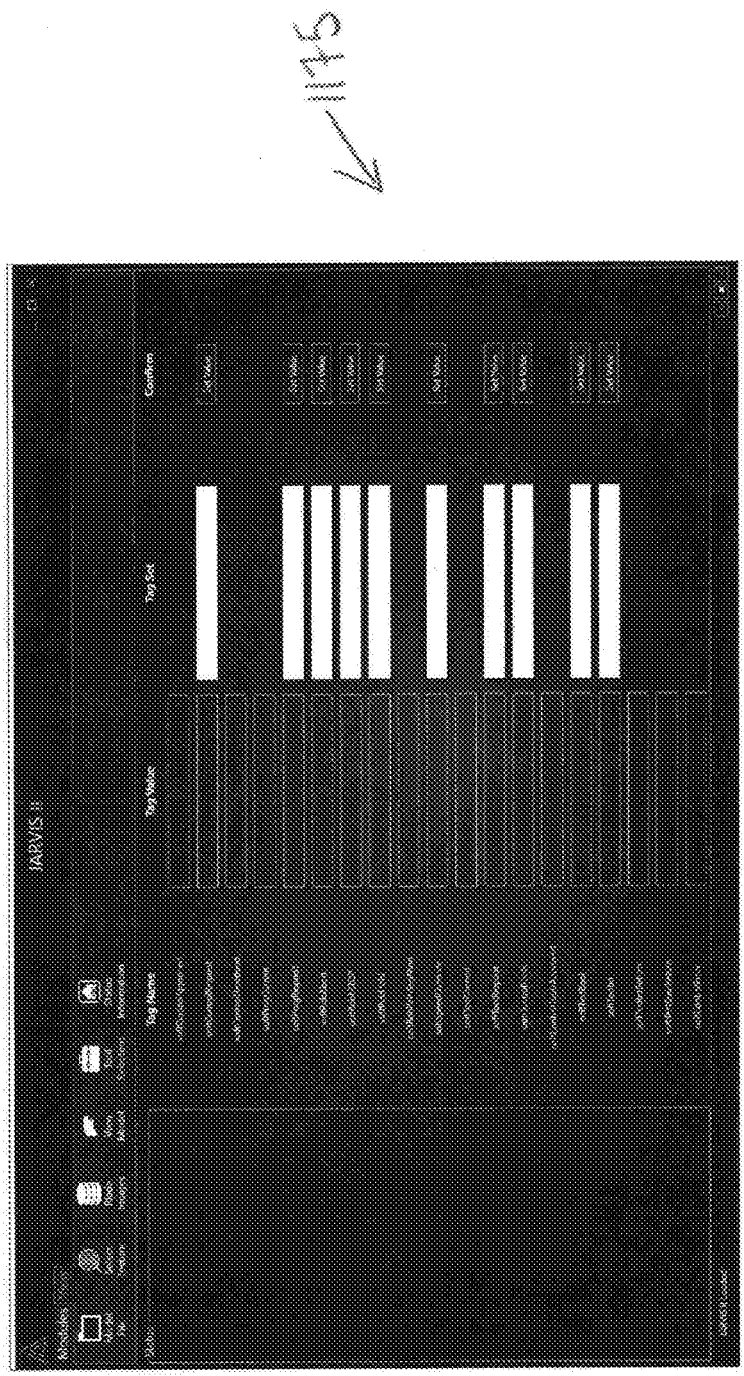
FIG. 64 is a screenshot of a status page of the JARVIS cell software application.

Referring to FIG. 64, status updates are available in a cell status page 1175 through the main navigation ribbon. The cell status page 1175 allows real-time viewing of all data, system, and safety statuses in one screen. The first column labeled "tag name" is the tag or node, which reflects the entity whose status is being observed. The second column shows the current value or status of the tag. Debug options exist to read and write various data tags. If a tag can be written, a third and fourth column are shown which allows values to be changed dynamically to correct system error or for basic debugging. The textbox allows a value to be entered by the technician and the "Set Value" button sends the changed value to the PLC. The value will be updated in real-time in the second column.

Figure 65:
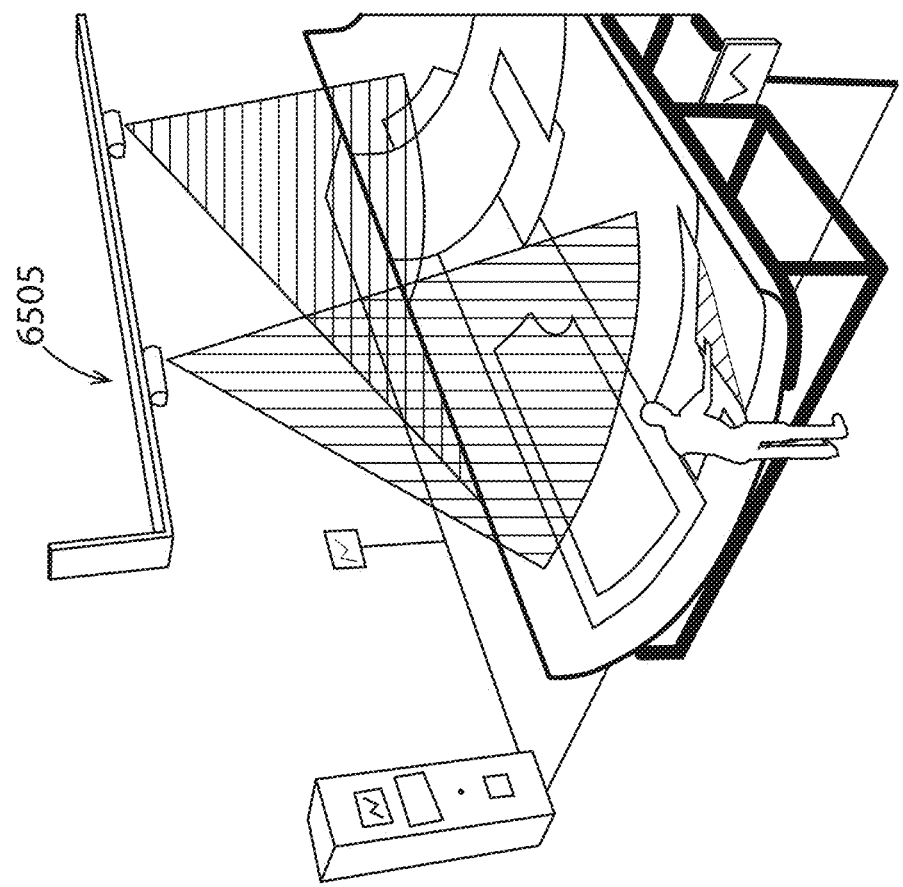
FIG. 65 is a perspective illustrating a laser projection system of the type that may be employed by the JARVIS cell.

The JARVIS visualization module further comprises processor executable instructions that, when executed by the appropriate processor, project an image onto a surface of the blade B. In one or more embodiments, mounted next to the digital imaging cameras is a LaserGuide projector, or other suitable image projector, that can project an image onto the surface of the blade with repeatability and great accuracy, allowing operators to see by way of the projection exactly where the damage is located. Using a LaserGuide from Aligned Vision allows the JARVIS framework to directly integrate with the project and display what is currently needed. This equipment can project images indicating the location where damage has been detected and also has the ability to project other profiles such as tool paths and individual plies. During any operation in the JARVIS cell, the operator can choose to display the exact path or image location that robot 24 will follow. This can be used in many ways to validate or verify robot motion and program path. For example, if the operator detects a small gap between the first and second shearography image, they can choose to project both and display each image boundary for physical inspection. They can then adjust one of the image locations as needed to correct the issue. During repair patch placement and adhesive application, the projector can serve as a guide, giving the technician step by step instructions presented directed onto the blade. This minimizes the amount of potential human error. A conceptual example of laser projection system 6505 for projecting the outline of patch locations onto a composite surface can be seen in FIG. 65.

3. Data Handling

Data handling plays a critical role in the JARVIS software framework. The various NDI techniques used for this system will generate large quantities of data. Data handling is broken up into three primary sections: database setup, image stitching, and communication.

To accurately represent the JARVIS local environment and to understand composite structures and their respective repair processes, higher-level data handling and manipulation is required. Databases are key infrastructure that supports many of the interactions in the JARVIS software. Choosing a database and its type of Structured Query Language (SQL) is an important consideration for the project. Many elite enterprises and Military projects rely on Microsoft SQL Server and its suite of tools to deliver DataBase Management System (DBMS) features to handle their database deployment, security and development. The available developer tools that integrate with SQL Server provide ample extensibility especially in the .Net and Windows environment. This has allowed the use of tools like SqlClient and Entity Framework 6.0 for data design and access.

Figure 66:
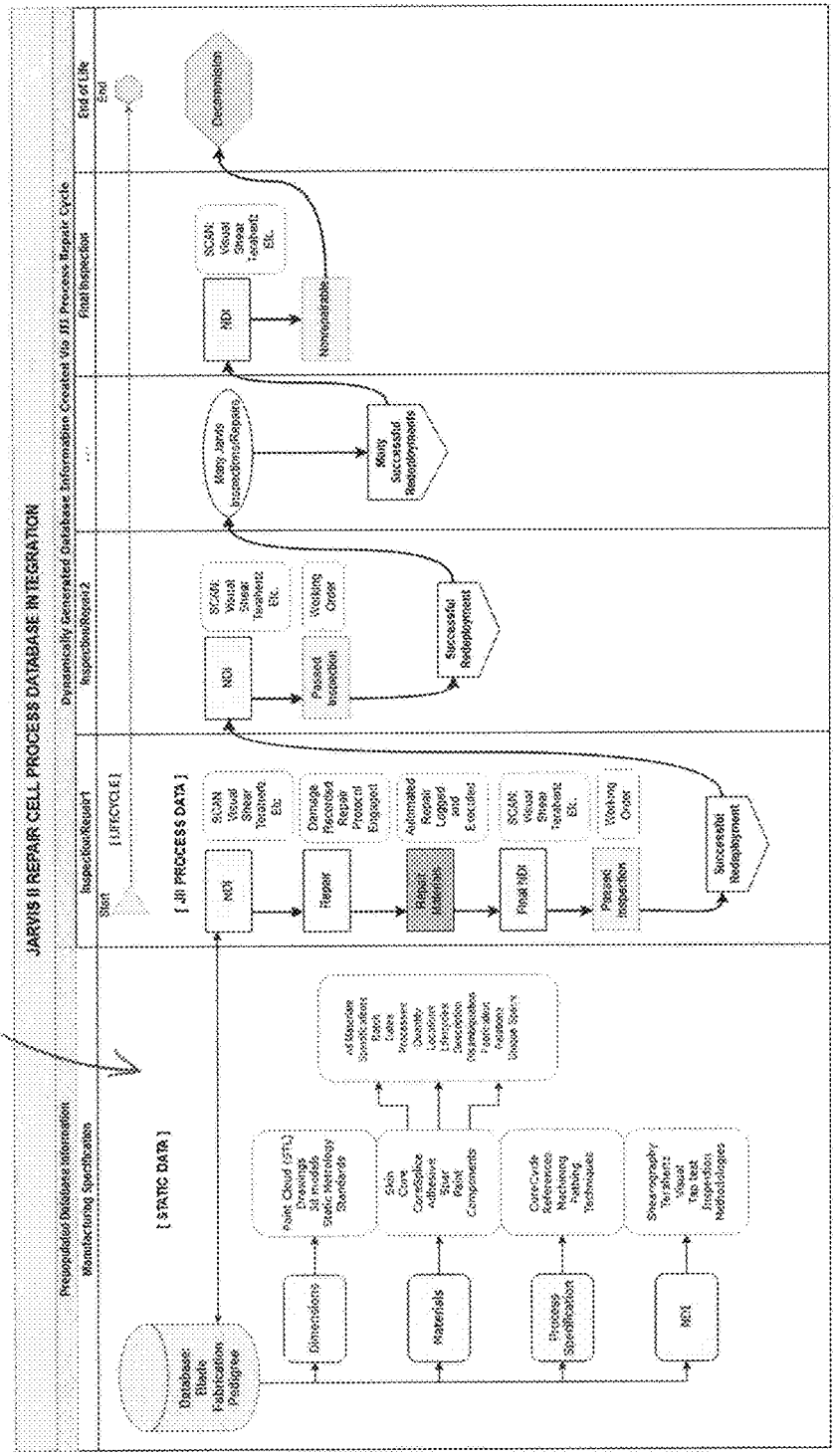
FIGS. 66A-66B are a schematic block diagram of a database for the JARVIS cell wherein schematic break lines on the right and left sides of FIGS. 66A and 66B, respectively, indicate that the schematic illustrations in FIGS. 66A and 66B meet at the break lines to form a unitary schematic block diagram.
Figure 66A:
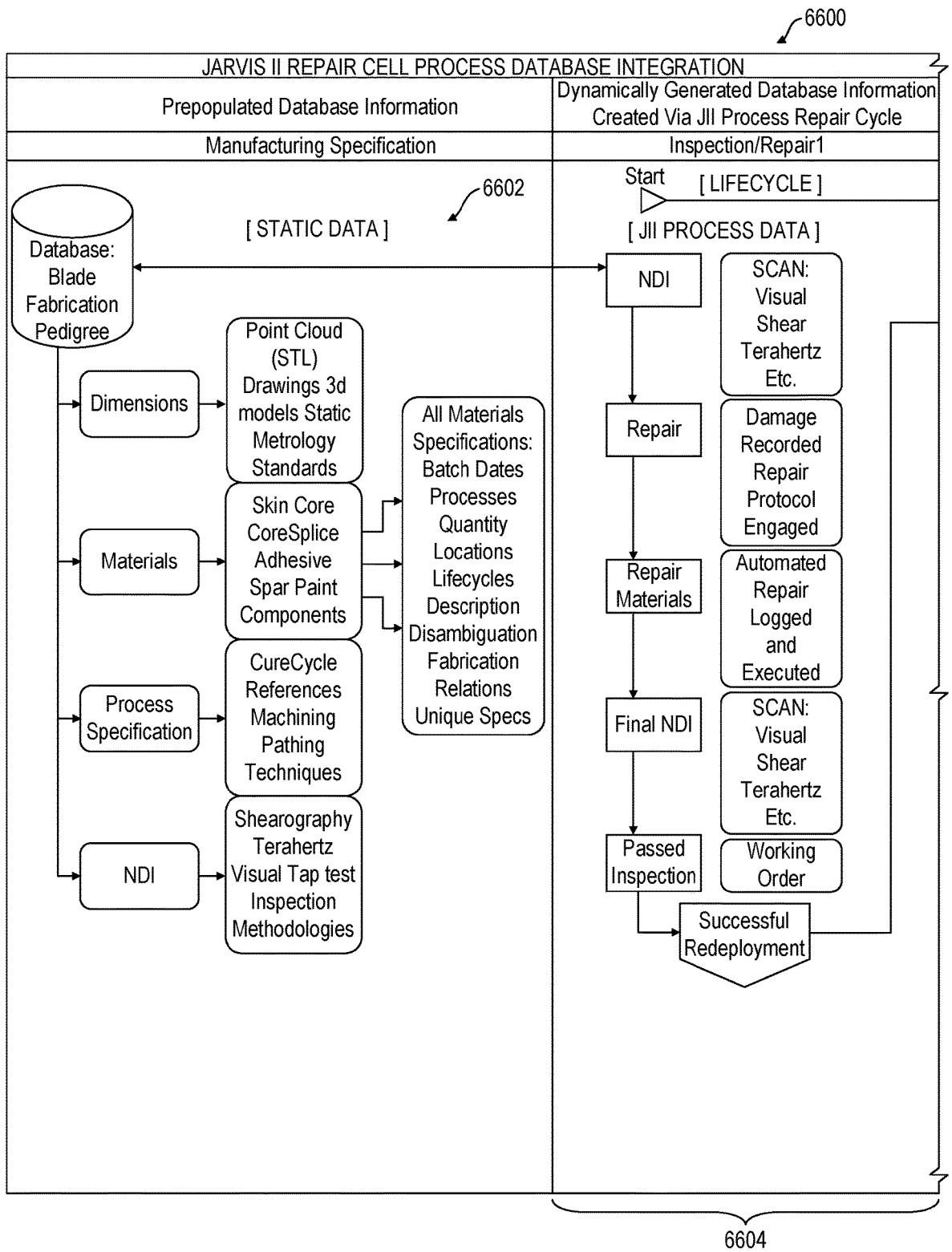
Figure 66B:
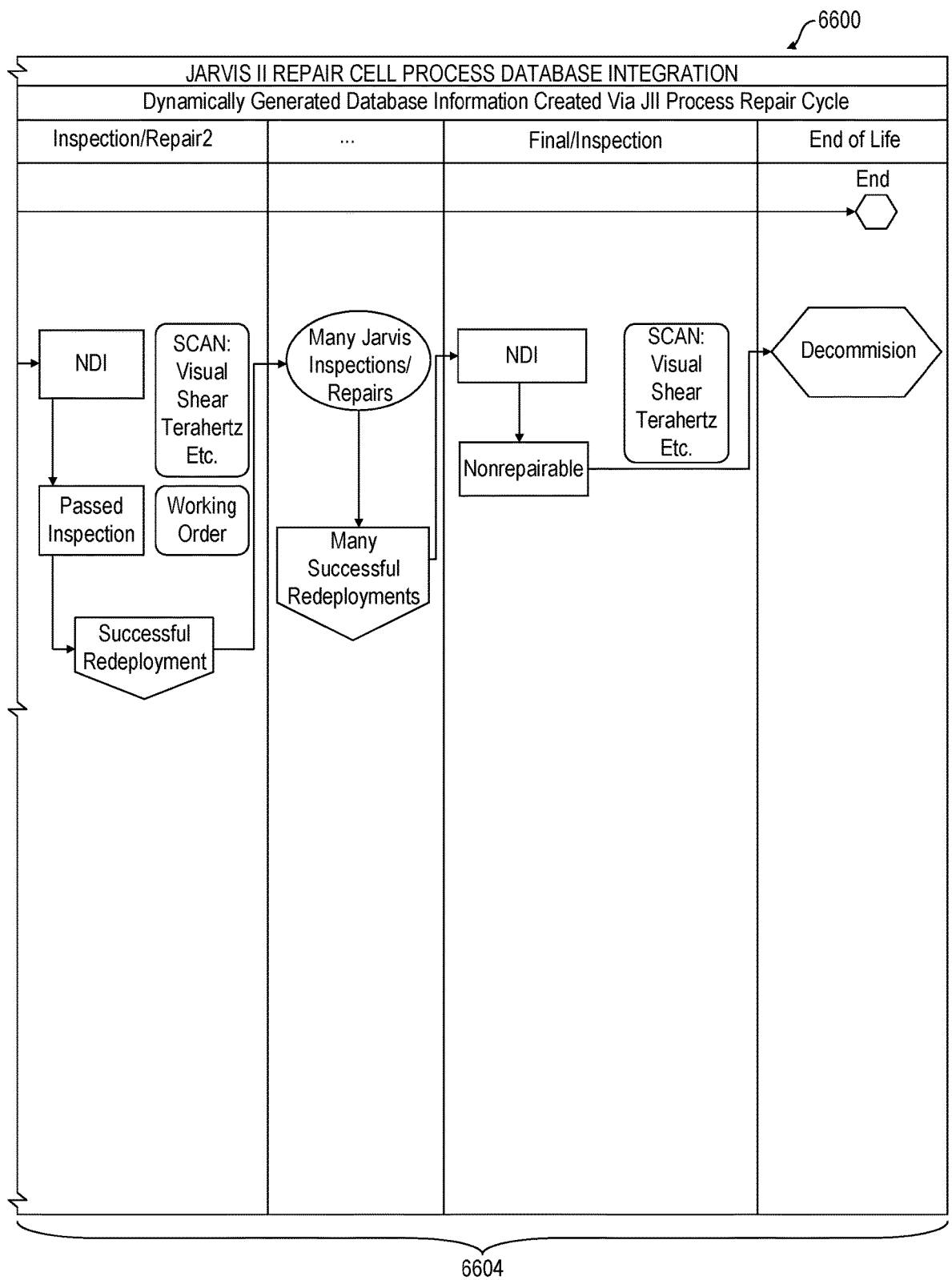

The database schema is tightly coupled to the repair processes. The JARVIS database serves as the standard for the performance and execution of various JARVIS software modules. When designing the infrastructure, the lifecycle of the blade and restoration processes define the strategy for the database. As shown in FIG. 66, part of the database 6600 will store absolute ideal data 6602 and part of it will store dynamically generated data 6604 from automated repair protocols. The schema itself divides static initial data 6602 and process data 6604 into two logically distinct sections that are handled independently.

Static data 6602 is the background and comprises specification data for the blades. All information relevant to the fabrication, pedigree, and process for creating or constraining the design, creation or repair of the blades, all geometrical data, dimensions, engineering diagrams, models, metrology and point clouds are all stored in this section. Materials, material specifications, and subsystems of components of the blades are also recorded along with relevant and extraneous details about fiber, core, spar, paint etc. ensure that repair procedures can draw and make correct inferences about how to handle even the most specific anomalies and repair geometries.

The process data 6604 follows the software flow that records and generates data and couples the physical robotic sensors and NDI tools to the processes that control them. Each NDI system creates data that is relevant to the later repair and patch generation and repair decisions. Thus, all data is stored into the database 6600 such as NDI models, images, decisions and metrics as well as the data concerning paths and procedures that dictate the scarf, scabs, and cure cycles.

The JARVIS database 6600 preferably has a dynamic architecture. In one embodiment the JARVIS database employs Entity Framework for its deep linkages to ActivX Data Object (ADO).NET and other .NET objects, which can be utilized to address database related activities. It supports rich mapping capabilities, automated change tracking, procedures, even complex inheritance and hierarchic relationships between tables. The versatility of the Object-Relational Mapping (ORM) provides feature expansions and stabilizations. For database creation purposes, Entity Framework supports multiple development approaches for design and data evolution, Database-First, Code-First and Model-First. Domain classes (entities) provides migration commands end up being simpler and the code representation in classes closely mirrors the schema generated by a migration.

The JARVIS software's code-first approach adapts the database from one snapshot to the next. When creating a migration, a class that outlines the database schema migrations is added. The Entity Framework then processes these classes into relevant UP alterations to update the database and relevant DOWN alterations to downgrade/rollback transactions on the database. This will assist in dynamically altering the database to meet the increasing demands of JARVIS. As the project evolves to their final forms the database is migrated and altered alongside them to more seamlessly transition the data and integration of the database.

The need to store unstructured data, NDI data, models, geometries, generated toolpaths and repair patch geometries prevent the use of standard SQL database transactions. The classical approach is to couple data directly to the application or to use a file system to store Binary Large Objects (BLOB). Separating data due to its storage in a database could potentially slow down operation critical queries and create potentially enormous backups. This however, comes at the cost of managing the data's consistency and recoverability separately, as well as increased integration overhead.

In one or more embodiments, SQL file stream is used to meet the need for a digital, exact representation of the repair environment for the automated repair processing. This allows the use of Win32 API access to the data, which is the same as accessing a windows file system, allowing for more speed potential. Despite the speed, it does not sacrifice ACID, (Atomicity, Consistency, Isolation, Durability) compliance. The file stream is handled in a hybridization manner using the System cache rather than the standard SQL server data pool, disentangling the access of File stream data from query processing. Main advantages for using SQL FILESTREAM for large data storage and manipulation are: New Technology File System (NTFS) read write performance of data is faster for blobs greater than 1-MB; .NET integration means simpler client access and direct acquisition of files; Alleviates and frees resources to be used by SQL Servers internal Memory pushing access to Win32 Application Programming Interface (API) and .NET classes; Despite this, BLOBS retain transactional consistency and can be rolled back; SQL Server Helps us handle/automate File stream Backups easily and restore them to previous snapshots; Similarly, SQL tables and columns File stream data can be restricted from access based on user authorization.

Figure 67:
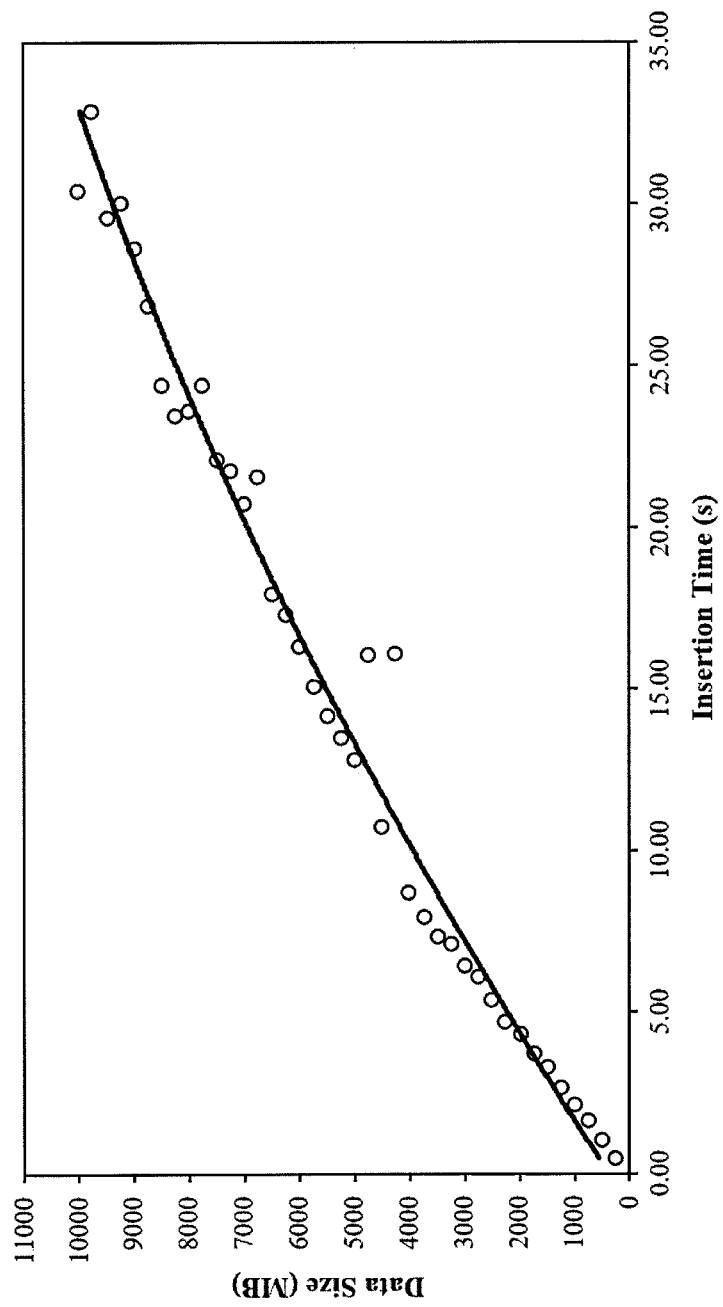
FIG. 67 is a plot of the results of stream insertion tests run on a workstation of the JARVIS cell running the JARVIS cell software application.

File stream insertion tests were run on workstation hardware (this differs from final cell hardware architecture), to investigate and ensure the robustness of the SQL File stream within the software framework. During the test, 40 files were written in sizes in increments of 250-MB to 10-GB. The average computer aided design (CAD) model size is far lower than this threshold but expanding out to 10-GB ensures that the system is strong enough to handle edge cases where files could be significantly larger. For test robustness across all file types, random data was selected so that the test would serve as a worst-case test. The data and results are shown in FIG. 67. The resulting test appears approximately linear with 10-GB data insertion/query being performed in 30-seconds. As the final hardware is selected, File stream efficiency will continually be evaluated and integrated into JARVIS.

Access classes have been developed in both SqlClient and Entity Framework (EF), for data Insertion and data retrieval. A hybrid methodology of access is adopted in one or more embodiments. Entity Framework does not directly support SQLs file stream capabilities, which are valuable for large file speed and storage, but it does simplify the migration and design of the overall database, adaptive framework. The benefits of EF make it a valuable choice, LINQ, caching out of the box, CRUD, and more. The methods developed with these tools and their combined efficacy provide the capability to connect the JARVIS application and to its companion application ARViS, Augmented Reality Visual Inspection System (described, in U.S. Published Application No. 2022/0092858, which is hereby incorporated by reference in its entirety), and its constituent parts to the database in a meaningful and useful way.

SqlClient has simpler access methods, such as the ability to for data to be viewed in an unstructured format like grabbing rows of data and table names. This means that SqlClient is used when accessing the larger data types such as images and 3D CAD files so main use of SqlClient is to aid in the implementation of SQL file stream. The SQL file stream serves as the primary way to handle large data. For more useful or specific access methods, EF remains more precise.

For a majority of data flow in and out of the database that is not large BLOBs using the Code First approach has been fully implemented. The advantage of Entity Framework becomes further apparent; it handles not only the design of the database but the querying and saving of data. This has allowed access via entity names, classes that are mapped via its framework and then used to alter the databases context i.e. an abstract representation of a session with the underlying database allowing the execution of CRUD, (Create, Read, Update, Delete), operations. Each use of the context is tied to specific units of work that are then combined into a single final transaction upon its commit. Beyond that, the context can be used to alter the configuration of domain classes themselves, change database relations and mappings, add caching, and add procedures and other more technical transactions. EF even allows the use of LINQ, language integrated queries, a powerful method of querying ordered objects that makes particular sense for objects that are structured like SQL or XML, Extensible Markup Language.

The visualization of the blade, its various repairs, and damage maps based on a variety of NDI techniques, are important for repair procedure planning. In order to accomplish this task on a full-scale blade with multiple images, image-stitching techniques are used to convert all images of the blade into one complete image. During initial research, different types of machine learning libraries were evaluated and OpenCV libraries was selected for one embodiment of a suitable image-stitching algorithm.

In order to accurately and fully stitch images together successfully, all images need to have overlap. This overlap is required so that the stitching algorithm can accurately detect matching areas and pixels across multiple images and combine them into one final stitched image without any distortion or gaps. The first step in creating one final stitched image will be compiling all images taken of the blade and converting them to gray scale. Normally, images are formatted in 8-bit, or 16-bit based on the number of shades of red, green, or blue that can be formed by taking 2 to the power of 8, or 16 respectively. The advantage of converting an image to grayscale for the image stitching process is the creation of the histogram. The creation of this histogram is important, as its contents are used throughout the later stages of the stitching process and will be vital in displaying information about the image that could not be obtained from an 8-bit or 16-bit image.

After the conversion of the images to grayscale, a feature detector to detect key points and descriptors of common pixels across multiple images for matching and overlaying in the stitching process. Key points are used in detectors by looking at a previously created histogram, and comparing those values with the corresponding pixels of the images, then matching identical values across multiple values on the graph. After key points have been detected on the various images, descriptors are used to cluster groups of key points that possess similar features, which is helpful when we will use the key points and descriptors found for the next step in the image stitching process. There are a variety of feature detectors available, but the most common and robust algorithms available are: SIFT—Scale-Invariant Feature Transform; SURF—Speeded Up Robust Features; ORB—Oriented FAST and Rotated BRIEF; BRISK—Binary Robust Invariant Scalable Key Points; KAZE; and AKAZE—Accelerated KAZE.

In one or more embodiments, BRISK detector will be used as the main detector method for the JARVIS framework. The BRISK detection algorithm provides a robust, reliable, and produced the most desirable results across the different images and NDI techniques. To calculate key points, BRISK relies on the previously mentioned methods of key points, but also introduces the calculation and storing of the direction of each key point using Equation 1. These calculated point directions will be used to assist the rotation and actual stitching of the images.

$$g = \begin{pmatrix} g_x \\ g_y \end{pmatrix} = \frac{1}{L} \cdot \sum_{(P_i, P_j) \in i} g(P_i, P_j) \qquad \text{Equation 1}$$

When calculating descriptors, BRISK relies on further rotation and scaling of the clusters of key points using the equation $\alpha = \arctan 2(g_y, g_x)$ on each individual detected key point. After the detection of the key points and descriptors, they will be matched and computed so they can be overlaid and blended to produce the final stitched result. To match these key points and descriptors, two robust and powerful algorithms can be used; Brute Force and K-nearest neighbors (KNN).

Brute Force methodology looks at every single key point and descriptor found earlier and matching it with every single other key point and descriptor to find the best match. KNN, or nearest neighbors, takes a more practical and calculated approach in finding matches by using the clusters found in the descriptors to group key points into groups, or "neighbors," and calculating matches from there. The advantages of using an algorithm like KNN is that it is faster than more prehistoric methods like Brute Force, and approaches the matching of key points in a smarter way, therefore allowing for more correct matches and a cleaner final stitched image.

Once key point matches have been found, the process of actually blending and stitching the images together begins. To calculate the rotation and scaling that would need to be applied across the images relating to one another, the homography matrix must be calculated. Using the homography matrix, the algorithm looks at the key point matches found earlier and will calculate the appropriate transformations and rotations necessary to properly overlap and stitch the images together during the final process. Represented in equation 2 below, the homography is a 3×3 matrix that represented the images and their pixel relations to one another.

$$H = \begin{bmatrix} h_{00} & h_{01} & h_{02} \\ h_{10} & h_{11} & h_{12} \\ h_{20} & h_{21} & h_{22} \end{bmatrix} \quad \text{Equation 2}$$

Mapping the homography is similar to the above operation, with $(x_1, y_1)$ in the first image, and $(x_2, y_2)$ in the second image.

$$\begin{bmatrix} x_1 \\ y_1 \\ 1 \end{bmatrix} = H \begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_2 \\ y_2 \\ 1 \end{bmatrix} \quad \text{Equation 3}$$

After the calculation of the homography, the final step of the image stitching process is the process of WarpPerspective. This function stitches the images together using all of the above information to create a final stitched image. Using the homography found earlier, WarpPerspective calculates the final image matrix by warping and distorting the images when necessary to produce a final stitched image.

$$\text{Final Image } (x, y) = src\left( \frac{M_{11}x + M_{12}y + M_{13}}{M_{31}x + M_{32}y + M_{33}}, \frac{M_{21}x + M_{22}y + M_{23}}{M_{31}x + M_{32}y + M_{33}} \right)$$

Originally, this method was created in the python language using the machine learning library OpenCV. However, this function was later integrated into C# using the wrapper EmguCV. While the edge between the two images stitched together in the above figure are noticeable, once this process is automated and all photos of the main rotor blade are taken without a change in the Y-axis from the camera, a high quality final stitched image will be provided due to cleaner and less distorted images.

Although the above method works great for overlay images, in order to stitch tougher images together, like NDI images, a more robust and faster stitching method is preferred.

Figure 68:
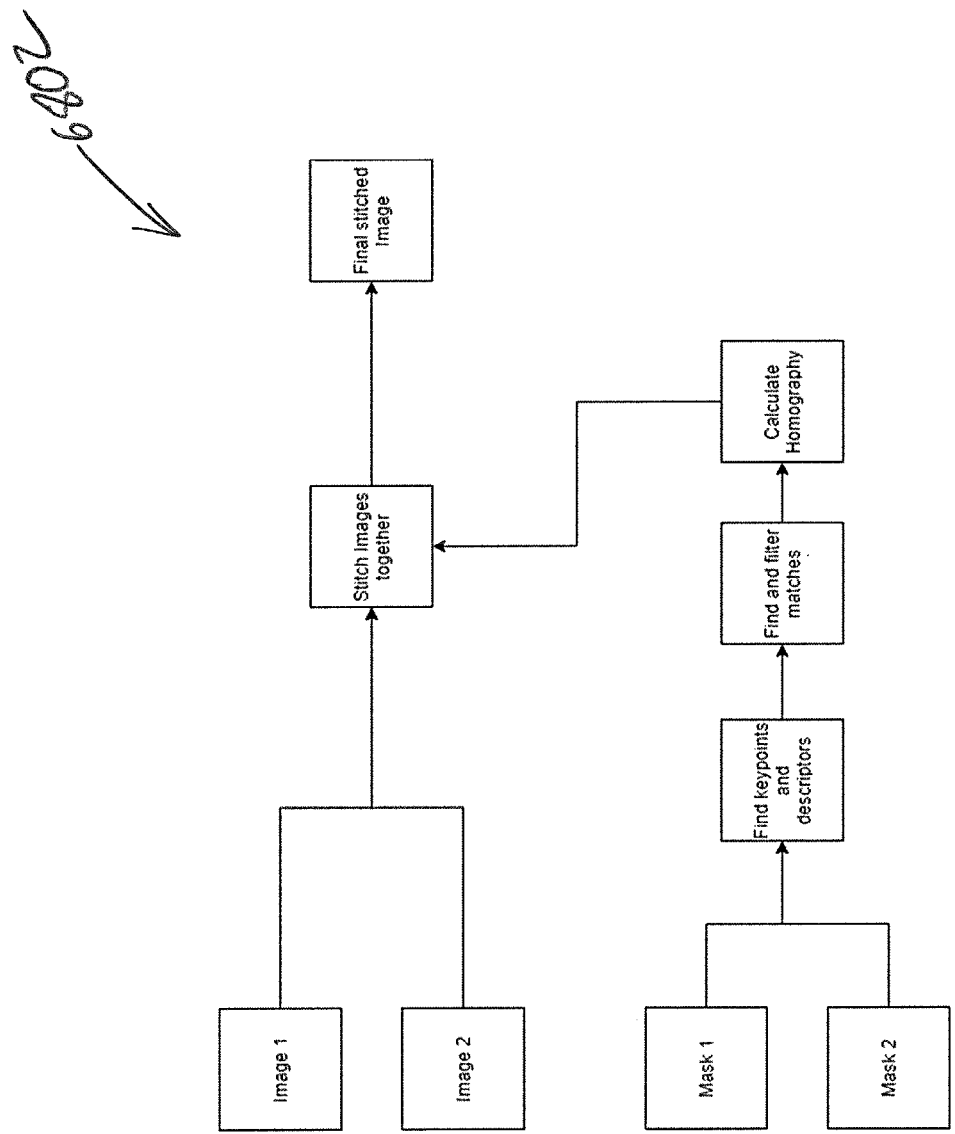
FIG. 68 is a schematic block diagram of an image stitching process employed by the JARVIS cell software application.

When working with NDI images, small changes are made to assist in the stitching process. In one embodiment, KAZE is used. In certain embodiments, AKAZE is used, which is the advanced version of KAZE. The purpose of this change is so the NIAR software team is able to use a detection method similar to KAZE while significantly shrinking the amount of time the stitching methods take to produce an image. Referring to FIG. 68, the general flow of the new image-stitching algorithm is generally indicated at reference number 6802. With this, mask images generated within the algorithm will be used to do a variety of calculations before being passed to stitch with the original images.

Some issues with NDI image stitching include the amount of overlap and similarities across multiple images to successfully detect key points and stitch the images together successfully. To combat this, multiple shapes were drawn on top of our input images, which will then be used to calculate all relevant calculations. Instead of stitching the mask images together, calculations are passed to the original images and are then stitched together. The new detector is then used to detect key points on the above mask images. The classification algorithm K-Nearest Neighbors (KNN) was used. The role of this algorithm is as a matcher, which sorts possible matches of key points across multiple images, and sort them into groups, or "neighbors." After the matches have been found, a homography matrix is calculated and used to stitch the images together. Once the homography matrix has been obtained, rather than stitching the mask images together, all of the calculations that have been found are used with the original images to stitch the images.

Although images exhibit feathering and blending issues around the borders, using this process not only allows for 100% confidence that the images will be stitched together, but it also shrinks the stitching time of an entire blade down to a minute or less. Using these mask images greatly increases the image stitching success rate, while also greatly decreasing the time it takes to complete the stitching process. When NDI images are taken with the robot, it will make all images across the board uniform, and as such, this method above will only improve.

Quick and reliable communication to the robot executing the automated inspection and repair tasks is a necessity for smooth operation. Many robots including the KUKA brand robots described above use a PLC as their primary means of control. The specific brand of PLC being used is the Siemens SIMATIC Controller. The primary mode of communication to the PLC is a communication software module integrated into the JARVIS framework. This software module is written in the Microsoft .NET Framework (C#) due to the primary JARVIS framework also being written in C#. The communication module allows a seamless integration of data and robot commands to be streamed directly to the user. SDK provided by Siemens is also written entirely in C# so little integration overhead is required. The SDK is built upon the OPC Foundation's Unified Architecture (OPC UA) which is a widely accepted industry standard for robot communication.

Figure 69:
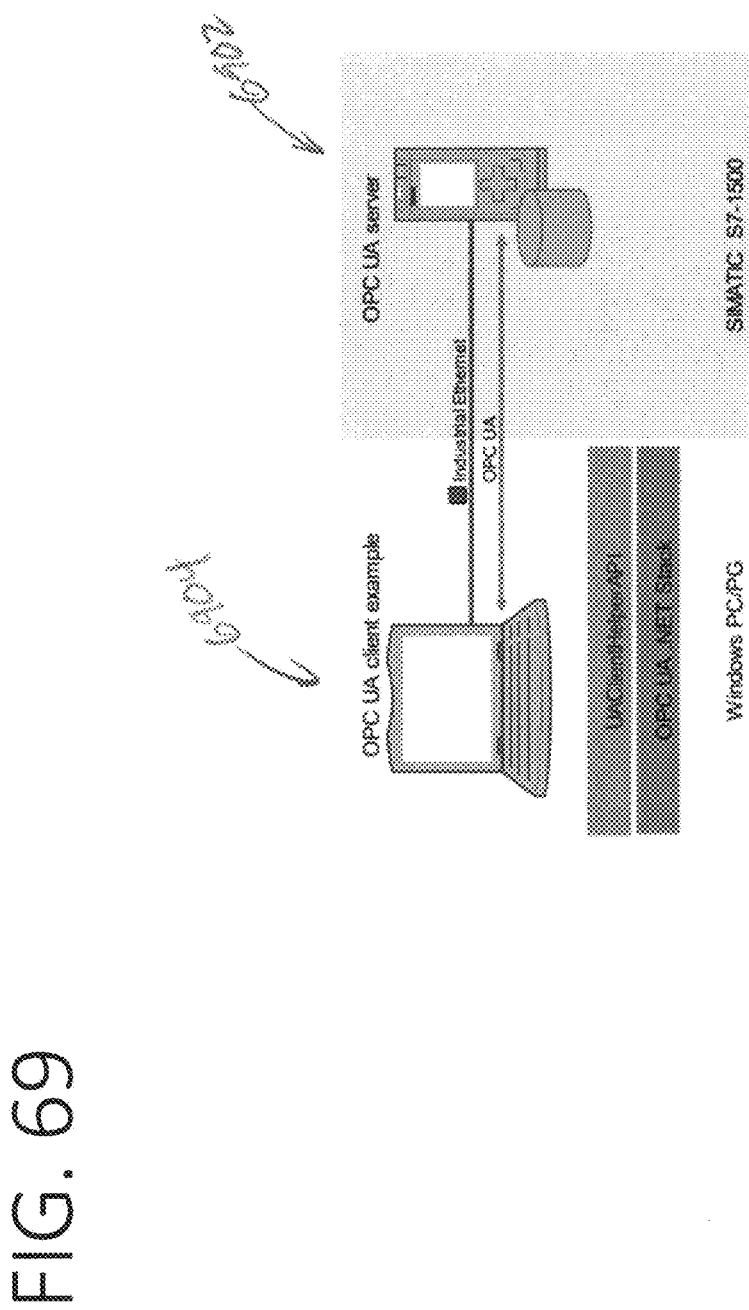
FIG. 69 is a schematic illustration of client-server architecture employed by the JARVIS cell.

The SIMATIC controllers use a client-server based approach to reading and writing information to each other shown in FIG. 69. The Open Platform Communications (OPC) server 6902, being run from the PLC, holds all the primary robot routines. This occurs while the client 6904, being run from the software framework, reads and writes information to the server and chooses when to execute commands.

The software communication module creates and configures the client on startup. This allows the client to search the server, or other endpoints via an Ethernet/IP connection and remotely connect to it.

In one or more embodiments, the server is run on a local network physically air-gapped from outside networks to help shield from unwanted access. This also allows the quickest possible communication to be used and helps avoid standard or heavy network congestion that could cause missing or delayed data packets.

The data being used by a PLC are stored in tags (nodes). On the software end, these tags typically consist of a name, data type, and the data being stored. The tag name is the access point to the data being housed by the tag, the data type is what kind of data is being store such as an integer or string of characters, and the data being store is the current value of the information in the tag. All of the information, whether is it retrieving data or calling robotic subroutines, is accessed through these tags. When accessing a tag, the tag name and the data type must be known ahead of time for the client to access it. The server can restrict the access of tags to either be read-only or read and write. This allows certain tags to be locked down and protected from being erroneously modified.

Another feature of the OPC US is the ability to subscribe to tags. With typical tag reading, a request is sent from the client to the server and the server replies with the requested data. This is standard for all networking communication. However, with OPC subscription, the server actually notifies the client when there has been a change to the data. This drastically reduces the amount of data transferred through the network compared to constantly polling the server for the latest information.

All data being continuously monitored through the software communication module will be done via the subscription feature. With the amount of communication involved in JARVIS, a safety fail-safe is being added to address the concern of an interruption between the client and server. A watchdog time, as previously mentioned, will be incorporated into the communication protocols as well. All main functions are tied to this watchdog timer to ensure that the client is always in control of the automation process. If the watchdog timer were to expire, the server would assume a communication fault between the connected client and itself. The communication fault can be handled a number of different ways. The most likely scenario will be a hold on all robot movement until either communication is reestablished or an emergency e-stop is pressed.

The server running the robotic movements will all have a unique self-signed certificate. When first connecting to a server, a client attempting to connect to a new server will get a certificate error indicating certificate has not been whitelisted for approval and thus cannot be connected to unless an exception is made. This allows another added layer of security to prevent a possible malicious party from spoofing a server. User authentication is also being added to the client-server communication process. With the possibility of a malicious party accessing a server, a user authentication will be included to help prevent unwanted connections. The server can run in multiple modes including secure and insecure. Insecure allows anonymous connection to the server. A server that is set in secure mode will only allow a specific username and password combination to gain access to the server. This allows the obviously added benefit of security and a hard-coded username and password can be implemented on the client-side.

With the backbone of the JARVIS framework being written in the .NET Framework and the Siemens SDK using the same, solid communication between the software client and the PLC server is easily established for the core of the JARVIS communication infrastructure.

4. Machine Learning

To lay the groundwork for the damage detection process, a Regional Convolutional Neural-Network (RCNN) called Mask R-CNN is used. This runs in the programming language of Python, with the help of Tensorflow and Keras. A convolutional neural-network is a very complex architecture that grabs groups of pixels, down samples them and connects them together to generate an output. Tensorflow is a machine-learning library that was both developed and maintained by the Google Brain team, and is integrated throughout a variety of machine learning applications. Keras is another machine-learning library that primarily runs on top of Tensorflow, and helps support deep learning neural-networks and helps reduce the processing power, and improves on speed of the neural-network. All algorithms and libraries are open source, as it allows access to the entire code base, but also see other developer's ideas and or improvements.

Figure 70:
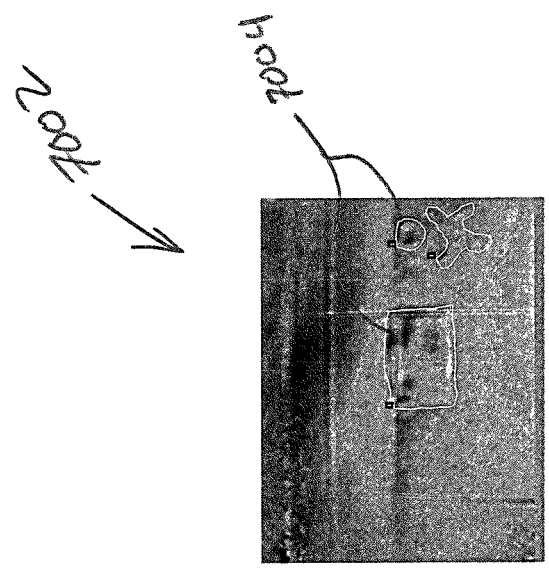
FIG. 70 is a screen shot of manual annotations to an image of a composite part taken by the JARVIS cell for the purpose of training a machine learning algorithm for damage recognition.

The first step in using the Mask R-CNN algorithm is to sort our already taken NDI images of the blade into two folders called train and validation. The train folder will contain NDI images that the algorithm will use to base its entire model on and the validation folder will contain NDI images that the algorithm has never seen before, and assess whether or not it can successfully identify regions of interest based on the training that it has performed. For each folder, annotations are created, and then manually drawn out on each area on every NDI image where damage or repairs are present. An example image 7002 with manual annotations 7004 is shown in FIG. 70 for reference. All the coordinates of those regions are then stored in a JSON file. The purpose of these annotations is to train the computer on the regions the team has specified or annotated, and allow the computer to learn to identify similar regions and annotations in other images.

Once the images are present in their corresponding folders and annotations drawn, the Convolutional Neural-Network (CNN) model begins training for damage detection. One embodiment of a CNN employs epochs and steps. An epoch is one iteration over all training data in our algorithm, whereas steps are the next step of one gradient update in the training process.

In order to train data faster, the training algorithm can execute on the computer's Graphics Processing Unit (GPU) rather than the Central Processing Unit (CPU), using Nvidia's Compute Unified Device Architecture (CUDA) language on top of their GPUs to streamline and build the training aspect. While training one model on the CPU might take a day or two, with the ability to train on the GPU, training time can be reduced by more than half. This allows the ability to train and create models at a much faster pace, but also allows Mask R-CNN to generate models more defined and all around more improved than if training occurred on the CPU.

Once the training concludes, the weights file is stored. Stored as an .H5 file. The weights file contains large collections of multidimensional numeric arrays, and holds relevant data of the models that occur during training. In order to detect regions of interest on newer images, weights files detect objects on the input images.

Figure 71:
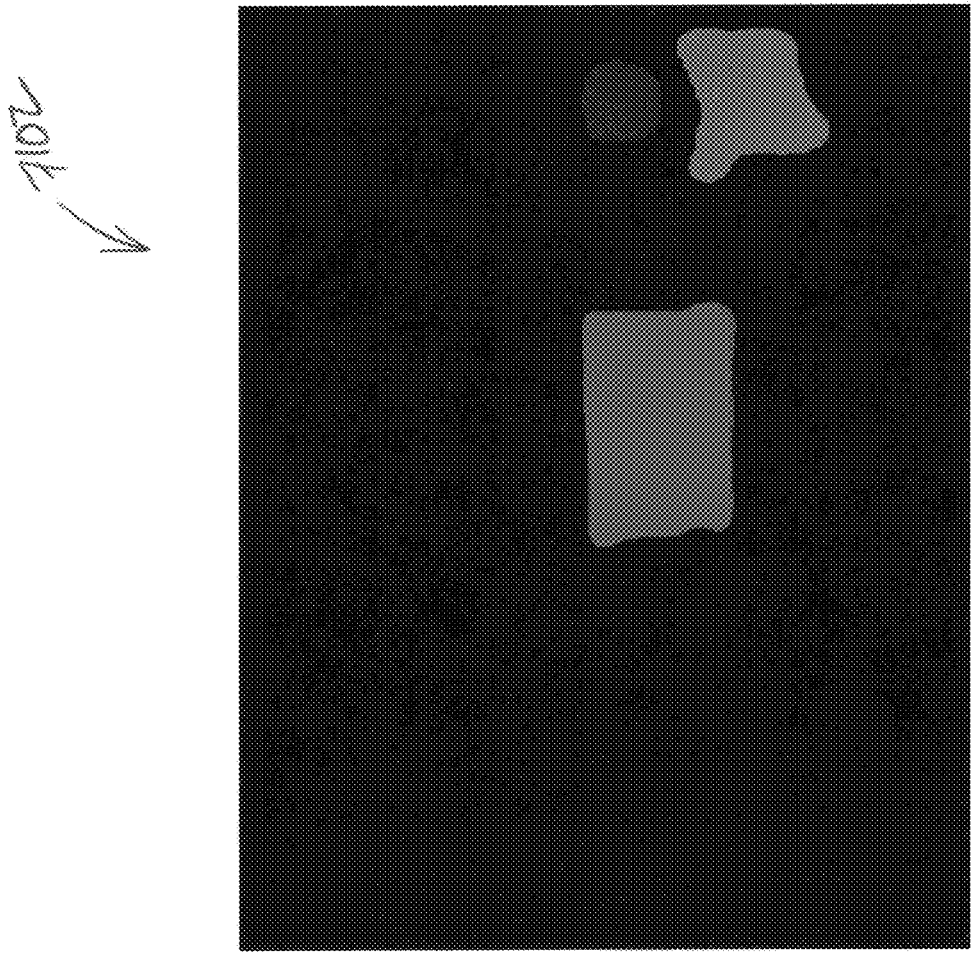
FIG. 71 is a mask version of the image of FIG. 70.
Figure 72:
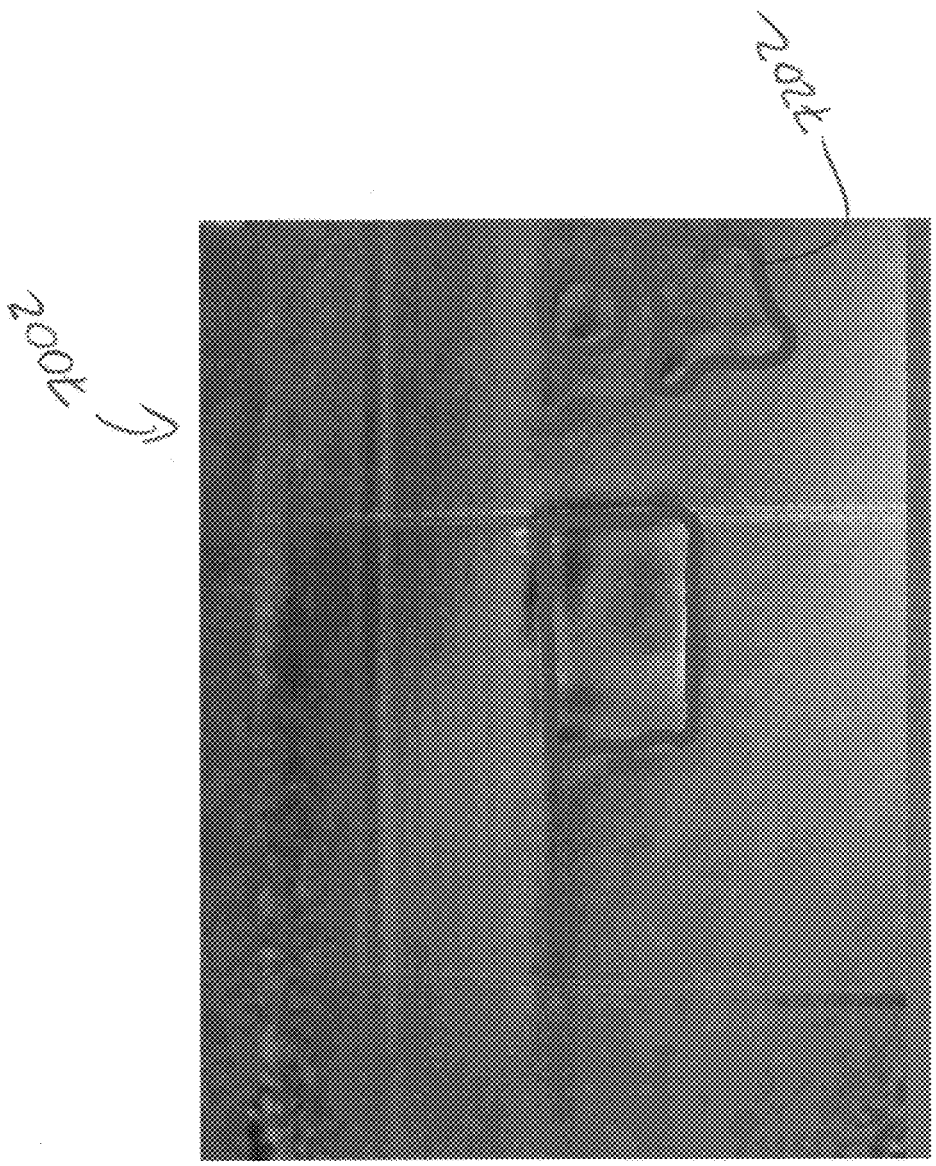
FIG. 72 is an outline of the mask of FIG. 71 overlaid on the image of FIG. 70.
Figure 73:
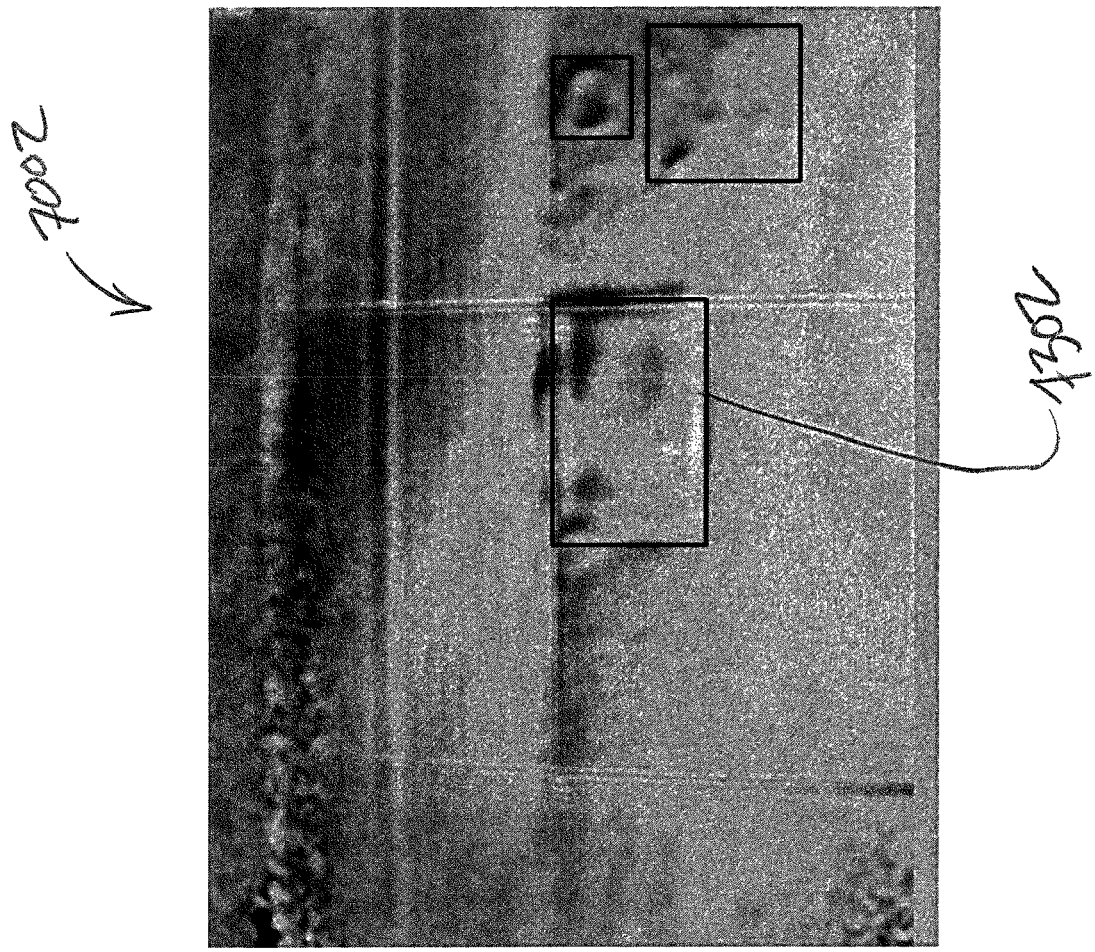
FIG. 73 is a screen shot similar to FIG. 72 but where the outlines are converted to rectangles.

The term "splashing" in Mask R-CNN refers to when color fills all regions that have been marked out or detected by the algorithm. When splashing an image, a mask version 7102 is retrieved, where a blank image contains all found regions with different colors filling them in, as shown in FIG. 71. Although the mask image only contains the regions that were found, but not the original image, the regions on the mask image are grabbed and transposed atop of the original image. To do this, each contour 7202 is drawn on the mask image, and then displayed on the original image 7002 as shown in FIG. 72. Although the regions have been drawn on the image, for better formatting and visualization, the final stage which is demonstrated in FIG. 73, creates rectangles 7302 around each individual contour. With these found regions, the coordinates of each corner of the drawn rectangles can then be obtained. Early stages of models being trained have yielded promising results.

5. Security

In one or more embodiments, the JARVIS software framework facilitates four access levels for its day-to-day operation: Operator, Trainer, Safety Officer and Admin. The operator's permissions cover the normal day-to-day operation of the JARVIS cell 10. The operator is allowed to run the automation of induction, inspection and repair of a specimen. This comes with the ability to look up history of the blades that have been inducted into JARVIS. The operator will be unable to access application settings and make changes to certain critical operating parameters. The Training access level will provide the ability to modify tool locations in the TDS 40. This allows tools located in the MTCs 110 to be switched around in different slots 43A. The Trainer can also "teach" the machine-learning model by annotating and labeling NDI blade data and feeding it back into the model. It is recommended that the Trainer be a certified NDI technician for accurate data classification. The Safety Officer will be an account that can modify to override safety protocols. This will allow the Safety Officer to conduct maintenance or repairs to JARVIS and verify everything is working correctly. The last account level is Admin. An admin can control and edit every system parameter. In one or more embodiments, the level permissions are inherited as they go up. A trainer will inherit all the permissions of an operator as well as the training permissions. Each of the account levels are treated as an individual group. This means that the admin account can generate a username and password to create a new account for every type of group. Therefore, each group can support multiple users. The account-level groups can have their default permissions changed and each individual account can be moved between the available groups.

In one or more embodiments, the JARVIS cell complies with the guidelines put forth in the "DoD Enterprise DevSecOps Reference Design." To facilitate such compliance, the JARVIS cell 10 may be air gapped—i.e. be a totally offline system so that any access to the cell requires a local presence. Additionally, the SQL Server is configured for privileged access, enabling monitoring of users, tracking of access attempts, etc. All data generated is encrypted in storage and while being transferred in accordance with the Federal Information Processing Standards (FIPS).

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

IV. Statements of the Invention which May be Claimed

B1. A system for inspecting and repairing composite parts, the system comprising:
a cell configured to receive a composite part in the cell;
a robot in the cell, and
a plurality of modular tool cartridges adjacent to the cell, each modular tool cartridge containing a robotic end effector for the robot, wherein the robot is configured to interchangeably attach to each of the end effectors of the plurality of modular tool cartridges to perform an autonomous or semi-autonomous routine whereby the robot inspects the composite part in the cell, identifies a damaged area of the composite part, and performs one or more repair operations to the damaged area of the composite part.

B2. The system as set forth in statement B1, wherein the cell comprises a tool docking station defining a plurality of docks, each configured to interchangeably receive any of the plurality of modular tool cartridges therein to hold the received tool cartridge for connecting the respective end effector to the robot.

B3. The system as set forth in statement B2, wherein each dock comprises a first tool changer coupler and each modular tool cartridge comprises a second tool changer coupler configured to couple to any of the first tool changer couplers.

B4. The system as set forth in statement B3, wherein each first tool changer coupler is a master tool changer coupler and each second tool changer coupler is a slave tool changer coupler.

C1. A fixture for holding a rotorcraft blade in an inspection cell, the fixture comprising:
a rotatable base;
a cuff mount supported on the rotatable base, the cuff mount defining a channel configured to receive a portion of a cuff of the rotorcraft blade therein;
a pin movably connected to the cuff mount for movement between a release position and a lock position, the pin in the lock position being configured to lock the cuff to the cuff mount and the pin in the release position being configured to release the cuff from the cuff mount.

C2. The fixture as set forth in statement C1, wherein the cuff mount is movable relative to the rotatable base between a mounting position and a release position.

C3. The fixture as set forth in either of statements C1 and C2, further comprising a tool changer coupler.

C4. The fixture as set forth in statement C3, wherein the tool changer coupler comprises a first tool changer coupler and a second tool changer coupler.

C5. The fixture as set forth in any of statements C1-C4, further comprising a tip converter configured to releasably couple to the cuff mount.

C6. The fixture as set forth in statement C5, wherein the tip converter is configured to attach to a tip of the rotorcraft blade opposite the cuff.

D1. A processor-implemented method of identifying damage to a composite part, the method comprising:
training a convolutional neural network to recognize damage based on non-destructive testing images of composite parts;
receiving a non-destructive testing image of said composite part; and
determining one or more locations of damage in the non-destructive testing image based on the convolutional neural network.

E1. A method of sustaining an inventory of a plurality of composite parts, the method comprising:
  periodically scanning each of the composite parts with a non-destructive testing instrument; and
  storing data from each scan of each part in a database.

E2. The method as set forth in claim E1, further comprising repairing the composite parts based on the scanning and storing information about each repair in the database.

E3. The method as set forth in claim E1, further comprising creating a digital twin for each of the composite parts based on the scanning and storing the digital twin in the database.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A system for inspecting composite parts, the system comprising:
  a support for supporting a composite part;
  an inspection system comprising at least one nondestructive testing instrument configured to scan the composite part supported by the support to generate nondestructive testing data about the composite part;
  a damage assessment system configured to present the nondestructive testing data for assessment of damage to the composite part based on the nondestructive testing data; and
  a robot comprising a tool changer;
  wherein the at least one nondestructive testing instrument comprises a plurality of nondestructive testing instruments of different types, each nondestructive testing instrument comprising a tool changer mount for operatively coupling the respective nondestructive testing instrument to the tool changer of the robot;
  wherein the tool changer is configured to releasably connect to the tool changer mount of each of the plurality of nondestructive testing instruments such that the tool changer mounts the respective nondestructive testing instrument on the robot for movement with the robot in relation to the other nondestructive testing instruments;
  wherein the system is configured to conduct a plurality of different types of nondestructive tests of the composite part supported by the support by instructing the robot to sequentially connect to each of the plurality of nondestructive testing instruments, move the respective nondestructive testing instrument in relation to the composite part, and operate the respective nondestructive testing instrument to scan the composite part.

2. The system as set forth in claim 1, wherein the plurality of nondestructive testing instruments are configured to detect core-to-face sheet disbonding and moisture ingress.

3. The system as set forth in claim 1, wherein the inspection system comprises a processor configured to execute a stitching process configured to stitch together discrete portions of the nondestructive testing data into a single stitched-together presentation.

4. The system as set forth in claim 1, further comprising a processor configured to execute a digital twinning process for generating a digital twin of the composite part based on the nondestructive testing data and storing the digital twin in memory.

5. The system as set forth in claim 4, wherein the digital twinning process comprises wrapping the nondestructive testing data onto a three-dimensional model of the composite part.

6. The system as set forth in claim 1, wherein the system comprises a tool docking station defining a plurality of tool docking slots and a plurality of modular tool cartridges configured to be operatively docked in the tool docking slots.

7. The system as set forth in claim 6, wherein each of the modular tool cartridges comprises a robotic end effector.

8. The system as set forth in claim 1, wherein the system is formed from a field-deployable modular cell.

9. The system as set forth in claim 8, wherein the field-deployable modular cell comprises a plurality of connectable cell modules including a part processing station, a part induction station, a control station, an equipment supply station, and/or the support.

10. The system as set forth in claim 8, wherein the field-deployable modular cell comprises a part rotator configured to rote the composite part about an axis of rotation for inspection of multiple sides of the composite part.

11. The system as set forth in claim 8, wherein the field-deployable modular cell is configured to break down for transport via standard road vehicles.

12. The system as set forth in claim 1, further comprising a repair system configured to assist in repairing damage to the composite part detected by the inspection system.

13. The system as set forth in claim 1, wherein the damage assessment system is configured to automatically detect damage to either of a skin and or a core of the composite part based on the non-destructive testing data.

14. The system as set forth in claim 13, wherein the damage assessment system comprises a regional convolutional neural network configured to identify one or more regions of the composite part containing damage.

15. The system as set forth in claim 13, wherein the repair system is configured to automatically prepare said one or more regions of the composite part for one of a core repair and or a scarf repair.

16. The system as set forth in claim 15, wherein the inspection system is configured to scan the one or more regions of the composite part prepared by the repair system.

17. The system as set forth in claim 16, wherein the repair system is configured to machine a scarf patch to repair the one or more regions of the composite part based on the scan of the one or more regions of the composite part.

18. The system as set forth in claim 17, wherein the repair system comprises a repair database and is configured to store data about each repair that is made to the composite part.

19. A system for inspecting composite parts, the system comprising:
  an enclosure defining an inspection and repair cell:
  a support for supporting a composite part in the inspection and repair cell;
  an inspection system in the inspection and repair cell comprising at least one nondestructive testing instrument end effector;
  a repair system in the inspection and repair cell comprising at least one repair end effector;
  a robot in the inspection and repair cell; and
  a control system configured to direct an inspection and repair process on the composite part supported by the support by controlling the robot to (i) connect to the nondestructive testing instrument end effector; (ii) move the nondestructive testing instrument along the composite part; (iii) while moving the nondestructive testing instrument, operate the nondestructive testing instrument to scan the composite part; (iv) release the nondestructive testing instrument; (v) connect to the repair end effector; (vi) move the repair end effector into position for conducting a repair operation; and (vii) operate the repair end effector for conducting the repair operation.

20. The system as set forth in claim 19, wherein the repair end effector comprises a surface preparation end effector.

21. The system as set forth in claim 19, wherein the surface preparation end effector comprises an atmospheric plasma generator.

22. The system as set forth in claim 19, wherein the repair end effector comprises a milling end effector.

23. The system as set forth in claim 19, wherein the repair end effector comprises a laser ablation end effector.

24. The system as set forth in claim 19, wherein the robot comprises a tool changer and wherein the repair end effector comprises a plurality of repair end effectors of different types, each repair end effector comprising a tool changer mount for operatively coupling the respective nondestructive testing instrument to the tool changer of the robot.

25. The system as set forth in claim 24, wherein the nondestructive testing instrument end effector comprises a plurality of nondestructive testing instrument end effectors of different types, each nondestructive testing instrument end effector comprising a tool changer mount for operatively coupling the respective nondestructive testing instrument end effector to the tool changer of the robot.

26. They system as set forth in claim 25, wherein the tool changer is configured to releasably connect to the tool changer mount of each of the plurality of nondestructive testing instrument end effectors and each of the plurality of repair end effectors such that the tool changer mounts the respective nondestructive testing instrument on the robot for movement with the robot in relation to the other nondestructive testing instruments.

27. The system as set forth in claim 26, wherein the system is configured to conduct a plurality of different types of nondestructive tests of the composite part supported by the support by instructing the robot to sequentially connect to each of the plurality of nondestructive testing instrument end effectors, move the respective nondestructive testing instrument end effector in relation to the composite part, and operate the respective nondestructive testing instrument end effector to scan the composite part.

28. The system as set forth in claim 27, wherein the system is configured to conduct a plurality of different types of repair operations by instructing the robot to sequentially connect to each of the plurality of repair end effectors and operating the respective repair end effector to perform a respective repair operation.

* * * * *